Dec. 9, 1958            G. A. LOCKE            2,863,936

TELETYPEWRITER EXCHANGE SYSTEM

Filed June 10, 1953            13 Sheets-Sheet 1

*FIG. 1*

| FIG. 3 | FIG. 4 | FIG. 5 | FIG. 6 | FIG. 8 | FIG. 10 | FIG. 12 |
|--------|--------|--------|--------|--------|---------|---------|
|        |        |        | FIG. 7 | FIG. 9 | FIG. 11 | FIG. 13 |

*FIG. 1A*

| LOCAL SUBSCRIBER'S STA. CIRCUIT ATTENDED | SUBSCRIBER'S LINE CIRCUIT | LINK CIRCUIT | TRUNK CIRCUIT | DIRECTOR CIRCUIT | DIRECTOR CIRCUIT | MISC. ALARM CIRCUIT |
|---|---|---|---|---|---|---|
|   |   |   | DIRECTOR CIRCUIT | DIRECTOR CIRCUIT | DIRECTOR CIRCUIT | MISC. ALARM CIRCUIT |

INVENTOR
G. A. LOCKE
BY R. C. Terry
ATTORNEY

INVENTOR
G. A. LOCKE
BY
R.C.Terry
ATTORNEY

Dec. 9, 1958 G. A. LOCKE 2,863,936
TELETYPEWRITER EXCHANGE SYSTEM
Filed June 10, 1953 13 Sheets-Sheet 8

INVENTOR
G. A. LOCKE
BY
ATTORNEY

Dec. 9, 1958  G. A. LOCKE  2,863,936
TELETYPEWRITER EXCHANGE SYSTEM
Filed June 10, 1953  13 Sheets-Sheet 11

INVENTOR
G. A. LOCKE
BY
R. C. Terry
ATTORNEY

Dec. 9, 1958 G. A. LOCKE 2,863,936
TELETYPEWRITER EXCHANGE SYSTEM
Filed June 10, 1953 13 Sheets-Sheet 13

INVENTOR
G. A. LOCKE
BY
R. C. Terry
ATTORNEY

United States Patent Office 2,863,936
Patented Dec. 9, 1958

2,863,936

TELETYPEWRITER EXCHANGE SYSTEM

George A. Locke, Glen Head, N. Y., assignor to Bell Telephone Laboratories, Incorporated, New York, N. Y., a corporation of New York Application June 10, 1953, Serial No. 360,694

10 Claims. (Cl. 178—2)

This invention relates to communication systems and more particularly to interconnecting circuits for teletypewriter subscriber stations connected through a line concentrating unit to a teletypewriter exchange, or central, office. The invention is a modification of the system disclosed in Kinkead-Lucek Patent 2,340,599, granted February 1, 1944.

The system disclosed in the Kinkead et al. Patent 2,340,599 comprises an automatic switching teletypewriter line concentrating unit by means of which a plurality of subscriber lines are associated with a distant teletypewriter exchange office over telegraph trunks extending to the office. A subscriber station seeks connection with the distant teletypewriter exchange office through the line concentrating unit, and therefore when a start key at the subscriber's station is operated to auomatically establish a call connection, the call is registered at the distant office. Because the teletypewriter exchange office is distantly located from the line concentrating unit, the trunks interconnecting the office and the concentrating unit are complex, in that each requires at each end distinctive terminating equipment.

The invention contemplates incorporation of a modification of the system shown in Kinkead-Lucek patent into a teletypewriter exchange office or the employment of such a modified system in proximity to the exchange office for the purpose of alleviating congestion that sometimes results from expanding demands for teletypewriter exchange service.

In accordance with one of the well-known arrangements for the manual switching of teletypewriter traffic, calls incoming from subscriber stations are answered at an answering position board and calls outgoing to subscriber stations are completed at calling position boards. There need be only as many answering multiples of a subscriber's line as are necessary to give each subscriber prompt response to a call initiated by him. An entirely different situation exists with respect to the calling appearances of the subscribers' lines because it must be possible to establish a connection to a subscriber's line for the purpose of directing a call to him from any other subscriber's line served by the same switching center and from any trunk connecting the switching center to a remote switching center. Thus it may be necessary to provide many more calling multiple appearances of a subscriber's line than answering multiple appearances.

Under a condition of a steady rise in the number of teletypewriter subscribers desiring service, particularly in congested metropolitan areas, it may happen that the plant facilities of a switching center, while capable of housing the necessary answering appearances of the additional subscribers' lines, are incapable of housing the many calling appearances of such lines.

The modification of the system shown in the Kinkead-Lucek patent which is contemplated by the invention to alleviate the plant expansion problem above described consists in the provision of a line concentrating unit as part of or as an adjunct to the switching center, comprising an automatic switching apparatus and a plurality of simple trunk circuits, the number of which is a small percentage of the number of subscriber lines served by the automatic switching apparatus, such trunks connecting the automatic switching apparatus to the calling multiple manual switching positions. Calls incoming from the subscribers' lines are not handled over these trunks, but the subscribers' lines have direct call-answering multiple appearances as in the case of fully manual arrangements as described above. This arrangement relieves the congestion at the calling multiple manual positions because it is only necessary to provide enough trunk circuits to handle the traffic load outgoing to the subscribers' stations served by the automatic switching mechanism. These trunks have multiple appearances in the manual switching positions sufficient to give any calling subscriber's line or trunk access to the subscribers' lines served by the automatic switching mechanism. The switchboard facilities required to provide the necessary multiple appearance of the trunks will be proportionately smaller than the number of calling appearances that would be required for each line if served directly by the manual switching facilities. Moreover, the service to subscribers is not in any way impaired because at any given time only a certain nmber of subscribers' lines will be under seizure at the calling positions except for abnormal load conditions, and the connections can as well be established over trunks, it being assumed that a sufficient number of trunks will be provided to accommodate ordinary peak load. Since the trunks are not employed on incoming calls from the subscriber stations, a departure from the arrangement shown in the Kinkead-Lucek patent, all of the trunks are usable for establishing calls outgoing to the subscriber stations.

The object of the present invention is to relieve congestion in the subscriber's line circuit multiples at operators' positions at the inward telegraph switchboard in a teletypewriter exchange office on inward calls, that is, calls wherein call connections desired by an operator in the teletypewriter exchange office are extended manually from an operator's position at the inward telegraph switchboard over trunks of a line concentrating unit, and automatically through the line concentrating unit to a desired subscriber's station.

According to the present invention the teletypewriter line concentrating unit is equipped to furnish service to 200 subscriber line circuits. It is divided into two parts, one for establishing a call from an operator's position at an inward teletypewriter switchboard in a teletypewriter exchange office to a subscriber line circuit connected to a line concentrating unit and the other for calls from a subscriber station connected to the line concentrating unit, to an operator's position at an outward teletypewriter switchboard in the exchange office. The line concentrating unit is designed for operation on the premises wherein these manually operated switchboards are located nearby requiring simple trunks between the line concentrating unit and the switchboards. The trunk circuits between the line concentrating unit and the switchboards are arranged in two groups of ten each, each group serving 100 subscriber line circuits and the trunk multiple designations at the switchboard will indicate the trunk group through which an inward call connection should be established to reach a particular subscriber station. One trunk circuit is required for a connection between a switchboard and the concentrating unit, terminating equipment for the trunk circuit at the concentrating unit only being required. Each trunk circuit has two relays which form the sequence portion which consists basically of two chain circuit paths, one a ground connection chain and the other a grounded battery chain, both of which extend through the corresponding two relays in each of the other trunk circuits of the unit. A director circuit which is similar to that shown in Kinkead et al. Patent 2,340,599, supra, is provided for the line concentrating unit. A miscellaneous alarm circuit designed especially for the line concentrating unit shown herein is provided to time properly the various steps involved in the completion of a call and to show certain signals concerning the progress of traffic.

A feature of the invention is the provision of an automatic line concentrating unit responsive to a permutation signaling code of two digits over a connection established at an operator's position in an inward teletypewriter switchboard, to automatically establish expeditiously a connection to any desired one of 200 subscriber line circuits.

Another feature is the provision of one trunk only for each connection between the switchboard at the exchange office and the line concentrating unit.

Another feature is the provision of two electro-magnetic relays in each trunk circuit for effecting the performance equivalent to that of the separate sequence circuits shown in Kinkead et al. Patent 2,340,599, supra.

Another feaure is the provision of a test board independently of the operator's inward and outward switchboards for a test circuit for testing the subscriber line circuits.

Another feature is the provision of trunk circuits and subscriber line circuits arranged for attended and unattended and line hunting local station service.

An embodiment of the invention is comprised in the teletypewriter system, herein described, and illustrated in the accompanying drawings of which:

Fig. 1 is a diagram showing how the figures which illustrate the invention shall be placed to form a complete circuit schematic of the system described herein;

Fig. 1a is a representation similar to that of Fig. 1 but showing a function designation caption of each of the figures placed in corresponding positions;

Figure 12:
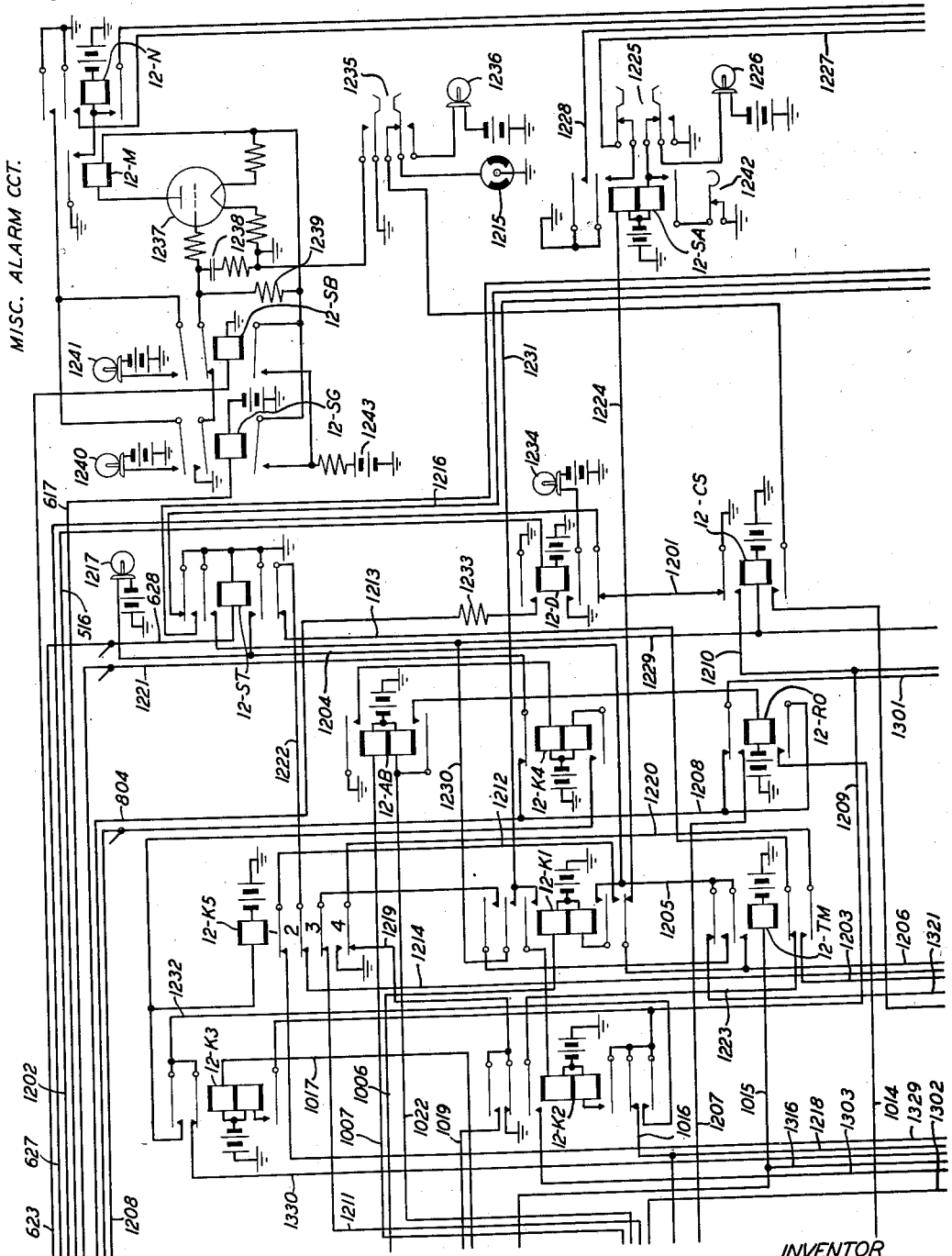
Figure 13:
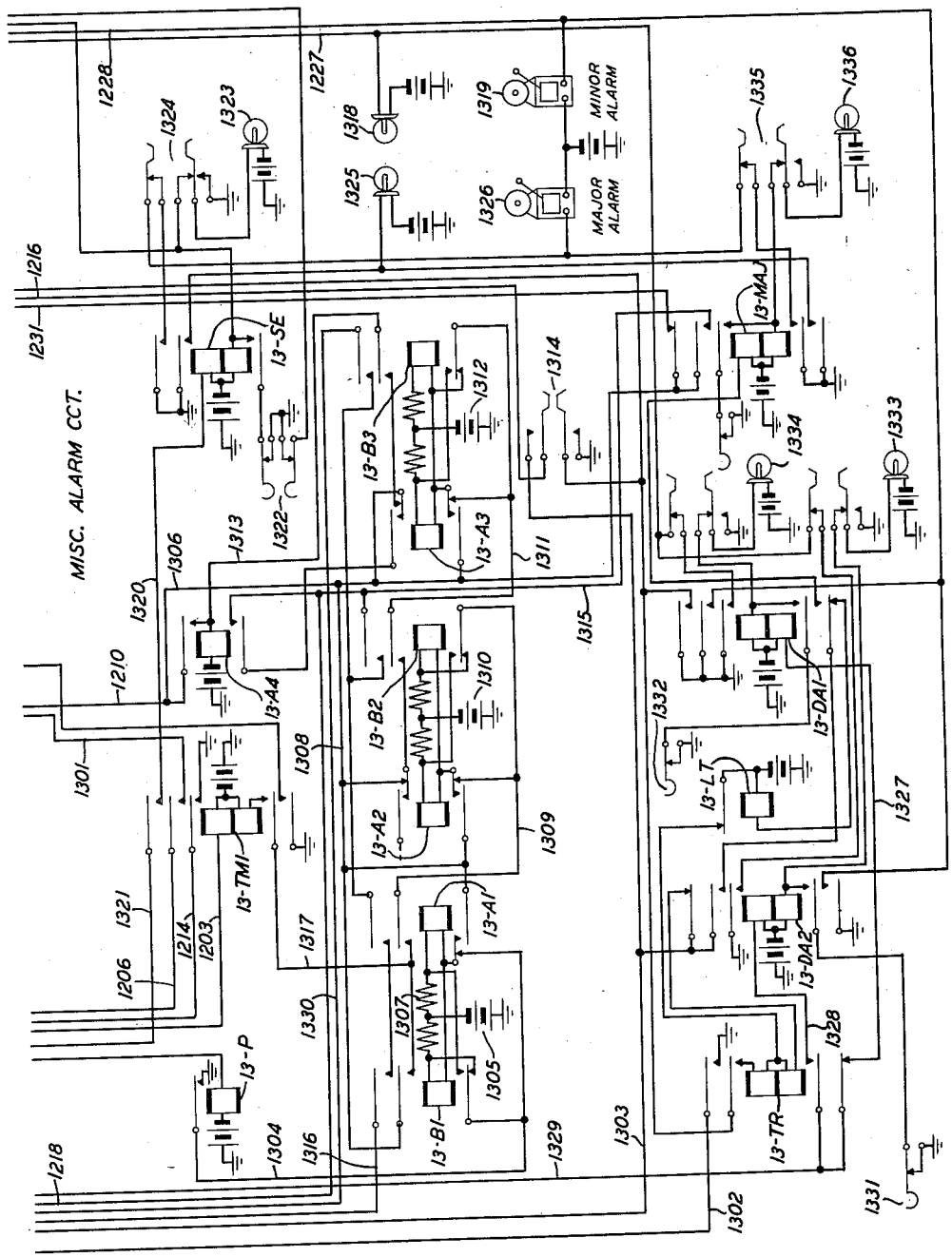

Figs. 7, 8, 9, 10 and 11 show as a part of the line concentrating unit a director circuit similar to that shown in Kinkead et al. Patent 2,340,599, supra. Also shown in Fig. 10, in block form, is a second, or spare, director circuit No. 2 which is arranged to be manually or automatically switched into service in place of the director circuit shown herein in detail, should the latter director circuit become disabled; and Figs. 12 and 13 show a miscellaneous alarm circuit provided as part of the line concentrating unit and designed especially for the present invention.

The numbering of the various pieces of apparatus and parts of the circuit arrangement shown on the several figures has been kept to a rigid plan. The apparatus, particularly the electromagnets, have been designated with reference letters having a prefix corresponding to the figure in which the piece of apparatus is located. All other parts of the equipment, such as conductors, resistors, condensers and the like, are designated with reference numerals in the hundreds, each hundreds digit corresponding to the figure in which the part is located, for example, any part located in Fig. 2 is designated with a numeral between 200 and 299 and any part located in Fig. 3 is designated with a numeral between 300 and 399, and so on for the remaining Figs. 4 to 13, inclusive.

The inward switchboard at the exchange office may preferably be of the type disclosed in G. A. Locke and F. S. Kinkead Patent 2,237,154 granted April 1, 1941, and the outward switchboard, of the type disclosed in W. V. K. Large Patent 2,222,672, granted November 26, 1940. The subscriber stations, the line concentrating unit and the teletypewriter exchange office may comprise any suitable type of telegraph transmitting and receiving apparatus. Typical examples of suitable printing telegraph apparatus such as would be employed in typical telegraph systems in accordance with this invention are described in detail in Morton-Krum-Kleinschmidt Patent 1,904,164 and Morton-Krum Patent 1,745,633, respectively granted April 18, 1933 and February 4, 1930. These patents are hereby made part of the present application as if fully included herein.

Figure 2:
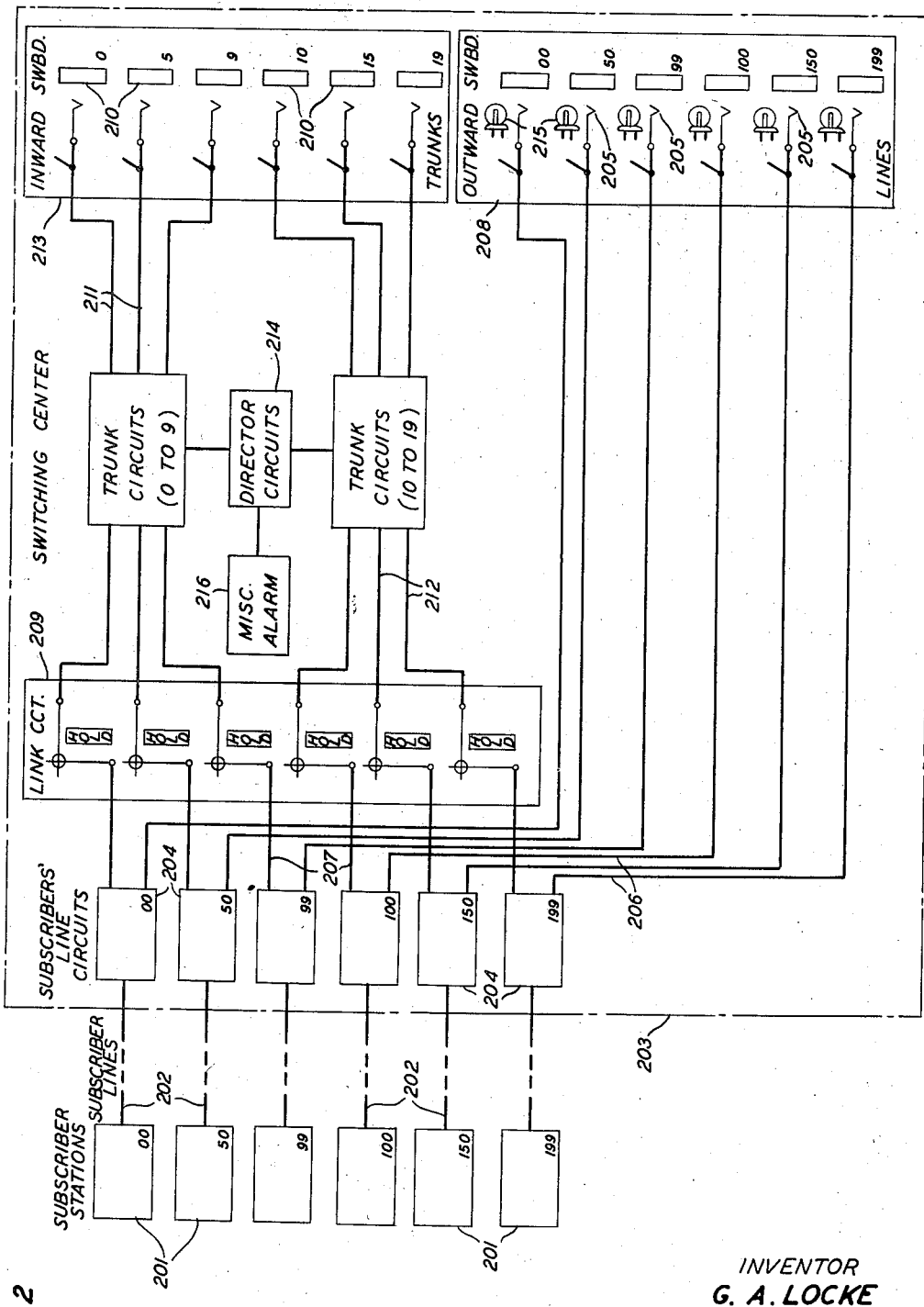
Fig. 2 is a diagrammatic representation, principally in block form, of a system embodying the present invention.
Figure 3:
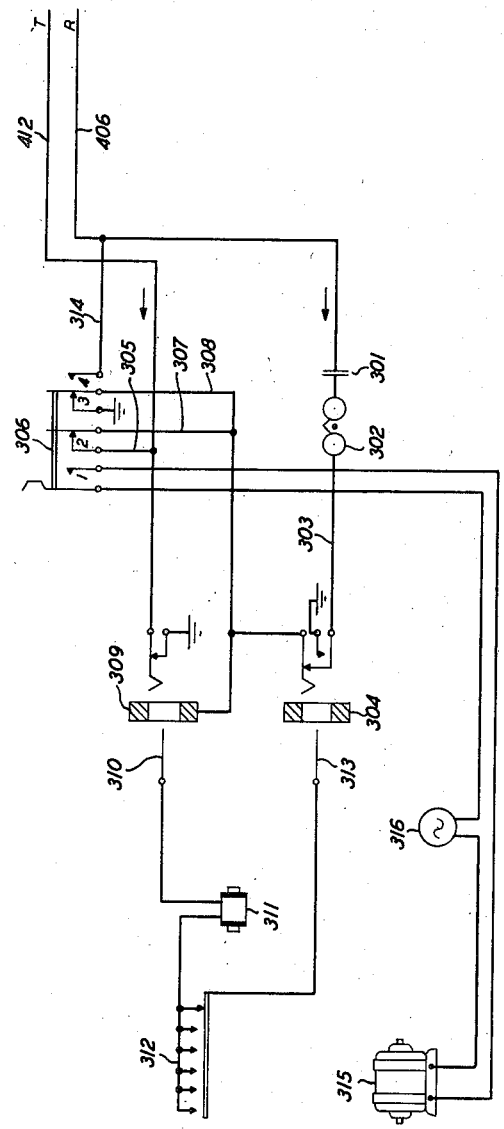
Fig. 3 shows a local attended subscriber station circuit.

A diagrammatic representation of the complete system is shown in Fig. 2. In that system, the reference numeral 201 designates subscriber stations, and six such stations have been indicated. As set forth hereinbefore, it is contemplated that the automatic line concentrating unit will accommodate two hundred subscriber stations. Accordingly, the stations have been designated by individual calling code numbers representing the first, middle and last station in the first group of one hundred stations, and the first, middle and last station in the second group of one hundred stations, the dsignations being 00, 50, 99, 100, 150 and 199. The circuits and equipment of subscriber stations 201 are shown in detail in Fig. 3.

Figure 4:
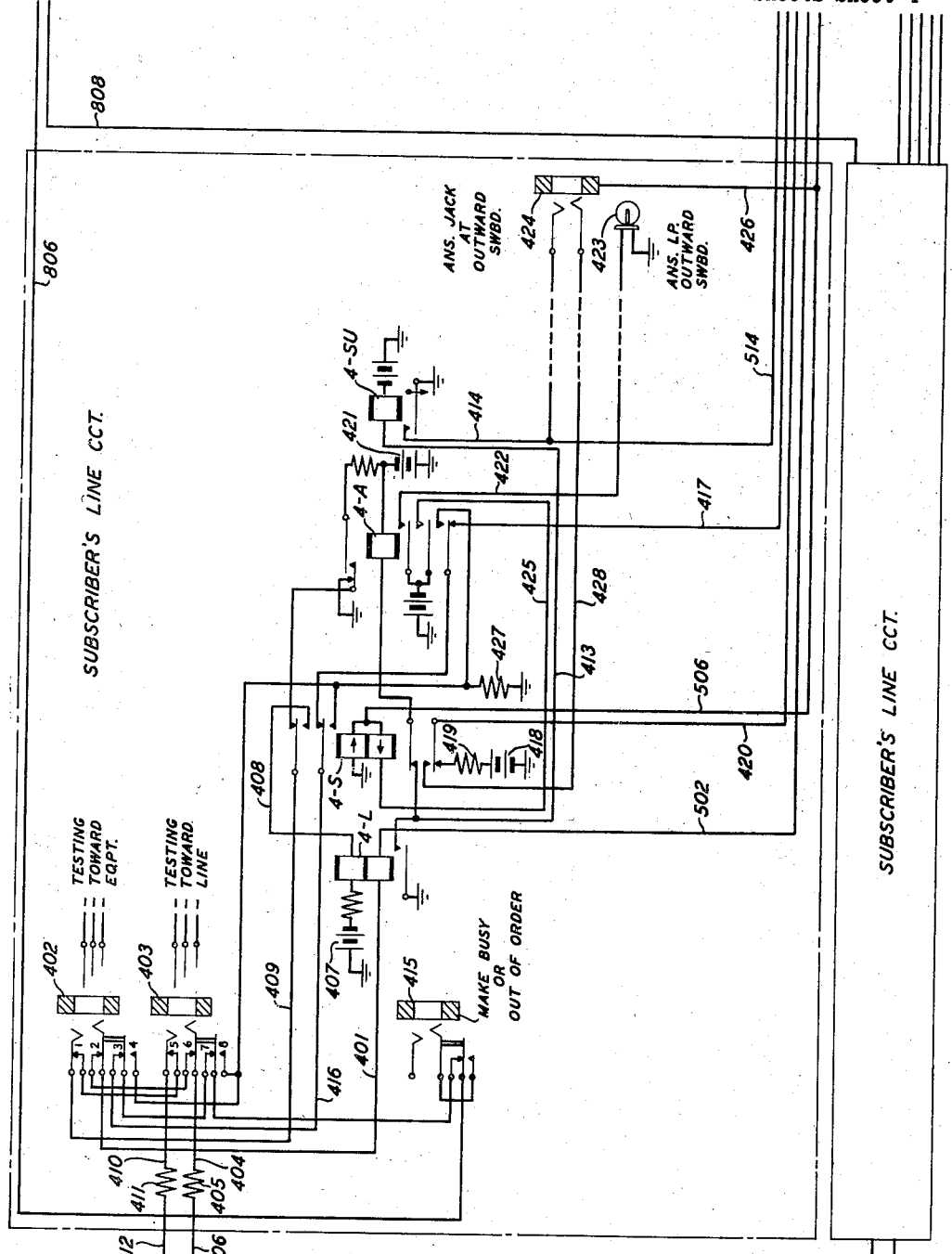
Fig. 4 shows a subscriber line circuit which will operate equally well with both attended and unattended local subscriber station service.

Each subscriber station is connected by a line, designated by the reference numeral 202, to a switching center, comprising the equipment enclosed in dotted rectangle 203. Lines 202 comprise two conductors, as appears from Figs. 3 and 4. Each of the subscriber lines is terminated in the switching center in a subscriber's line circuit 204, the circuits of which are shown in Fig. 4. The subscriber's line circuits 202 have been designated by the subscriber station calling numbers corresponding to those of the subscriber stations 201.

In each of the subscribers' line circuits there are branching transmission and control paths, the paths of one branch being designated by the reference numeral 206, and those of the other branch being designated by the reference numeral 207. The transmission and control paths 206 extend in the switching center to answering jacks 205 in outward switchboard 208. These jacks have been designated by the call numbers of the stations that they represent and correspond to jack 424 in Fig. 4, the circuits of which will be more fully described hereinafter.

Figure 5:
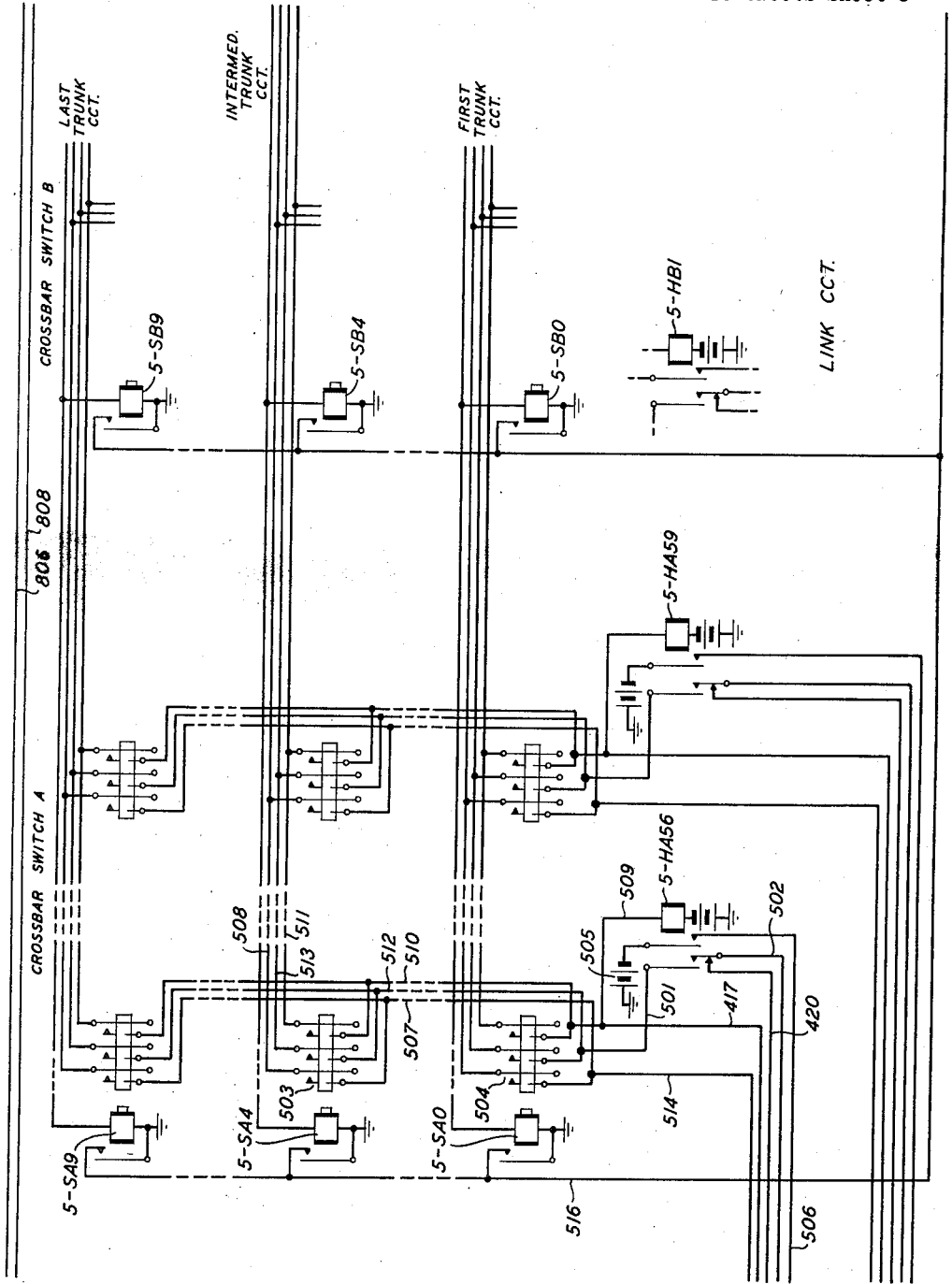
Fig. 5 shows a link circuit which is of the crossbar type switch and is used to establish connections at the line concentrating unit between the subscriber line circuits and trunk circuits extending to the manually operated switchboards.

The transmission and control paths 207 are connected to the vertical conductor sets of a link circuit 209 which may be a crossbar switch, and the circuits of which are shown in Fig. 5. The horizontal conductor sets of the link circuit, that selectively make connection with vertical conductor sets through crosspoints, are connected to trunk circuits 211 and 212 comprising two groups, each group containing ten trunks. The trunk circuits 211 are indicated as being numbered 0 to 9, and the trunk circuits 212 have been indicated as being numbered 10 to 19. The point of access of each of the twenty trunks is a jack in inward switchboard 213, and six jacks have been shown, representing the first, middle and last trunk in each of the two groups, as indicated by the numbers 0, 5, 9, 10, 15 and 19. These jacks correspond to jack 601 in Fig. 6 and that figure also contains a trunk circuit, which may be any one of the trunk circuits 211 and 212.

A director circuit 214, having the function of decoding signals comprising the calling code of any of the subscriber stations 201, is arranged to cooperate with any one of the trunk circuits and to respond to code signals transmitted to it over a trunk from inward switchboard 213. The director circuit 214 determines by test whether the subscriber station represented by the received calling code is idle, and upon determining that it is idle, it causes the operation of the link circuit to connect the trunk to the subscriber's line circuit of the called subscriber station. The director circuit is shown in Figs. 7, 8, 9, 10 and 11. A miscellaneous alarm circuit 216, the details of which are shown in Figs. 12 and 13, cooperates with the director circuit to supervise the operation of the director circuit and to register alarms when the establishment of a connection under the control of the director circuit does not proceed normally.

For the purpose of illustrating generally the mode of operation of the system, it will be assumed that the subscriber station 201—50 desires to communicate with the subscriber station 201—199. The calling subscriber 201—50 activates his station, which results in a response of the subscriber's line circuit 204—50 to cause the extension of a transmission circuit to the jack 105—50 in the outward switchboard 208 and the lighting of a call lamp 215 associated with that jack. Incident to the establishment of this transmission path, the transmission and control paths 207 of the same subscriber line circuit that are connected to a set of verticals of the link circuit are made busy so that none of the trunk circuits 211—0 to 211—9 can gain access to the subscriber's line circuit 204—50. An operator at the outward switchboard answers the call by establishing a cord circuit connection to the jack 205—50 and ascertains by teletypewriter communication with the calling subscriber the identity of the called subscriber, assumed to be the station having the calling code 199. The call cannot be completed by extending the cord circuit connection from jack 205—50 to jack 205—199, because the jacks in outward switchboard 208 are for answering purposes only. Subscriber station 201—199 cannot be called by the establishment of a connection to jack 205—199, because the subscriber's line circuit 204—199 of the station 201—199 is so arranged that it will not establish a transmission path from jack 205—199 to the subscriber station as a result of any action that can be taken at the jack nor can the station be rung from that jack.

The call must be completed by the establishment of a transmission path from jack 205—50 in outward switchboard 208 to an idle one of the jacks 210—10 to 210—19 in the inward switchboard 213. W. V. K. Large Patent 2,222,672, referred to above, shows how calls being answered at the answering jacks in an outward switchboard may be extended to and completed at calling jacks at an inward switchboard. Upon the extension of a path from the outward switchboard 208 to the inward switchboard 213, a cord circuit connection is made to the jack of one of the cord circuits, perhaps jack 210—10.

This results in the seizure of the director circuit, under the control of a sequence circuit which is part of the trunk circuit, if the director circuit 214 is idle or when it becomes idle or available to that trunk circuit. Because the trunk circuits 212 serve only the subscriber lines having the calling designations 100 to 199, it is not necessary that the hundreds digit of the station designation be transmitted to the director circuit for decoding, but only the tens and units digits 99. The operator transmits codes representing this designation, the codes are decoded by the director circuit which tests the subscriber's line circuit 204—199 to determine that the subscriber station is idle. If the station is found to be idle, the director circuit establishes a connection between the particular trunk circuit and the subscriber's line circuit through the transmission and control conductor group 207—199 by the closure of appropriate cross-points in the link circuit. Thereupon, the operator rings subscriber station 201—199, and when the called subscriber answers by activating his station, telegraphic communication between stations 201—50 and 201—199 may proceed.

At the conclusion of the intercommunication, the subscribers deactivate their stations, thereby registering disconnect signals at the outward and inward switchboards 208 and 213, respectively. The cord circuit interconnections between a jack in each of the two switchboards are manually withdrawn from the jacks, the transmission and control connections through the link circuit are automatically restored, and the busy indications are removed. The trunk circuit that was in use is thus rendered available for another connection.

Calls originating at any one of the subscriber stations 201 for a station served by another switching center are extended at the switching center 203 to the remote switching center by a cord circuit interconnection of the appropriate answering jack 205 in outward switchboard 208 and a jack of a trunk circuit extending to the remote switching center. Calls coming into switching center 203 over a trunk from a remote switching center are extended to any one of the stations 201 by the establishment, by means of a cord circuit, of a connection from the jack terminating the trunk circuit from the remote switching center to one of the jacks 210 of trunk circuits 211 or 212 at inward switchboard 213, depending upon whether the station called has a designating number below or above one hundred. The connection is extended through the link circuit to the appropriate subscriber's line circuit under the control of the director circuit.

GENERAL DESCRIPTION

Referring now to Figs. 3 to 13 which represent the circuit schematic of the applicant's system, Fig. 3 shows the circuit arrangement at a local attended subscriber station.

Trunk circuit

This circuit provides means whereby an operator at the inward switchboard in the exchange office may complete or initiate calls to any one of 200 subscriber stations connected to a line concentrating unit by transmitting teledirecting teletypewriter character signals. The trunks are preferably set up in groups of ten each for each group of 100 subscriber station line circuits. The trunk circuit performs the following functions:

(1) This circuit provides a means for an operator at the inward switchboard to initiate or complete a call to a subscriber station line via the line concentrating unit.

(2) It contains the necessary sequence for a maximum group of 20 trunks to obtain access to the director circuit.

(3) It is arranged to convert single transmission of the cord circuit at an inward switchboard position into duplex transmission for use with the director circuit.

(4) The sequence portion of this circuit provides for only one trunk at a time to gain access to the director circuit.

(5) This circuit is arranged to pass to the cord circuit at an inward switchboard position a signal when the director circuit is ready to receive call directing signals.

(6) It is arranged to operate the selecting magnets of the link circuit switches which are assigned to this trunk.

(7) It is arranged to connect the director circuit to a specific group of 100 subscriber line circuits with which this trunk is associated.

(8) When a connection is made from this circuit to a subscriber line circuit a clear transmission path is available to the subscriber station for ringing and communication.

(9) The disconnection of the trunk circuit cannot take place until both the operator at the exchange office and the subscriber at the called station have released the connection at their respective termini.

(10) This trunk circuit is arranged to be locked out under certain trouble conditions on either a temporary or permanent basis depending upon the type of trouble.

(11) It may be made busy by the operation of a busy key at the concentrating unit.

Director circuit

The director circuit provides an unattended switching arrangement whereby a small group of trunk circuits extending from the exchange office may serve a large number of subscriber station line circuits connected to the line concentrating unit. It functions only on inward calls from the exchange office, receiving and deciphering the signals transmitted when the operator types the corresponding numerals on the teletypewriter, and causing the selection of the proper subscriber line circuit. Its functions are as follows:

(1) Upon receipt of an inward call from the inward switchboard the sequence portion of the selected trunk circuit will connect the director circuit to the selected trunk circuit on which the call is waiting, the sequence portion of each trunk circuit being connected in two chain paths which extend through the trunk circuits of a group and serve to make the first idle trunk circuit of the group available for a call. The distributor motor in the director circuit is then automatically started and after it has attained proper speed, a "director ready" signal will be automatically transmitted to indicate to the switchboard operator that the call may be routed through the line concentrating unit.

(2) The distributor motor will be stopped after the director has been dismissed unless there is another incoming call awaiting completion. In the latter case the motor will be kept running but the other parts of the circuit will be restored to normal awaiting the new call.

(3) The start magnet is held operated while the distributor motor is attaining to speed to reduce clutch drag.

(4) A "Figures" teletypewriter character signal received from the inward switchboard will indicate that the operator has recognized the "director ready" signal and will cause the director to accept the next two teledirecting teletypewriter character signals transmitted from the operator's teletypewriter at the inward switchboard, the two character signals representing the tens and units digits of the calling number of the called subscriber station which is in the group of one hundred stations served by the trunk group selected by the operator.

(5) Each of the teledirecting character signals received from the inward switchboard are separated into dot elements by the receiving distributor causing the proper selection, or fan, relays to be operated.

(6) Upon receipt of the first teledirecting character signal representing the tens digit of the number of the called subscriber line circuit, the director circuit will select the tens group of the particular group of 100 subscriber lines which contain the desired subscriber line circuit.

(7) Upon receipt of the second signal representing the units digit of the number of the called subscriber line circuit, the director circuit will select and test the desired subscriber line circuit in the selected tens group, and disregard any additional character signal transmitted to the director circuit.

(8) If the called subscriber line circuit has been made out-of-order a series of "Q" teletypewriter signals will be automatically transmitted as an indication of this condition to the operator at the inward switchboard.

(9) If the called subscriber line circuit is busy because of the existence of a previously established call or because of busy condition being placed on it by the test circuit, a series of "K" signals will be automatically transmitted to the operator at the inward switchboard.

(10) If the operator at the inward switchboard has transmitted signals representing digits of a number for which no subscriber line is assigned or has transmitted an impossible combination of digit signals a series of "V" signals will be automatically transmitted to such operator.

(11) If the called subscriber line circuit is idle the director circuit will cause the link circuit to connect the subscriber's line circuit to the selected trunk circuit. The director circuit will then be released and restored to the idle condition in preparation for the routing of the next inward call.

(12) The miscellaneous alarm circuit is arranged to allow two seconds for the director circuit to become off-normal, four seconds to complete a self-imposed preliminary test and give satisfactory evidence to the alarm circuit and a total of ten seconds for the director circuit to complete its task at any event.

(13) If the director circuit is not off-normal in two seconds, the miscellaneous alarm circuit removes the calling trunk circuit from service but puts the director circuit back into service.

(14) If the director circuit becomes off-normal but the distributor motor fails to attain the necessary speed in another four seconds, the director circuit is removed from service but the trunk circuit is taken out temporarily. A supervisory lamp of the director circuit lights and a minor alarm is sounded.

(15) If the director circuit is not released in ten seconds a re-order signal, that is, a series of "T" signals will be automatically transmitted to the operator at the inward switchboard for a period of one second followed by a disconnect condition.

(16) If the "director ready" signal fails to reach the associated loop repeater in the trunk circuit or a mark from the trunk circuit is not registered in the distributor circuit, both the director and trunk circuits are removed from service. In this case the minor alarm is sounded and appropriate tell-tale lamps are lighted.

(17) In a line concentrating unit containing two director circuits in the case of the condition described in items (14) and (15), the miscellaneous alarm circuit after freeing the director circuit in trouble from the sequence portion of the selected trunk causes the transfer portion of the director circuit to function removing the disabled director circuit from service and replacing it by the spare director circuit.

(18) The spare director circuit is readily adaptable to function as in item (4) except that it will accept the next two character signals as the called subscriber's station number of the particular hundreds group.

For a system having more than 100 subscriber line circuits, as described herein, there is provided in the director circuit a second trunk circuit group relay (relay 10–GH1') which is controlled by the trunk circuits of a second group of ten trunk circuits to which are assigned a second hundreds subscriber line circuits or fraction thereof.

Link circuit

The link circuit shown in Fig. 5 is a diagrammatic representation of a crossbar switch with horizontal groups of connections leading to the respective trunk circuits and the vertical groups of connections respectively leading to the subscriber line circuits. A full understanding of the crossbar switch may be had by reference to the following patents:

1,953,503, J. N. Reynolds, Apr. 3, 1934
2,021,329, J. N. Reynolds, Nov. 19, 1935
2,040,334, J. N. Reynolds, May 12, 1936
2,039,630, J. A. Burrell, May 5, 1936
2,039,644, D. H. Gleason et al., May 5, 1936

The link circuit in its idle condition has all its selecting and "Hold" magnets in released condition and the normally closed make-before-break contact of the "Hold" magnet for each of the subscriber station line circuits is connected to the ring conductor side of the subscriber line circuit, such contact being maintained closed for outward calls, that is, calls originating at the subscriber station and completed by an operator at the outward switchboard in the exchange office. It is arranged to perform the following functions:

(1) When a selecting magnet and a "Hold" magnet are operated in the proper sequence, the trunk circuit with which the selecting magnet is associated will be connected to the subscriber line circuit with which the "Hold" magnet is associated.

(2) When the "Hold" magnet is operated it will lock under the control of the selected trunk circuit in order that the selecting magnet may be released.

(3) The operation of the "Hold" magnet causes the off-normal contact to connect the transmission path of the trunk circuit to the subscriber line circuit and operate the sleeve relay of the trunk circuit.

(4) The off-normal contact of a selecting magnet advises the miscellaneous alarm circuit that the selecting magnet is operated.

*Subscriber station line circuit*

This circuit provides a subscriber line termination for establishing a connection for an outward call from a subscriber station to the outward switchboard in the exchange office and an inward call from the inward switchboard through the line concentrating unit to the subscriber station. The functions of this circuit are as follows:

(1) This circuit is arranged to light a supervisory lamp at the outward switchboard on an outward call and make its respective conductor extending to the director circuit busy for inward calls.

(2) The subscriber line circuit is not available to the director circuit for inward calls unless the subscriber station is in the disconnect (inactive) condition and there is no cord circuit plugged into the jack or a multiple jack thereof representing an answering appearance of that subscriber line at the outward switchboard.

(3) When connection to the subscriber line circuit is made for an inward call the sleeve relay of the selected subscriber line circuit is operated making all jack multiple appearances of that subscriber line at the outward switchboard busy to a sleeve test by an operator at any one of the outward positions at which a multiple jack is located.

(4) The line relay in this circuit indicates the connect (active) or disconnect (inactive) condition of the subscriber station.

(5) The "Hold" magnet of the link circuit associated with this subscriber line circuit forms a part of the line circuit.

(6) The "Hold" magnet is held locked under the control of the trunk circuit. The outward appearance of the line circuit at the outward switchboard is therefore held busy until such trunk circuit is released by an operator at the inward switchboard.

(7) Jacks are provided for testing the subscriber line circuit toward the line and toward the equipment.

(8) A jack is provided for making the line circuit busy, or out-of-order, to the director circuit.

(9) This circuit is equipped with resistors for adjusting the loop current therein.

*Miscellaneous alarm circuit*

This miscellaneous alarm circuit designed for use in the line concentrating unit is arranged primarily to time the interval during which the sequence portion of the trunk circuit is in use, and is arranged to give appropriate alarms, if a specified time limit is exceeded, giving at the same time an indication of the possible circuits in trouble. The circuit is also arranged to give an alarm when the battery or ground connection chain of the sequence portion of the trunk circuit remains open. The circuit performs the following functions:

(1) On an inward call to a subscriber station the miscellaneous alarm circuit begins timing. When the inward call has received preference from the sequence portion of the selected trunk circuit, and the time required to obtain a director circuit exceeds 2.5 seconds, an alarm is given. In this case the miscellaneous alarm circuit is arranged to cause the removal from service, of the selected trunk circuit in trouble, flash the lamp associated with such trunk circuit and at the same time light a supervisory lamp and bring in a minor alarm.

(2) After removing the particular trunk circuit from service the miscellaneous alarm circuit is arranged to detect the ability of the sequence portion of the trunk circuit to return to normal and to light a sequence lamp, and bring in a major alarm if it fails to do so within one-half second after removing the trunk circuit.

(3) When the miscellaneous alarm circuit receives a signal that the director circuit has moved off normal, it waits a total of four seconds for the director circuit to place ground on a conductor terminating in the miscellaneous alarm circuit. The director circuit places ground on this conductor if the distributor motor has attained speed, and if the "director ready" signal has been transmitted.

(4) If the miscellaneous alarm circuit times out before the second-mentioned conductor under item (3) is grounded, but after the first-mentioned conductor under item (3) was grounded, the circuit is arranged to do the following: (a) to cause the associated director circuit to lock in a disabled, or "stuck," condition; (b) to bring in an audible and visual alarm associated with the director circuit; (c) after the director circuit has been locked in a "stuck" condition to remove the trunk circuit from service under control of a key at the miscellaneous alarm circuit and cause a lamp associated with this trunk circuit to flash, and if two certain conductors extending from the miscellaneous alarm circuit are grounded in the director circuit when the alarm circuit times out, the miscellaneous alarm circuit will cause the trunk circuit to be removed from service temporarily under control of the sleeve of a jack in the inward switchboard position and cause a lamp associated with the trunk circuit to light steadily; (d) after allowing approximately one-half second the director circuit having been locked in a "stuck" condition, the miscellaneous alarm circuit is arranged to test for failure of the sequence portion of the trunk circuit to release, and to bring in an audible major alarm and light the sequence lamp if the sequence portion fails to release; and (e) if the sequence portion has been released the miscellaneous alarm circuit is arranged to replace the "stuck" director circuit with the spare director circuit.

(5) If the second-mentioned conductor in item (3) is grounded the miscellaneous alarm circuit permits the director circuit ten seconds to complete all its functions.

(6) If the miscellaneous alarm circuit times out after ten seconds it is arranged to function as follows: (a) it connects a source of "T" signals to the selected trunk circuit for one second as a re-order signal and then removes the trunk circuit from service under control of the jack sleeve, and also, it lights a lamp associated with the trunk circuit but returns the director circuit to service; and (b) after approximately one-half second test for failure of the sequence portion of the trunk circuit to release, and if the sequence portion fails to release, brings in an audible major alarm and lights the sequence lamp.

(7) The miscellaneous alarm circuit in taking a director circuit out of service will give a minor alarm provided the spare director circuit is not in trouble, but if the second director circuit is in trouble the circuit will give a major alarm.

(8) The circuit is arranged to permit manual transfer from one director circuit to another at a time when the sequence portion of the selected trunk circuit is not in use for the routing of a call through the exchange office and when the director circuit to which the trunk circuit has been transferred, is not in trouble.

(9) The circuit is arranged to prevent the use of the sequence portion of a trunk circuit on a new call for one-half second after the sequence portion has been returned to normal after timing out.

(10) The circuit is provided with keys associated with each type of trouble indicated, to permit removal of the audible alarm but leaving a lamp to indicate the trouble condition, and also it is equipped with keys to release the locked-in trouble indication and with an alarm cut-off key which prevents the alarm circuit from timing out.

(11) This circuit is arranged to light a connection lamp as an indication that a selecting magnet of the link circuit has been operated.

(12) This circuit is arranged to prevent the director circuit from interfering with the miscellaneous alarm circuit when both director circuits fail.

(13) If the battery or ground chain of the sequence portion of the trunk circuit remains open for approximately forty-five seconds the miscellaneous alarm circuit is arranged to give a major alarm and light a sequence battery or sequence ground lamp to indicate which chain is open.

(14) This circuit is arranged to prevent the routing of a call if the selecting magnet of a link circuit is falsely operated and to give an alarm if this condition persists for approximately forty-five seconds.

DETAILED DESCRIPTION

Method of operation

INWARD CALL

*Operator originates a call*

*Trunk circuit*

An operator at the inward switchboard originates a call by inserting the calling end of a cord circuit into a jack connected to the first idle trunk circuit of a selected group extending to the line concentrating unit to which the desired subscriber station line is connected, the first idle trunk circuit being indicated by an idle indicating lamp. The cord circuit may preferably be of the type disclosed in Figs. 25 and 26 of the C. W. Lucek Patent 2,228,279 granted January 14, 1941, which is hereby made a part of the present application as if fully included herein. The insertion of the calling end, or plug, of the cord circuit into jack 601 which herein represents at the inward switchboard in the exchange office the terminus of the first idle trunk circuit in the selected group operates at the concentrating unit sleeve relay 6–SL and the ground connected to the back contact and upper armature of relay 6–DR extends over conductor 602, tip spring of jack 601, for causing the cord circuit call lamp (not shown but corresponding to lamp 2519 in Fig. 25 of Lucek Patent 2,228,279) to light.

Sleeve relay 6–SL, upon operating, (1) completes at its innermost lower armature and front contact the transmission circuit which extends from grounded positive battery connected to the ring conductor of the selected cord circuit, ring spring of jack 601, conductor 603, conductor 604, make-before-break contact of relay 6–C, through the upper, or operating, winding of polarized receive relay 6–R of the repeater, conductor 605, armature and spacing, or left-hand, contact of polarized send relay 6–SD of the repeater, to grounded positive battery, relay 6–SD being at this time in its spacing position because a circuit path extending to the director circuit through the operating, or lower, winding of relay 6–SD is open at armature No. 1 and front contact of relay 6–AL and the biasing current in the secondary, or upper, winding of relay 6–SD flows in a spacing direction; (2) connects ground at its middle lower armature and front contact to conductor 606 to close a path extending through the biasing, or lower, winding of relay 6–R, conductor 605, armature and spacing contact of relay 6–SD, to grounded positive battery which path permits current to flow through the biasing winding of relay 6–R in a marking direction to immediately operate relay 6–R to its marking, or right-hand position; (3) connects at its outer upper armature and front contact a ground connection in addition to that furnished by relay 6–SV for the subsequent operation of relay 6–S; (4) connects ground at its inner upper armature and front contact to a path extending over conductor 607, upper armature and back contact of relay 6–C, conductor 608, through the winding of relay 6–ST, conductor 609, back contact and outer lower armature of relay 6–BO, to grounded negative battery and relay 6–ST operates; and (5) closes at its outermost lower armature and front contact an obvious operating circuit for busy relay 6–BY and relay 6–BY operates.

Relay 6–BY, upon operating, (1) connects grounded negative battery at its outer upper armature and contact to a path extending over conductor 610, through the secondary, or upper, winding of sleeve relay 6–SL, multiple conductor 611 of the sleeve of jack 601, the sleeve of jack 601 being connected in multiple to corresponding jacks at other switchboard positions whereat the same trunk circuit has terminations and whereat a busy test is had when the operator at one of the other switchboard positions attempts to select the same trunk circuit for another call connection by touching the tip of a cord circuit at such other switchboard position to the sleeve of the multiple jack of the trunk circuit at such other switchboard position; and (2) provides at its inner upper armature and front contact a locking ground connection in preparation for the operation of relay 6–DR.

*Connection of trunk circuit to a director circuit*

Figure 6:
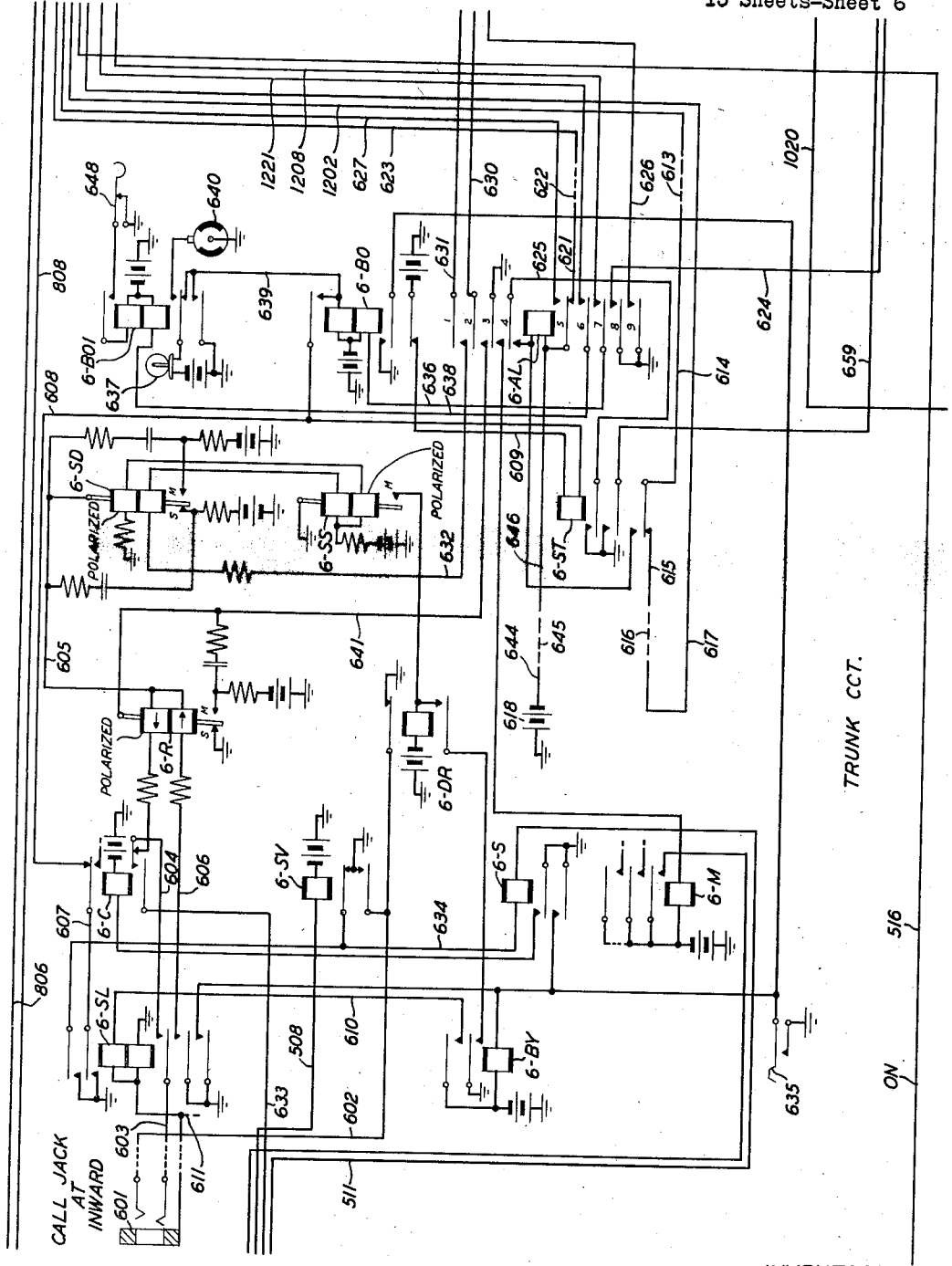
Fig. 6 shows a trunk circuit equipment at the concentrating unit which is wholly located within the premises of the teletypewriter exchange office.
Figure 7:
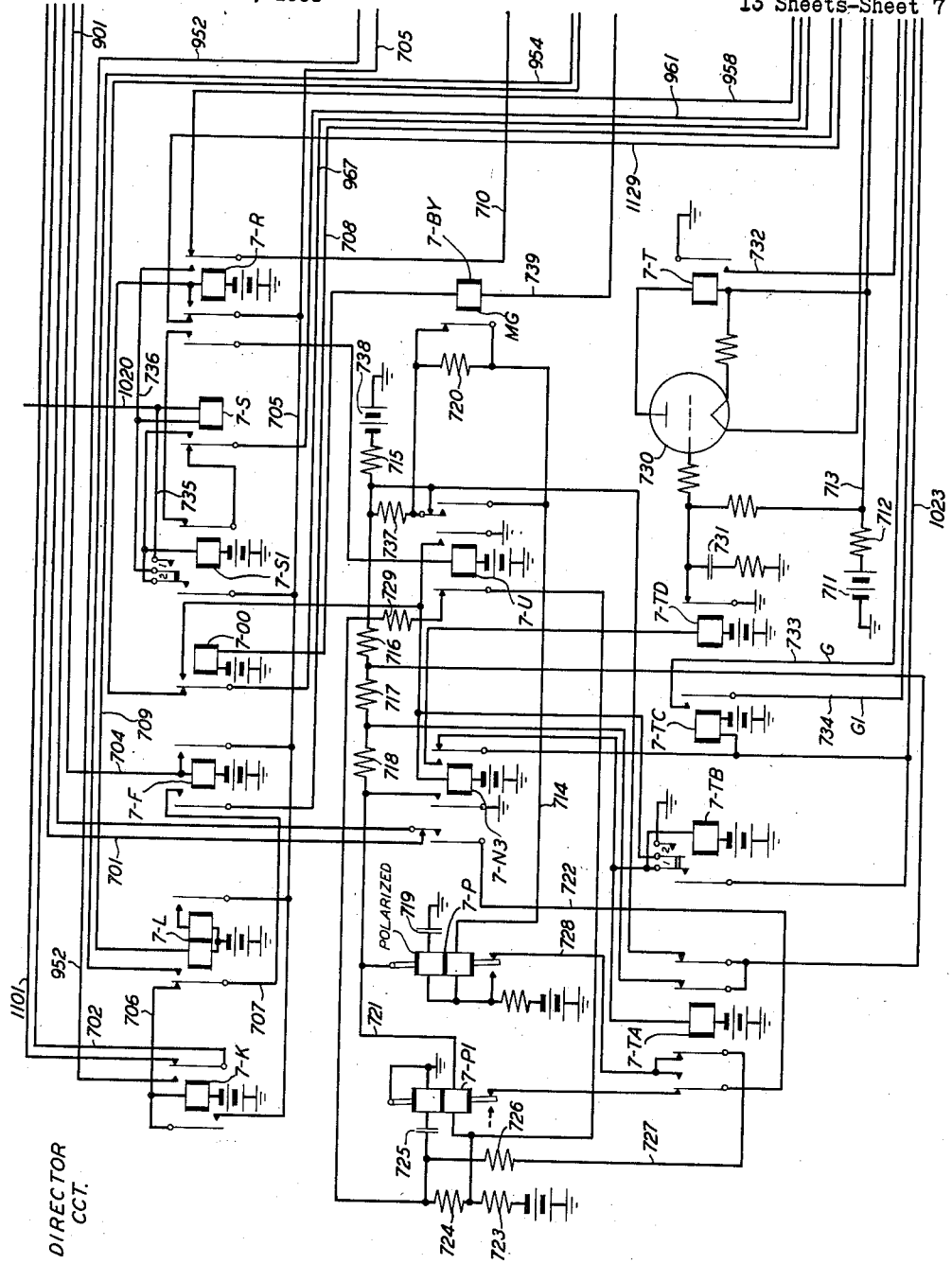
Figure 8:
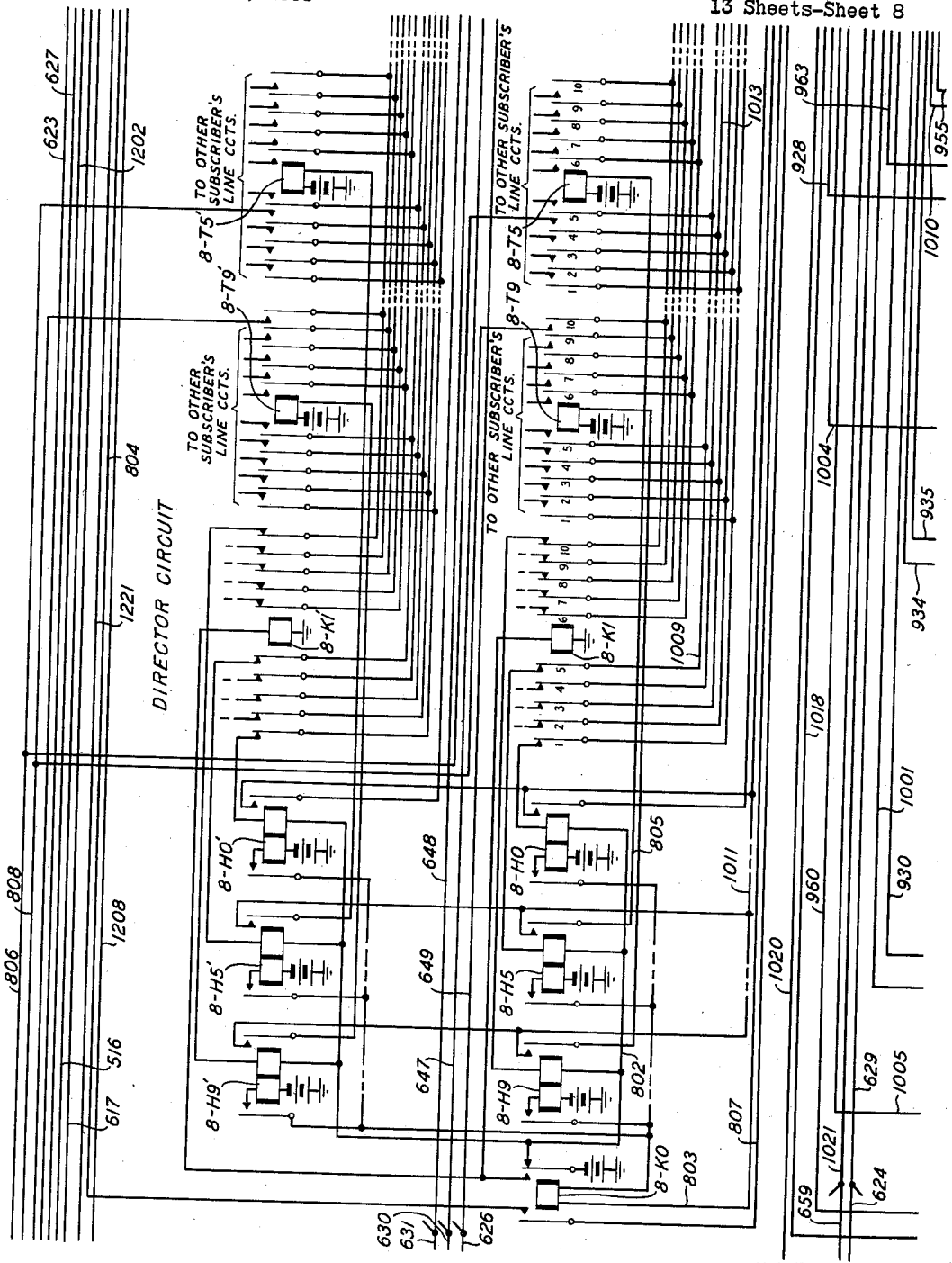
Figure 9:
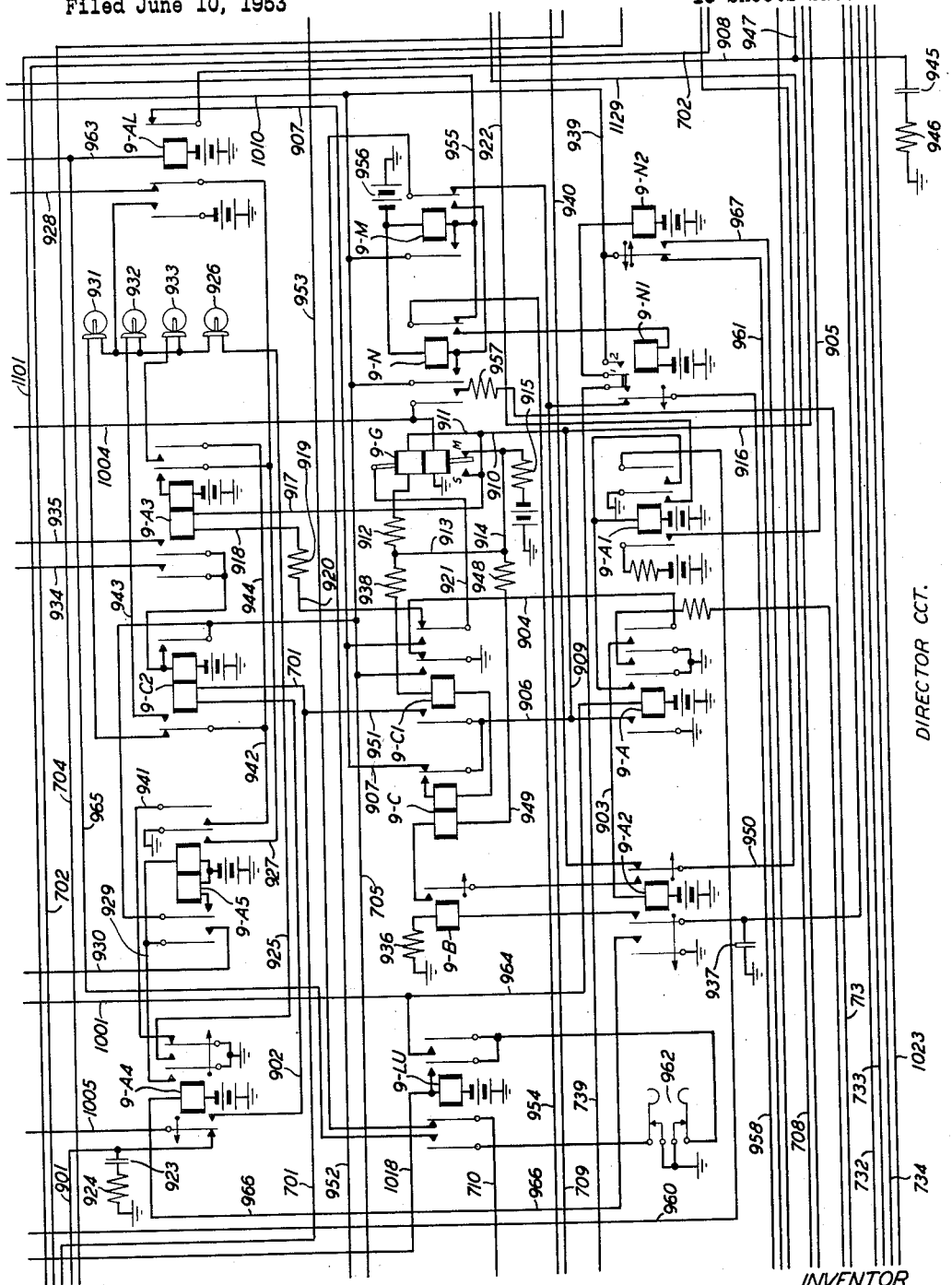
Figure 10:
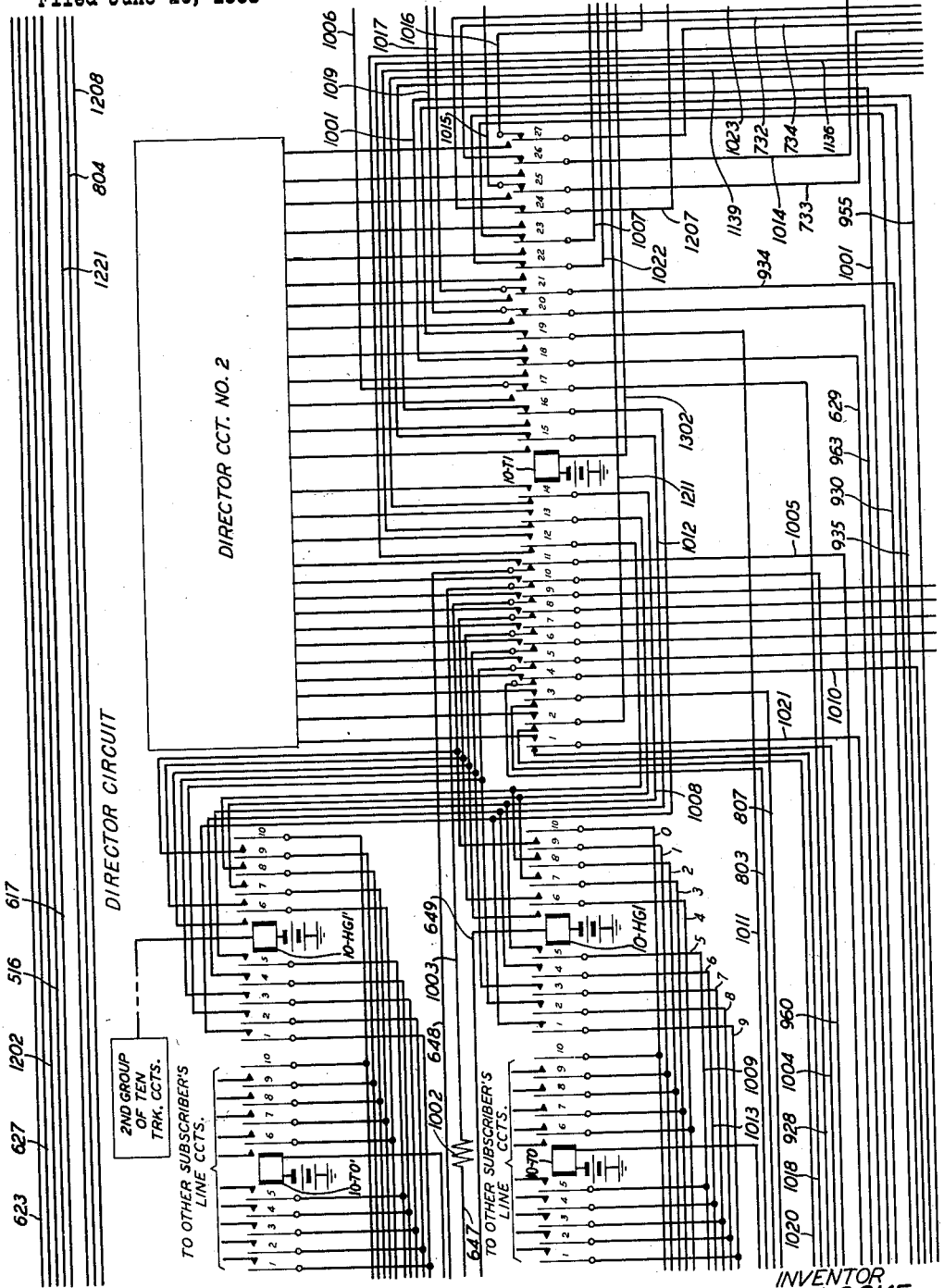
Figure 11:
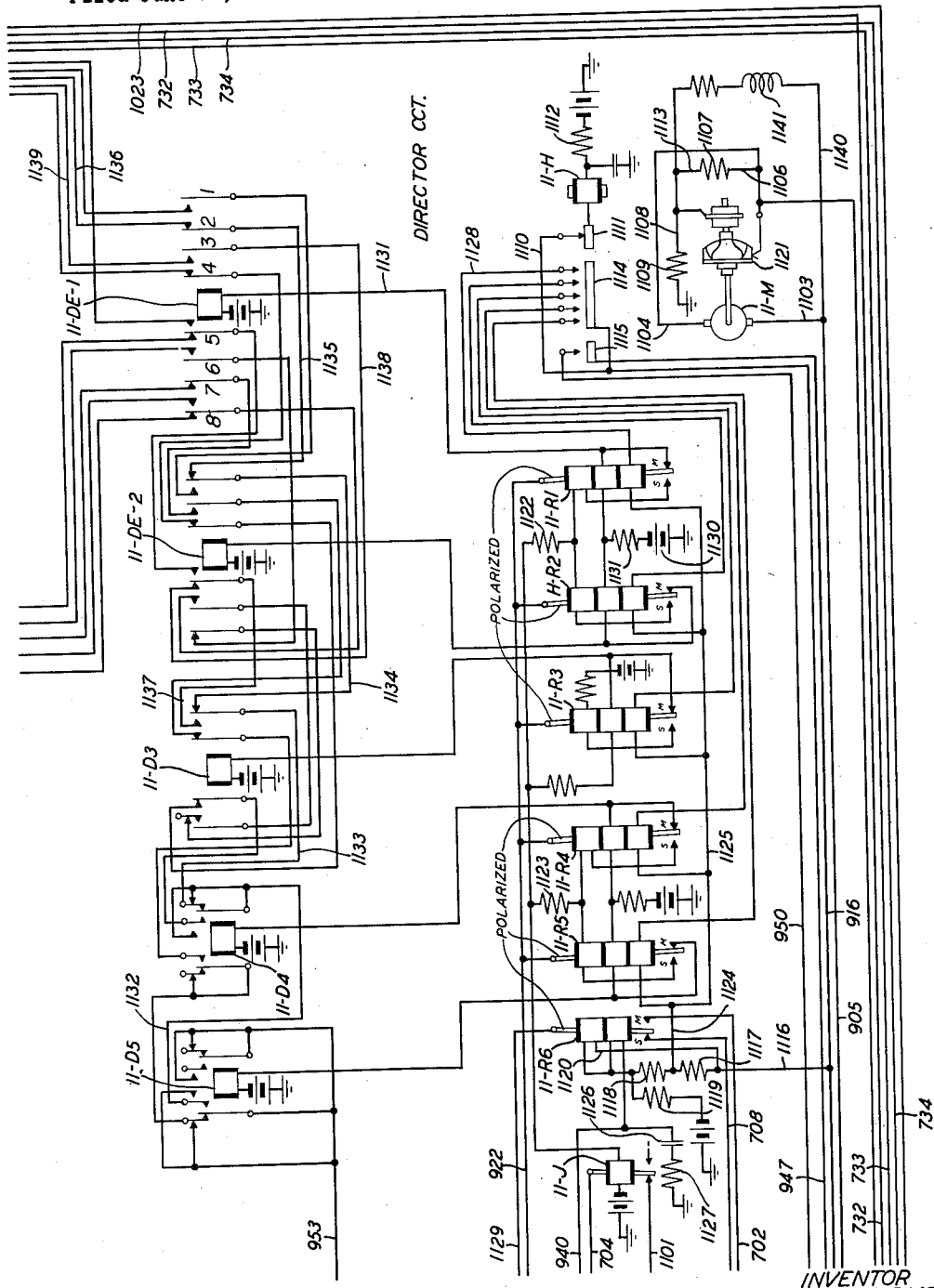

Relays 6–ST and 6–AL form the sequence portion of the trunk circuit shown in Fig. 6 and are the basis of two chain circuit paths, a ground chain and a battery chain. The ground chain is connected through the normally closed outermost lower armature and back contact of relay 6–ST which at this time is in an operated condition. Normally, the ground connection is obtained from the upper armature and back contact of relay 12–CS in the miscellaneous alarm circuit and is the terminus of a path extending over conductor 1201, back contact and outer lower armature of relay 12–D, conductor 1202, dash-line section 613 representing the extension of the path through the outermost lower armature and back contacts of the corresponding ST relays in the preceding trunk circuits of the two groups of ten trunk circuits serving 200 or less subscriber line circuits, conductor 614, outermost lower armature and back contact of relay 6–ST, conductor 615, dash-line section 616 representing the extension of the path through the outermost lower armatures and back contacts of the corresponding ST relays in the succeeding trunk circuits of the trunk groups, conductor 617, through the winding of the sequence ground relay 12–SG of the miscellaneous alarm circuit, to grounded negative battery. The outermost lower armatures and back contacts of the ST relays in all the trunk circuits are normally closed and therefore relay 12–SG in the miscellaneous alarm circuit is normally operated when the sequence provision is not in use. Therefore, the ground connection at the upper armature and back contact of relay 12–CS is normally connected to the outermost lower armature and back contact of the ST relay in the first trunk circuit of the unit.

Battery connection 618 is normally connected to a path extending over conductor 644, dash-line section 645 representing a series connection over the fifth armature from the top, and back contact of each of the AL relays corresponding to relay 6–AL, in the trunk circuits succeeding the trunk circuit shown in Fig. 6, conductor 646, over armature No. 5 and back contact of relay 6-AL, conductor 621, dash-line section 622 representing a series connection over the fifth armature and back contact of each of the AL relays corresponding to relay 6-AL, in the preceding trunk circuits, conductor 623, through the winding of the sequence battery relay 12-SB in the miscellaneous alarm circuit, to ground. As hereinbefore stated, relay 12-SB is normally held operated through the latter path extending from grounded battery 618 when the sequence provision is not in use.

When, therefore, relay 6-ST is operated, and all the corresponding ST relays in the preceding trunk circuits of the unit become normal, whereby the ground connection at the upper armature and back contact of relay 12-CS is present on conductor 1202, and if all the succeeding AL relays are normal, relay 6-AL will operate. Also, relay 6-ST upon operating, provides at its front contact and innermost lower armature a locking circuit for the relay 6-AL, the locking circuit being traceable from grounded negative battery 618, through the armatures and their respective back contacts corresponding to armature No. 5, and back contact of relay 6-AL, of the trunk circuits succeeding the trunk circuit shown in Fig. 6, conductor 646 through the winding, front contact and armature No. 4 of relay 6-AL, conductor 625, innermost lower armature and front contact of relay 6-ST to ground.

Relay 6-AL, when operated, (1) provides at its armature No. 8 and front contact a ground connection for conductor 624 which extends to common conductor 629 of the director circuit for use in holding in operation the motor of the director circuit distributor if such motor has been previously started as will be hereinafter described; (2) closes at its No. 3 armature and front contact an obvious operating circuit for relay 6-M and relay 6-M operates to operate the selecting magnets 5-SA4, 5-SB4, etc., each of these selecting magnets to indicate all the contact sets in a horizontal row at each of the crossbar switches, all the contact sets so indicated being connected to the selected trunk circuit (the contact set selected for completing the connection of the selected trunk circuit to the called subscriber line circuit will subsequently be operated by a "Hold" magnet which will operate upon the selection of the called subscriber line circuit by the director circuit in response to the call directing signals as will be hereinafter described); (3) connects at its armatures Nos. 6 and 7 and their respective front contacts paths extending from grounded negative batteries through the respective lower windings of relay 6-BO1 and relay 6-BO, and interconnected at the upper armature and back contact of relay 12-AB in the miscellaneous alarm circuit for a function to be hereinafter described; (4) connects ground at its armature No. 9 and front contact to a path extending over conductor 626, common conductor 649 of the direct circuit, through the winding of relay 10-HG1 to grounded negative battery, and relay 10HG1 operates whereby the director circuit is connected to the desired group of 100 subscribers' lines which are served by the trunk group of which the trunk circuit shown in Fig. 6 is a part; (5) closes at its armature No. 5 and front contact a path extending from grounded negative battery 618, the fifth armature from the top and its back contact of each of the AL relays in the trunk circuits succeeding that shown in Fig. 6, armature No. 5 and front contact of relay 6-AL, conductor 627, conductor 628 common to the conductors corresponding to conductor 627, of the other trunk circuits, through the winding of time start relay 12-ST in the miscellaneous alarm circuit, and relay 12-ST operates to begin to time for the completion of a call; (6) connects at its armature No. 2 and front contact the armature of receive relay 6-R to a path extending over conductors 641 and 630, common conductor 647, resistor 1002, conductor 1003, back contact and armature No. 9 of relay 10-T1, conductor 1004, through the lower winding of relay 9-G, to ground and relay 9-G responds to the call directing impulses representing the called subscriber station number and repeated by receive relay 6-R; and (7) connects at its armature No. 1 and front contact the upper winding of relay 6-SS and the lower winding of send relay 6-SD, in series, to a path extending over conductor 631, common conductor 648, back contact and armature No. 10 of relay 10-T1, conductor 1005, left-hand armature and back contact of relay 9-A4, condenser 923, resistor 924, to ground. Also, selecting magnets 5-SA4, 5-SB4, etc., upon operating, close at their respective armatures operating paths extending over conductor 516, through the winding of relay 12-D in the miscellaneous alarm circuit, to grounded negative battery and relay 12-D operates to prepare at its upper armature and front contact a grounded path for testing called subscriber line circuits for busy, or idle, condition. The inward transmission path which includes conductor 641, is now in marking condition and the outward transmission path which includes conductor 632 is now prepared to transmit to the inward switchboard position where the call was initiated, the "director ready" or such busy signals as are generated in the director circuit. The path closed at armature No. 8 of relay 6-AL at a time when distributor motor 11-M is idle, operates, in turn, relays 9-A, 9-A1, 9-A2, 9-A3, 9-A4 and 9-A5 in the director circuit to start motor 11M, the path for operating relay 9-A extending over conductors 624 and 629, armature No. 18 and back contact of director transfer relay 10-T1, conductor 1001, through the winding of relay 9-A, to grounded negative battery. Relay 9-A, upon operating, operates relay 9-A1, which upon operating, starts motor 11-M. Also, relay 9-A, upon operating, prepares the director circuit for transmitting to the operator at the inward switchboard a marking impulse as a "director ready" signal; and (2) causes the director circuit to prepare itself, as will be hereinafter described, for receiving the directing signals of the call number of the called subscriber station. When the director circuit is ready to receive such call directing signals ground at the outer left-hand armature and front contact of relay 9-A2 will be connected to a path traceable over conductor 966, through the winding of relay 9-A4 to grounded negative battery and relay 9-A4 will operate to connect the necessary ground at its front contact and left-hand armature to conductor 1005 in a circuit path extending over armature No. 10 and back contact of relay 10-T1, conductors 648 and 631, armature No. 1 and front contact of relay 6-AL, conductor 632, through the lower winding of relay 6-SD, through the upper winding of relay 6-SS, to grounded negative battery and now both relays 6-SD and 6-SS will at this time operate to their respective marking positions.

Relay 6-SD in its marking position, establishes a transmission path which extends over conductor 605, through the upper winding of receive relay 6-R, make-before-break contact of relay 6-C, conductor 604, front contact and innermost lower armature of relay 6-SL, conductor 603, ring spring of jack 601, to grounded positive battery in the cord circuit and relay 6-R is held in its marking position. Relay 6-SS, upon operating to its marking position, closes an obvious operating circuit for "director ready" relay 6-DR whch will lock operated in a path traceable to ground at the inner upper armature and front contact of busy relay 6-BY. Also, relay 6-DR upon operating, removes at its upper armature and back contact the ground connection from the path extending over conductor 602, tip spring of jack 601, to the lamp in the cord circuit whereby the cord lamp (not shown) will flash to indicate that the director circuit is ready to receive the call directing signals. The inward transmission path is now in its marking condition.

*Director circuit*

After the operator at the inward switchboard has seized the first idle trunk circuit of the group to which the called subscriber line circuit is assigned and the sequence portion of the seized trunk circuit such as relays 6-ST and 6-AL of the trunk circuit shown in Fig. 6 have connected the seized trunk circuit to the director circuit, the "director ready" signal is automatically transmitted from the director circuit to the operator in a manner as hereinafter described. The inward transmission path from the trunk circuit to the director circuit changes to a marking condition as hereinbefore stated, and extends over conductor 641, the front contact and armature No. 2 of relay 6-AL and conductors 630 and 647 to the director circuit and the outward transmission path to the subscriber station line extends from the director circuit into the trunk circuit over conductors 648 and 631, armature No. 1 and front contact of relay 6-AL and conductor 632, through the lower winding of send relay 6-SD and the upper winding of relay 6-SS to grounded negative battery. The sequence portion of the seized trunk circuit upon having seized a director circuit connected ground at armature No. 8 and front contact of relay 6-AL to an operating path for relay 9-A and relay 9-A operated. Relay 9-A, upon operating, (1) closes at its innermost right-hand armature and front contact an obvious operating path for relay 9-A1 which operates; (2) closes at its outermost right-hand armature and front contact a path extending from grounded negative battery, through the winding of relay 9-A2, conductors 903 and 904, back contact and inner right-hand armature of relay 9-C1, to ground and relay 9-A2 operates, relay 9-C1 being in a released condition at the time; and (3) applies ground at its left-hand armature and front contact to eight different paths; (a) one extending over conductor 906, right-hand armature and back contact of relay 9-C, conductor 907, right-hand armature and back contact of relay 9-AL, conductors 908, 947 and 1110, the contact in engagement with start segment 1111 of the distributor, through the winding of start magnet 11-H, resistor 1112, to grounded negative battery and start magnet 11-H operates, the operation of the start magnet 11-H permitting rapid acceleration of the motor by eliminating clutch drag; (b) another extending over conductors 909, 916 and 1116, resistor 1117, conductor 1124, through the lowermost winding of each of relays 11-R5, 11-R4, 11-R3, 11-R2 and 11-R1, in parallel, to the respective contacts in engageable relation, in turn, with receiving segment 1114 of the distributor (relays 11-R1 to 11-R5 register each signal, in turn, repeated by relay 9-G); (c) another extending over conductors 909, 910 and 911, through the primary, or upper, winding of relay 9-G, resistor 912, conductors 913 and 914, resistor 915, to grounded negative battery; (d) still another extending over conductors 909 ad 916 to the stop segment 1115 of the distributor; (e) another extending over conductors 909, 910 and 917, through the primary, or left-hand, winding of relay 9-A3, conductor 918, resistor 919, conductor 920, back contact and outermost right-hand armature of relay 9-C1, conductor 921, armature and marking contact of relay 9-G, resistor 915, to grounded negative battery and relay 9-A3 operates when relay 9-G is in its marking position due to marking signal current being received from receive relay 6-R in the trunk circuit repeater over a path traceable over conductor 641, front contact and armature No. 2. of relay 6-AL, conductors 647 and 630, resistor 1002, conductor 1003, back contact and armature No. 10 of relay 10-T, conductor 1004, through the lower winding of relay 9-G, to ground; (f) another extending over conductors 909, 916 and 1116, resistors 1117 and 1118 of a potentiometer, resistor 1119 to grounded negative battery, the potentiometer including the ground connection at the left-hand armature of relay 9-A, being later used in operating register relays 11-R1 to 11-R5; (g) another extending over the same path as described in item (f) above, except that it branches off before reaching resistor 1117 and extends over conductor 1120, through the upper winding of relay 11-R6, resistor 1119, to grounded negative battery whereby relay 11-R6 is biased to its spacing position; and (h) another extending to the left-hand armature of relay 9-C1 which path is used to start the "director ready" signal back to the operator at the inward switchboard.

Relay 9-A1, upon operating, closes at its left-hand armature and front contact a path extending from grounded negative battery, conductor 905, then in parallel paths, one over conductor 1103, armature 11-M of the distributor motor, conductors 1104 and 1106, resistor 1107, conductor 1113 and the other over conductor 1140, and field winding 1141 of the motor, the parallel paths continuing over common conductor 1108, resistor 1109, to ground whereby the motor is started. The distributor may be of the type shown in Fig. 16 of C. W. Lucek Patent 2,489,916 granted November 29, 1949, wherein the motor has a voltage regulator, or governor, preferably of the type shown in J. H. Sole Patent 1,860,556 granted May 31, 1932. The distributor is shown herein merely as circuit contact means having contacts in engageable relation with segments, whereas actually, its structure is somewhat like that shown in Lucek Patent 2,489,916. The distributor segments hereni shown are spring contacts respectively controlled by cams fixedly mounted on a rotatable shaft, which are controlled by start magnet 11-H. Start segment 1111 corresponds to auxiliary start cam ASC in the Lucek Patent 2,489,916, which, in its normal position, holds a pair of spring contacts closed.

Also, relay 9-A1 upon operating (1) applies ground at its inner right-hand armature and front contact to a path extending over conductor 922 to the armatures, in parallel, of relays 11-R1 to 11-R5, which permits these relays to lock in either direction in which they may be operated at the time; and (2) closes at its outer right-hand armature and front contact a holding path for itself traceable over conductor 960, back contact and armature No. 1 of relay 10-T1, conductors 1021 and 659, to ground at the middle lower armature of relay 6-ST. The contacts on the voltage regulator, or governor, 1121 are closed while the motor is coming up to its regular speed. While the armature 11-M of the motor is attaining speed, the distributor cams are successively operating causing brief closures of each receiving contact, in turn, with segment 1114. The motor is kept running under the control of the sequence portion of the trunk circuit as long as the call is awaiting completion. Relays 11-R1 to 11-R5 will therefore operate and lock in the spacing direction due to these closures to ground. The spacing and locking paths of relays 11-R1 and 11-R2 are through resistor 1122 and the winding of relay 11-J, to grounded negative battery and those of relays 11-R4 and 11-R5 are through resistor 1123 and the winding of relay 11-J to grounded negative battery. Therefore, relay 11-J will operate as soon as any one of relays 11-R1, 11-R2, 11-R4 or 11-R5 operates to spacing. This operation of relay 11-J opens at its armature and left-hand contact the operating path of relay 7-F thereby preventing its premature operation.

Relay 9-A2, upon operating, (1) in effect, places at its inner left-hand armature and contact the sensitive but slow-to-release relay 9-B across the contacts of governor 1121 whereby relay 9-B operates when the motor reaches full sped as hereinafter described; (2) prepares in advance at its right-hand armature and front contact an operating path for fast operating relay 9-C which operates when the contact in engageable relation with "stop" segment 1115 closes; and (3) closed at its outer left-hand armature and front contact an operating path for slow-to-release relay 9-A4 which operates. Relay 9-A4, upon operating, (1) prepares at its left-hand armature and front contact a path over which the "director ready" signal is to be transmitted to the calling operator at the inward switchboard, the path closed when relay 9–C1 is operated as hereinafter described, being traceable from grounded negative battery, through the upper winding of relay 6–SS and the lower winding of relay 6–SD, conductors 632, front contact and armature No. 1 of relay 6–AL, conductors 631 and 648, back contact and armature No. 11 of relay 10–T, conductor 1005, left-hand armature and front contact of relay 9–A4, conductor 902, through the left-hand winding of relay 9–C2, conductors 701 and 951, contact and left-hand armature of relay 9–C1 operated as hereinafter described, conductor 906, to ground at the contact and left-hand armature of relay 9–A; (2) closes at its inner right-hand armature and front contact an obvious operating circuit for relay 9–A5 which operates; and (3) prepares at its outer right-hand armature and front contact a path traceable over conductor 925 for lighting lamp 926, in case the director circuit timed out in this condition.

Relay 9–A5, upon operating, (1) connects ground at its inner right-hand armature and front contact to a path traceable over conductor 927, inner left-hand armature and back contact of relay 9–AL, conductor 928, armature No. 17 and back contact of relay 10–T1, conductor 1006, through the upper winding of relay 12–K1, to grounded battery and relay 12–K1 operates; and (2) connects ground at the inner right-hand armature and front contact of relay 9–A4 to a path traceable over conductor 929, its outer left-hand armature and contact, conductor 930, back contact and armature No. 23 of relay 10–T1, conductor 1007, through the lower winding of relay 12–AB, to grounded negative battery and relay 12–AB operates. Relays 12–K1 and 12–AB operate to furnish in a manner hereinafter described under "Miscellaneous Alarm Circuit" an indication that the director circuit had been moved off-normal. The ground that is connected to conductor 930 furnishes the information to the miscellaneous alarm circuit that the selected trunk circuit has been operated to the desired condition. Also relay 9–A5, upon operating, prepares (1) at its inner left-hand armature and contact a locking path for itself, extending to ground at the inner right-hand armature and front contact of relay 9–C1 when relay 9–C1 operates; (2) at its outer right-hand armature and contact parallel paths for lighting lamps 931, 932 and 933, respectively; and (3) at its inner right-hand armature and contact a path for locking relay 9–A3. Relay 9–A3, being operated at this time, prepares as soon as the "director ready" signal has operated relay 9–C2, parallel paths respectively extending over conductors 934 and 935 to the miscellaneous alarm circuit, conductor 934 being part of the operating path for relay 12–K3 and conductor 935 being part of the operating path of relay 12–R0. Also, relay 9–A3, being in an operated condition at this time, prepares at its outer right-hand armature and contact a path for lighting lamp 933 in case of trouble to indicate that the incoming marking signal has been registered.

While the motor is accelerating, relays 9–A, 9–A1, 9–A2, 9–A3, 9–A4 and 9–A5 are operated as hereinbefore described. When full speed is attained the contacts at governor 1121 open momentarily removing the short circuit from resistor 1107 and allowing relay 9–B to operate through resistor 936. Relay 9–B is slow releasing and with the help of the voltage stored in condenser 937, holds over the closures of the contacts on governor 1121, thus operating relay 9–C as soon as the "stop" pulse contact engages "stop" segment 1115, the path being traceable from grounded negative battery, resistor 915, conductor 914, resistor 948, conductor 949, through the left-hand winding of relay 9–C, contact and armature of relay 9–B, front contact and right-hand armature of relay 9–A2, conductor 950, "stop" pulse armature of relay 9–A2, conductor 950, "stop" pulse contact in engagement with "stop" segment 1115 during the time when the "stop" pulse is being received, conductors 916 and 909, to ground at the front contact and left-hand armature of relay 9–A.

Relay 9–C, upon operating, removes ground at the left-hand armature and contact of relay 9–A from segment 1114 in engageable relation with the receiving contacts and the winding of start magnet 11–H. Magnet 11–H releases thereby latching the distributor clutch to prevent further operation of the contacts. The path opened by the operation of relay 9–C is traceable over conductor 906, right-hand armature and back contact of relay 9–C, conductor 907, contact and right-hand armature of relay 9–AL, conductors 908 and 947, and, in parallel over receiving segment 1114 and over start contact to start segment 1111. Also, relay 9–C, upon operating, locks in a circuit traceable from ground at the left-hand armature and front contact of relay 9–A, conductor 906, right-hand armature, front contact and right-hand winding of relay 9–C, through the winding of relay 9–C1, resistor 938, conductors 913 and 914, resistor 915, to grounded negative battery and relay 9–C1 operates. Relay 9–C1, upon operating, closes at its left-hand armature and contact the path extending as hereinbefore described, from ground at the left-hand armature and contact of relay 9–A, conductors 906 and 951, through the left-hand winding of relay 9–C2, conductor 902, front contact and left-hand armature of relay 9–A4, conductor 1005, armature No. 11 and back contact of relay 10–T, conductors 648 and 631, armature No. 1 and front contact of relay 6–AL, conductor 632, through the lower winding of relay 6–SD, through the upper winding of relay 6–SS, to grounded negative battery whereby the "director ready" signal is repeated by means of send relay 6–SD to the operator at the inward switchboard. Relay 9–C2 operates. Also, relay 9–C1, upon operating, (1) transfers at its outer right-hand armature the armature of relay 9–G from a path extending over the back contact associated with the outer right-hand armature, the left-hand winding of relay 9–A3 to a path extending over the associated front contact to conductor 907, back contact and right-hand armature of relay 9–AL, conductors 908 and 947, contact closed to start segment 1111, through the winding of start magnet 11–H, resistor 1112, to grounded negative battery, the path also extending to receiving negative battery, the path also extending to receiving segment 1114 in preparation to receiving character signal pulses from repeater relay 6–R in the trunk circuit; (2) opens at its inner right-hand armature and back contact the operating circuit for relay 9–A2 which releases; and (3) provides at its inner right-hand armature and front contact an off-normal ground to a large part of the director circuit including the locking ground for relay 9–A5 and the ground connection to a path traceable over conductor 705, inner left-hand armature and back contact of relay 7–R, conductor 1129 and the armature of relay 11–R6.

Relay 9–C2, upon operating, (1) closes at its front contact and left-hand armature an operating path for lighting lamp 932 instead of lamp 933, in case of trouble to indicate that the "director ready" signal has been sent; (2) closes at its right-hand armature and front contact a locking circuit for itself which extends to ground at the front contact and inner right-hand armature of relay 9–C1; and (3) extends at its right-hand armature and front contact as hereinbefore described, the ground connection to conductors 934 and 935 for the miscellaneous alarm circuit (providing relay 9–A3 is operated at the time) to indicate that in case of trouble the director circuit should not be taken out of service. Relay 9–A2, upon releasing, (1) opens at its inner left-hand armature and contact the operating circuit for relay 9–B which slowly releases thereby removing relay 9–B from the contacts at governor 1121; (2) opens at its outer left-hand armature and front contact the operating circuit for relay 9–A4 which slowly releases; and (3) disconnects at its right-hand armature and front contact the contact in engageable relation with "stop" segment 1115 from the left-hand winding of relay 9–C and transfers its right-hand armature to the front contact in a path extending over conductor 940, through the lower winding of relay 11–R6, resistor 1119, to grounded negative battery preparatory to receiving teledirecting call signal pulses from receive relay 6–R. Relay 9–A4, upon releasing, (1) opens at its left-hand armature and front contact the path for transmitting the "director ready" signal which extended through the left-hand winding of relay 9–C2 thereby discontinuing the use of this winding in conductor 1005 and connects conductor 1005 at its right-hand armature and back contact to a path extending over conductor 901, normally closed make-before-break contacts of relay 7–N3, conductor 701, front contact and left-hand armature of relay 9–C1, contact and left-hand armature of relay 9–A, to ground thereby connecting the conductor 901 to the contacts of relays 7–N3 and 7–U for sending signals to indicate busy, out-of-order or unassigned numbers, that is, those numbers which have not been assigned to any subscriber line circuits; (2) opens at its inner right-hand armature and front contact the operating path of relay 9–A5 which remains locked operated through its left-hand winding; and (3) transfers at its outer right-hand armature the ground connection from the path extending over conductor 925 to light lamp 926 to a path extending over conductor 941, outer right-hand armature and front contact of relay 9–A5, conductor 942, left-hand armature and front contact of relay 9–C2, conductor 943 for lighting lamp 932 and in a parallel path extending over conductor 944, outer right-hand armature and front contact of relay 9–A3, to light lamp 933. After the "director ready" signal is transmitted the following relays are held operated: relays 9–A, 9–A1, 9–A3, 9–A5, 9–C, 9–C1, 9–C2, 11–J, relay 9–G in its marking, or right-hand, position and relays 11–R1, 11–R2, 11–R3, 11–R4, 11–R5 and 11–R6 in their spacing, or left-hand, positions. The director circuit is now prepared to receive teledirecting signaling pulses of the calling code from the inward switchboard position. However, before the teledirecting signals are transmitted from the teletypewriter at the inward switchboard, a "Figures" signal is transmitted.

*Reception of the "Figures" signal*

Telegraph pulses received over the inward transmission path which extends over conductor 641, front contact and armature No. 2 of relay 6–AL, conductors 630 and 647, resistor 1002, conductor 1003, back contact and armature No. 10 of relay 10–T1, conductor 1004, through the lower winding of relay 9–G, to ground, are repeated by relay 9–G which is normally held in its marking, or right-hand, position. The distributor motor is operating but the contacts in engageable relation with receiving segment 1114 of the distributor are not operating because distributor start magnet 11–H is in a released condition thereby latching the clutch. As soon as the "Figures" signal is received, the start pulse of the "Figures" signal operates relay 9–G to its spacing position whereby the grounded negative battery at the marking contact is disconnected and current now flows through the winding of start magnet 11–H which operates, the path being traceable from grounded negative battery, resistor 1112, through the winding of start magnet 11–H, start segment 1111 in engagement with its associated contact, conductors 1110, 947 and 908, right-hand armature and back contact of relay 9–AL, conductor 967, front contact and outer right-hand armature of relay 9–C1, conductor 921, armature and spacing contact of relay 9–G, conductors 910 and 909, to ground at the front contact and left-hand armature of relay 9–A. The operation of start magnet 11–H releases the clutch and permits the cams of the distributor to successively operate the contacts in engageable relation with receiving segment 1114. The motor speed and contacts in engagement with receiving segment 1114 are adjusted so that at the time the first selecting pulse of the signal, "Figures," in this instance, is received, the secondary winding of relay 11–R1 is momentarily connected to the armature of relay 9–G in a circuit traceable over conductor 1128, through the lowermost winding of relay 11–R1, conductors 1125 and 1124, resistor 1117, conductors 1116, 916 and 909, to ground at the front contact and left-hand armature of relay 9–A. If the first selecting impulse is marking, relay 11–R1 will operate and lock in its marking, or right-hand, position. Similarly, relay 11–R2 will be left either spacing or marking depending on whether the second selecting impulse is spacing or marking. The reception of the "Figures" signal then proceeds as follows:

| Dot Elements | Relay 9-G | Register Relays | Fan Relays Operated |
|---|---|---|---|
| 1 | Marking | 11-R1 marking | 11-DE-1 |
| 2 | Marking | 11-R2 marking | 11-DE-2 |
| 3 | Spacing | 11-R3 spacing | |
| 4 | Marking | 11-R4 marking | 11-D4 |
| 5 | Marking | 11-R5 marking | 11-D5 |

Relay 11–R1 operates when relay 9–G is in its marking position in response to the first selecting pulse of the incoming "Figures" signal and contact No. 1 is in engagement at the time with receiving segment 1114, the path being traceable from grounded negative battery, resistor 915, marking contact and armature of relay 9–G, conductor 921, outermost right-hand armature and front contact of relay 9–C1, conductor 907, back contact and right-hand armature of relay 9–AL, conductors 908 and 947, receiving segment 1114 and its contact No. 1, conductor 1128, through the lowermost winding of relay 11–R1, conductors 1125 and 1124, to a point between resistors 1118 and 1117 of a potentiometer included in a path extending from grounded negative battery, through resistor 1119, over conductors 1116, 916 and 909, to ground at the front contact and left-hand armature of relay 9–A. Relay 11–R1, upon operating, locks in a path traceable from grounded negative battery 1130, resistor 1131, through the middle winding, marking contact and armature of relay 11–R1, conductor 922, to ground at the front contact and inner right-hand armature of relay 9–A1. When relay 9–G operates to its marking position in response to each of the second, fourth and fifth incoming selecting pulses of the "Figures" signal at times when its corresponding contact of contacts Nos. 2, 4 and 5 are in turn, in engagement with receiving segment 1114, an operating path similar to that described above for relay 11–R1 will be closed and each of relays 11–R2, 11–R4 and 11–R5 will operate, in turn, and lock in its operated position through its middle winding.

With register relays 11–R1, 11–R2, 11–R4 and 11–R5 operated to marking as above indicated, relay 11–R3 remaining in its spacing position, it will be noted that none of the locking paths of these relays pass through the winding of relay 11–J but should any one be operated in the reverse direction as it would be in response to some character signal, relay 11–J would be energized and operated. Relay 11–J will therefore release only when the "Figures" signal is received. The succeeding "stop" pulse which is always marking, causes start magnet 11–H to release if the magnet has not already released after the normally engaged contact has become disengaged with start segment 1111, grounded negative battery being connected to both ends of the winding of start magnet 11–H at this time. A momentary closure to ground by the contact in engagement with the "stop" segment 1115 of the distributor causes relay 11–R6 to operate to its marking, or right-hand, position overcoming the effect of the bias of the relay to its spacing, or left-hand, position. Relay 9–G operates to its marking position in response to the "stop" pulse but has no effect on the distributor.

The path which operated relay 11–R6 to its marking position is traceable from grounded negative battery, resistor 1119, through the lower winding of relay 11–R6, conductor 940, back contact and right-hand armature of relay 9–A2, conductor 950, contact and "stop" segment 1115, conductors 916 and 909, to ground at the contact and left-hand armature of relay 9–A. The timing condenser 1126 causes relay 11–R6 to remain on its marking contact for .030 second after the contact associated with "stop" segment 1115 opens. This allows time for the operation of relay 7–F which operates in a path traceable from grounded battery, winding of relay 7–F, conductor 704, armature and left-hand contact of relay 11–J, conductor 1101, back contact and right-hand armature of relay 7–K, conductor 702, marking, or right-hand, contact and armature of relay 11–R6, conductor 1129, back contact and inner left-hand contact of relay 7–R, conductor 705, to ground at the front contact and inner right-hand armature of relay 9–C1. When relay 11–R1 operated to its marking position, it closed an operating path for relay 11–DE–1, the path being traceable from grounded negative battery, through the winding of relay 11–DE–1, conductor 1131, marking contact and armature of relay 11–R1, conductor 922, to ground at the front contact and inner right-hand armature of relay 9–A1 and relay 11–DE–1 operates. In a similar manner relays 11–DE–2, 11–D4 and 11–D5 operated when their respectively associated relays 11–R2, 11–R4 and 11–R5 operated to marking positions. Relay 11–D3 did not operate at this time inasmuch as relay 11–R3 is in its spacing position in response to the space pulse of the "Figures" signal. Relays 11–DE–1, 11–DE–2, 11–D3, 11–D4 and 11–D5 are the fan relays in that they collectively, in operated and/or unoperated condition, select any one of the ten conductors respectively representing, first, the units digits and then, the tens digits of the call numbers of the subscribers' lines in either of the two groups of 100 lines.

Relay 7–F, upon operating, (1) locks over its right-hand armature and front contact in a circuit traceable over conductor 705, to ground at the front contact and inner right-hand armature of relay 9–C1; and (2) prepares at its front contact and left-hand armature a path for operating relay 7–K which operates when relay 11–R6 returns to its spacing, or left-hand, contact after the end of expiration of the .030-second interval. In this way relay 7–K operates in a path traceable from grounded negative battery, through the winding of relay 7–K, conductor 706, back contact and left-hand armature of relay 7–L, conductor 707, front contact and left-hand armature of relay 7–F, conductor 708, spacing contact and armature of relay 11–R6, conductor 1129, back contact and inner left-hand armature of relay 7–R, conductor 705, to ground at the front contact and inner right-hand armature of relay 9–C1. Relay 7–K, upon operating, (1) locks to ground over conductor 705 to the front contact and inner right-hand armature of relay 9–C1; and (2) transfers the marking contact of relay 11–R6 along to succeeding counting relays, that is, those relays controlled by register relays 11–R1 to 11–R5, in preparation for the registration of the next two teledirecting call signals representing the last two digits of the calling number of the subscriber line circuit, the first, or hundreds, digit of the calling number being utilized when the operator selected an idle trunk in the group of 100 subscriber lines to which the called subscriber line is assigned.

The reception of "Figures" signal has therefore set up a combination of relays 11–R1 to 11–R5, the operated relays 11–R1, 11–R2, 11–R4 and 11–R5 becoming locked directly to grounded battery instead of through relay 11–J and thereby allowing the next character signals of the called number to be registered. Therefore, "hits" on a trunk circuit are harmless until the operator has transmitted a preliminary "Figures" signal. After the "Figures" signal has been received, the following relays are operated: 9–A, 9–A1, 9–A3, 9–A5, 9–C, 9–C1, 9–C2, 11–DE–1, 11–DE–2, 11–D4, 11–D5, 7–F, 7–K, 9–G, 11–R1, 11–R2, 11–R4, 11–R5 (the operated R relays being in their marking, or right-hand, positions), 11–R3 and 11–R6 being in their spacing, or left-hand, positions. The operation of relays 11–DE–1, 11–DE–2, 11–D4 and 11–D5 at this time perform no useful function.

*Reception and deciphering of the first significant character signal of the calling number of the called station*

The first signal representing the first digit of the called subscriber's number will be repeated by relay 9–G, pulse by pulse, to the distributor contacts and registered by relays 11–R1 to 11–R5 in much the same way as described above for the "Figures" signal. Relay 11–R1 is operated in accordance to the position of relay 9–G at the middle of the first selecting pulse, relay 11–R2 is operated in accordance to the position of relay 9–G at the middle of the second selecting pulse, and so on. In each case the secondary, or lowermost, winding of each relay of relays 11–R1 to 11–R5 can quickly overcome the effect of the current in the holding, or uppermost, winding of its respectively associated relay, but otherwise the relays hold in whichever direction they are operated under control of motor start relay 9–A1. The following table indicates the condition of relays 11–R1 to 11–R5 resulting from the reception of numerical digit signals from the operator's teletypewriter at the inward switchboard. "M" indicates marking pulses and "S" indicates spacing pulses:

| Character | | Relay Condition | | | | |
|---|---|---|---|---|---|---|
| Lower Case | Upper Case | 11–R1 | 11–R2 | 11–R3 | 11–R4 | 11–R5 |
| Figures | Figures | M | M | S | M | M |
| P | 0 | M | S | M | S | M |
| Q | 1 | M | M | M | S | M |
| W | 2 | M | M | S | S | M |
| E | 3 | M | S | S | S | S |
| R | 4 | S | M | S | M | S |
| T | 5 | S | S | S | S | M |
| Y | 6 | M | M | M | S | M |
| U | 7 | M | M | M | S | S |
| I | 8 | S | M | M | S | M |
| O | 9 | S | S | S | M | M |

It will be noted that the 11–R1 relay, upon operating to its marking position, operates relay 11–DE–1 of the fan relays. Similarly the other fan relays 11–DE–2, 11–D3, 11–D4 and 11–D5 are operated when their associated register relays of relays 11–R1 to 11–R5 operate to marking. Also relay 11–J will be operated during the reception of the signal corresponding to the first digit of the calling number of the called subscriber station but performs no useful function after the "Figures" signal has been received. At the conclusion of the reception of the selecting elements of the particular signal received, relay 11–R6 again operates to its marking position and is again held for an additional period of .030 second duration. Relay 11–R6, upon operating to its marking position in response to the signal for the first digit of the call number, causes the operation of relay 7–L in a path traceable from grounded negative battery, through the left-hand winding of relay 7–L, conductor 709, back contact and right-hand armature of relay 9–M, conductor 952, front contact and right-hand armature of relay 7–K, conductor 702, marking contact and armature of relay 11–R6, conductor 1129, back contact and inner left-hand armature of relay 7–R, conductor 705, front contact and inner right-hand armature of relay 9–C1 to ground. Relay 7–L, upon operating, locks to ground at the front contact and inner right-hand armature of relay 9–C1. Also relay 11–R6, upon operating, furnishes ground through a normally closed contact of each of relays 9–M, 9–N1, 7–R and 9–LU over conductor 953 to the armatures of relay 11–D5. From the armature of relay 11–D5, the deciphering circuit is fanned out under the control of the operated, or non-operated, pulse registering relays 11-R1 to 11-R5 and fanning-out relays 11-DE-1, 11-DE-2, 11-D3, 11-D4 and 11-D5 to one of the ten conductors connected to the contacts of relay 11-DE-1. The particular conductor, upon being selected, causes the operation of one of the relays of relays 8-H0 to 8-H9, the relay operated being that associated with the particular conductor. For example, assume that the tens digit, that is, the first of the last two digits of the call number of the called subscriber line circuit is No. 5, then register relays 11-R1, 11-R2, 11-R3 and 11-R4 will be unoperated and relay 11-R5 only will be operated and the path including grounded conductor 953 is extended over the armatures and front contacts of relay 11-D5, conductor 1132, right-hand armature and back contact of relay 11-D4, conductor 1133, outer right-hand armature and back contact of relay 11-D3, conductor 1134, outermost right-hand armature and back contact of relay 11-DE-2, conductor 1135, armature No. 2 and back contact of relay 11-DE-1, conductor 1136 which corresponds to digit No. 5 of the called subscriber line number, back contact and armature No. 14 of relay 10-T1, conductor 1008, front contact and armature No. 5 of relay 10-HG1 (assuming that relay 10-HG1 is operated whenever any one of the ten trunk circuits of the group of which the trunk circuit is one, is selected and the AL relay therein, corresponding to relay 6-AL is operated), conductor 1009, armature No. 5 and back contact of relay 8-K1, conductor 801, through the right-hand winding of relay 8-H5, conductor 802, back contact and right-hand armature of relay 8-K0, to grounded negative battery and relay 8-H5 operates. Relay 8-H5 represents the fifth group of ten subscriber lines in the 100 subscriber lines which are assigned to the group of ten trunk circuits of which the trunk circuit shown in Fig. 6 is one. Relays 8-H0 to 8-H9, respectively, represent the ten groups of subscriber line circuits of the 100 subscriber line circuits. Relay 8-H5, upon operating, locks in a path traceable through the winding of relay 8-K0, over conductor 803, back contact and armature No. 4 of relay 10-T1, conductors 1010 and 705, to off-normal ground furnished at operated relay 9-C1, and relay 8-K0 operates. Relay 8-K0, upon operating, (1) first removes at its back contact and right-hand armature grounded negative battery from the operating windings of all relays 8-H9 to 8-H9 preventing the operation of a second relay of this group on this call; (2) closes at its front contact and right-hand armature an operating path for relay 8-K1 which operates to definitely remove any other relay of relays 8-H0 to 8-H4 and 8-H6 to 8-H9 from their associated conductors fanned out from the contacts of relay 11-DE-1; and (3) prepares at its left-hand armature a path traceable over the conductor 804 extending to the miscellaneous alarm circuit which subsequently supplies ground at the front contact and the upper armature of relay 12-D to operate the desired "Hold" magnet of the link circuit in case the called subscriber's line is idle.

Relay 7-L, upon operating as hereinbefore described, prepares at its front contact and left-hand armature a path for operating relay 9-M. When relay 11-R6 returns to its spacing, or left-hand, contact after the .030-second period of duration wherein relay 11-R6 was held in its marking position by the charge on timing condenser 1126 as hereinbefore described, relay 9-M will operate in a path traceable from grounded negative battery, through the winding of relay 9-M, back contact and right-hand armature of relay 9-N, conductor 954, front contact and left-hand armature of relay 7-L, front contact and left-hand armature of relay 7-F, conductor 708, spacing contact and armature of relay 11-R6, conductor 1129, back contact and inner left-hand armature of relay 7-R, to the grounded conductor 705. Relay 9-M, upon operating, closes at its front contact and left-hand armature a path including grounded conductor 795 for locking itself in an operated condition and for furnishing a ground connection to a path extending over conductor 955, back contact and armature No. 19 of relay 10-T1, conductor 1011, front contact and right-hand armature of relay 8-H5, conductor 805, through the winding of relay 8-T5, to grounded negative battery and relay 8-T5 operates to thereby prepare for the reception of the units digit signal of the call number of the called subscriber line circuit. A group of ten subscriber line circuits is assigned to each of relays 8-H0 to 8-H9 and when one of these relays is operated in response to the tens numerical digit signal of the call number of the called subscriber line circuit, it causes the operation of its corresponding relay of relays 8-T0 to 8-T9 whereby the group of subscriber line circuits to which the called subscriber line circuit is assigned, is prepared for connection. In response to the units numerical digit signal of the call number of the called subscriber line circuit the particular one of the ten connections prepared by the operated relay of relays 8-T0 to 8-T9 is completed for establishing a connection between the selected trunk circuit and the called subscriber line circuit. For an additional 100 subscriber line circuits provided in the system ten additional relays 8-H0' to 8-H9', respectively, corresponding to relays 8-H0 to 8-H9, ten additional relays 10-T0' and 8-T1' to 8-T9', respectively corresponding to relays 10-T0 and 8-T1 to 8-T9 and a relay 10-HG1' corresponding to relay 10-HG1 may be provided. Relay 10-HG1 represents the first group of 100 subscriber line circuits in which the called subscriber line circuits is included and relay 10-HG1' represents the second group of 100 subscriber line circuits.

Also, relay 9-M, upon operating as hereinbefore described, (1) opens at its back contact and right-hand armature the operating paths of relays 7-L and 8-H5 but these relays are maintained operated by their locking circuits; and (2) prepares at its front contact and right-hand armature an operating path for relay 9-N. Relay 9-N will operate as hereinbefore described, when relay 11-R6 operates to its marking position in response to the second significant character signal, that is, the units digit of the call number of the called subscriber line circuit. After the first numerical, or tens, digit signal has been received the following relays are operated: 9-A, 9-A1, 9-A3, 9-A5, 9-C, 9-C1, 9-C2, 7-F, 7-K, 7-L, 9-M, 8-H5, 8-K0, 8-K1, 8-T5. Relay 9-G is in its marking position, relay 11-R6 is in its spacing position, relays 11-DE-1, 11-DE-2, 11-D3 and 11-D4 are unoperated and relay 11-D5 is operated, relays 11-DE-1, 11-DE-2, 11-D3, 11-D4 and 11-D5 being in such positions in response to the first numerical, or tens digit signal just received.

*Reception and deciphering of the second significant character signal of the calling number of the called subscriber station*

The second numerical, or units, digit signal of the called subscriber station number is received, registered and made to operate the fanning-out relays 11-DE-1, 11-DE-2, 11-D3, 11-D4 and 11-5 in a manner similar to that in response to the first numerical, or tens, digit signal except that if the second signal is assumed to be that of No. 6, that is mark, space, mark, space and mark, relays 11-R1, 11-R3 and 11-R5 will become operated to their marking positions and relays 11-R2 and 11-R4 will remain in their spacing positions. Accordingly, relays 11-DE-1, 11-D-3 and 11-D4 will become operated and relays 11-DE-2 and 11-D4 will remain unoperated. At the conclusion of the reception of the selecting pulses of the second digit signal the "stop" pulse causes relay 11-R6 to again operate to its marking position for an interval of .030 second during which time a path hereinbefore prepared, is closed from grounded negative battery 956, through the winding of relay 9-N, front contact and right-hand armature of relay 9-M, conductor 952, front contact and right-hand armature of relay 7-K, conductor 702, marking, or right-hand, contact and armature of relay 11-R6, conductor 1129, back contact and inner left-hand armature of relay 7-R, to grounded conductor 705 and relay 9-N operates. Relay 9-N, upon operating, (1) closes at its outer left-hand armature and front contact a path extending from grounded positive battery 711, resistor 712, conductor 713, resistor 957, front contact and outer left-hand armature of relay 9-N, through the lower winding of relay 9-G, to ground and relay 9-G is held operated to its marking position to prevent any additional incoming pulses from being registered; (2) closes at its inner left-hand armature and front contact a locking path for itself extending over conductor 705, to ground at the front contact and inner right-hand armature of relay 9-C1; (3) opens at its back contact and right-hand armature the operating paths for relays 9-M and 8-T5 but both relays 9-M and 8-T5 remain operated over the locking path of relay 9-M which extends to ground at the front contact and inner right-hand armature of relay 9-C1; and (4) prepares at its front contact and right-hand armature an operating path for slow-to-release relay 9-N1, the path being traceable from grounded negative battery, through the winding of relay 9-N1, front contact and right-hand armature of relay 9-N, conductor 954, front contact and left-hand armature of relay 7-L, front contact and left-hand armature of relay 7-F, conductor 708, spacing, or left-hand, contact and armature of relay 11-R6, conductor 1129, back contact and inner left-hand armature of relay 7-R, to grounded conductor 705. After the expiration of the .030-second interval which is hereinbefore described, relay 11-R6 operates to a spacing position.

When relay 11-R6 returns to its spacing position, relay 9-N1 operates to (1) connect grounded negative battery through the windings, in series, of out-of-order relay 7-OO and busy relay 7-BY, conductor 739, front contact and left-hand armature of relay 9-N1, conductor 958, back contact and right-hand armature of relay 7-R, conductor 710, inner left-hand armature and back contact of relay 9-LU, conductor 953, armatures and front contacts of relay 11-D5, conductor 1132, right-hand armature and back contact of relay 11-D4, conductor 1133, outer right-hand armature and front contact of relay 11-D3, conductor 1137, inner left-hand armature and back contact of relay 11-DE-2, conductor 1138, armature No. 3 and front contact of relay 11-DE-1, conductor 1139, back contact and armature No. 15 of relay 10-T1, conductor 1012, front contact and armature No. 4 of relay 10-HG1, conductor 1013, armature No. 4 and front contact of relay 8-T5, conductor 806, normally closed contact of make-busy jack 415, normally closed contacts Nos. 7 and 3 of test jacks 403 and 402, respectively, conductor 416, inner upper armature and back contact of relay 4-S, outermost lower armature and back contact of relay 4-A, conductors 417 and 509, through the winding of "Hold" magnet 5-HA56, to grounded negative battery whereby grounded negative battery is connected at both ends of the path just traced; and (2) closes at its Nos. 1 and 2 contacts an obvious operating path for slow acting and slow-to-release relay 9-N2 and relay 9-N2 slowly operates. It will be noted that as usual the registration of register relays 11-R1 to 11-R5 and fanning-out relays 11-DE-1, 11-DE-2, 11-D3, 11-D4 and 11-D5 remain locked operated in the direction in which they were last operated.

*Testing subscriber line circuit*

The connection of grounded battery through the windings, in series, of relays 7-OO and 7-BY to the particular called subscriber line circuit enables these two relays to determine if conductor 806, which extends to the particular called subscriber line circuit, is terminated in a direct ground, which causes the operation of both relays 7-OO and 7-BY, or a relatively high resistance out-of-order ground (including 2900-ohm resistance of relay 7-S) which results in the operation of relay 7-OO only inasmuch as relay 7-BY is marginal in its operation. In case no ground is available, neither relay 7-OO nor relay 7-BY operates. This test takes place during the slow operating time of relay 9-N2 which begins to operate when relay 9-N1 operates. As soon as relay 9-N2 operates, grounded conductor 705, which is connected to conductor 939, is extended over the armature and front contact of relay 9-N2, to conductor 967, armature and back contact of relay 7-OO, through the winding of relay 7-R, to grounded negative battery. Assuming that the particular called subscriber line circuit is idle, in which case ground is not connected to conductor 806, relay 7-OO will be unoperated and the ground connected to its armature by the operation of relay 9-N2 will cause the operation of relay 7-R. Relay 7-R, upon operating, (1) removes at its right-hand armature and back contact relays 7-OO and 7-BY from conductor 806 and replaces them by relay 7-S; (2) opens at its inner left-hand armature and back contact the operating circuit of relay 9-N1 to release relay 9-N1; (3) prepares at its outer left-hand armature and front contact a path for the operation of relay 7-U; and (4) locks at its inner left-hand contact and front contact to conductor 705 in a path extending to ground at relay 9-C1. The release of relay 9-N1 causes relay 9-N2 to slowly release. During the time that relays 9-N1 and 9-N2 are releasing, ground at the upper armature and front contact of relay 12-D in the miscellaneous alarm circuit is connected to a path traceable through resistor 1233, over conductor 804, front contact and left-hand armature of relay 8-K0, conductor 807, armature No. 3 and back contact of relay 10-T1, conductor 1020, through the winding of high resistance of relay 7-S, conductor 736, front contact and right-hand armature of relay 7-R, conductor 710, inner left-hand armature and back contact of relay 7-LU, conductor 953, through the fanning-out relays, conductor 1139, back contact and armature No. 15 of relay 10-T1, conductor 1012, front contact and No. 4 armature of relay 10-HG1, conductor 1013, No. 4 armature and front contact of relay 8-T5, conductor 806, to the called subscriber line circuit where it terminates in grounded negative battery through "Hold" magnet 5-HA56. Under the assumed condition of the subscriber line circuit being idle, grounded battery connected to the winding of the "Hold" magnet 5-HA56 of the crossbar switch permits relay 7-S to operate, but due to the high resistance, "Hold" magnet 5-HA56 remains unoperated. Relay 7-S, upon operating, opens at its left-hand armature and back contact the operating path of relay 7-U and closes at its left-hand armature and front contact a path to operate relay 7-S1, the closing being effective when relay 9-N2 releases whereby ground supplied by relay 9-C1 over conductors 705 and 939, is connected to the armature and front contact of relay 7-S to operate relay 7-S1. Relay 7-S1, upon operating, (1) locks its left-hand armature and front contact, to ground at the inner right-hand armature of relay 9-C1, over conductor 705; (2) short-circuits at its contacts Nos. 1 and 2 the winding of relay 7-S; and (3) holds open at its right-hand armature the operating path to relay 7-U. With the winding of relay 7-S short-circuited, ground supplied at the upper armature and front contact of relay 12-D in the miscellaneous alarm circuit is connected through the fanning-out relays 11-DE-1, 11-DE-2, 11-D3, 11-D4 and 11-D5 to conductor 806 of the called subscriber line circuit to cause the operation of "Hold" magnet 5-HA56. "Hold" magnet 5-HA56 operates and the subscriber line circuit will therefore be connected to the trunk circuit which will function as hereinafter described under "Link and Subscriber Line Circuits," to release the sequence portion of the trunk circuit. The sequence portion of the trunk circuit, in turn, will function, also as hereinafter described, to remove the ground from conductor 624 in the operating path of relay 9-A. Relay 9-A therefore releases to remove ground connections from the various parts of the circuit including the operating paths of relays 9-C and 9-C1 and releasing relay 9-A1 unless conductor 960 is held grounded in a path traceable over back contact and armature No. 1 of relay 10–T1, conductor 1021, to another trunk circuit indicating that another inward call is awaiting completion. Relay 9–C1, upon releasing, removes off-normal locking ground from a considerable part of the director circuit. If relay 9–A1 releases, the distributor motor will be stopped and all remaining parts of the circuit will be deenergized. If, however, relay 9–A1 is held operated, the motor continues to operate and the register relays 11–R1 to 11–R5 and their respectively associated fanning-out relays are locked in the condition in which they were operated by the last digit signals. When the next call comes in the operation will be as hereinbefore described except as follows: Relay 9–B now operates immediately since the motor is operating at full speed and relays 9–C and 9–C1 follow at once upon receiving a closure of the contact at "stop" segment 1115 of the distributor. Before the "stop" pulse is reached, the register relays 11–R1 to 11–R5 may be operated to spacing through a path extending over the back contacts of relay 9–C but, in any case, the circuit waits to receive the "Figures" signal before proceeding with the call. The operation continues as hereinbefore described.

*Inward call to busy or out-of-order subscriber line circuit*

The operation of this type of call is exactly as hereinbefore described up to the point where the operation of relay 9–N1 connects relays 7–OO and 7–BY to conductor 806 of the particular subscriber line circuit. Now, however, conductor 806 terminates in direct ground or the relatively high resistance out-of-order ground furnished over a path including the winding of relay 7–S. In either case, relay 7–OO quickly operates but relay 7–BY, which is marginal, operates only on direct ground furnished over the path wherein the winding of relay 7–S is shunted by the operated contacts Nos. 1 and 2 of relay 7–S1. Relay 7–OO, upon operating, prevents relay 7–R from operating and therefore relay 9–N1 remains operated keeping relays 7–OO and 7–BY connected to conductor 806. Relay 7–OO therefore remains operated along with relays 9–N, 9–N1 and 9–N2 and operates relay 7–N3. Relay 7–N3, upon operating, (1) applies ground connection to start the production of "K" or "Q" character signals by relays 7–P and 7–P1; and (2) connects the armature and contact of relay 7–P1 to the outward transmission path extending over conductor 901.

Relays 7–P and 7–P1 operate in condenser timed circuits to generate "K" and "Q" signals as follows: When the ground at the inner left-hand armature and front contact of relay 7–N3 is applied to one end of a potentiometer connected to grounded negative battery 738, relay 7–P will operate under the influence of the current flowing in its lower winding, the path of which is traceable from grounded negative battery, through the lower winding of the relay, conductor 714, armature and contact of relay 7–BY, resistor 737, to a point in the potentiometer comprising grounded negative battery 738, resistors 715, 716, 717 and 718, and ground at the inner left-hand armature and front contact of relay 7–N3. When relay 7–P operates at this time, its armature moves into engagement with its left-hand contact, the current in the lower winding is reversed but the discharge of condenser 719 through the upper winding holds the armature of relay 7–P in engagement with its left-hand contact until the charge on condenser 719 discharging through the upper winding of relay 7–P is so reduced that the lower winding regains control to operate the relay armature back to its right-hand contact. Then the process is repeated, the current in the lower winding of relay 7–P tending to operate the armature to its left-hand contact while the charging of condenser 719 holds the relay armature in engagement with its right-hand contact until its effect is overcome. The condenser and the resistors of the potentiometer are so proportioned that relay 7–P will pulse at about 9 cycles per second if resistor 720 is in the path, or 11 cycles per second if resistor 720 is short-circuited as when busy relay 7–BY is in its released position. As will be hereinafter described, if the subscriber line circuit is busy, relay 7–BY is in its operated condition to cause "K" character signals to be transmitted to the outward transmission path, and if its out-of-order relay 7–BY is in its released condition to cause "Q" character signals to be transmitted.

When relay 7–N3 operates, ground is thereby connected to its inner left-hand armature and contact to close a path traceable over conductor 721, through the lower winding of relay 7–P1 to grounded negative battery. Relay 7–P1 operates to move its armature into engagement with its right-hand contact to maintain a marking signal over the outward transmission path which extends from ground, armature and contact of relay 7–P1, back contact and outer left-hand armature of relay 7–TA, conductor 722, outer left-hand armature and front contact of relay 7–N3, conductor 901, back contact and left-hand armature of relay 9–A4, conductor 1005, armature No. 11 and back contact of relay 10–T, conductors 648 and 631, armature No. 1 and front contact of relay 6–AL, conductor 632, through the lower winding of relay 6–SD, through the upper winding of relay 6–SS, to grounded negative battery whereby relay 6–SD repeats the marking signal to the operator's teletypewriter at the inward switchboard. However, when the armature of relay 7–P leaves its right-hand contact a current will charge through a path traceable from grounded negative battery, resistors 723 and 724, condenser 725, through the upper winding of relay 7–P1 to ground an relay 7–P1 operates to move its armature out of engagement with its right-hand contact for one pulse length (approximately .022 second). Relay 7–P1 then returns its armature into engagement with its right-hand contact. After the armature of relay 7–P1 returns its armature into engagement with its right-hand contact the charge on condenser 725 is discharged in a path traceable over resistor 726, conductor 727, inner left-hand armature and contact of relay 7–TA, conductor 728, right-hand contact and armature of relay 7–P, to ground at the front contact and inner left-hand armature of relay 7–N3. Inasmuch as relay 7–P is pulsing continuously, relay 7–P1 transmits a space pulse of .022 second each time relay 7–P moves its armature out of engagement with its right-hand contact. In this way relay 7–P drives relay 7–P1 at either 9 or 11 cycles per second, thereby transmitting "K" character signals if the subscriber line circuit is busy and "Q" character signals if the subscriber line circuit is out of order. These signals are transmitted over the trunk circuit and recorded as "K" or "Q" characters on the operator's teletypewriter at the inward switchboard.

*Connection to unassigned or impossible number*

If an unassigned number or non-numerical code signal is received and registered, the director circuit functions as hereinbefore described to the point of testing the called subscriber line circuit for a busy or out-of-order condition. When, however, the winding on relay 7–S is connected to an unwanted conductor corresponding to conductor 806, grounded battery is not available on the unwanted conductor to the subscriber line circuit and relay 7–S fails to operate. When therefore relay 9–N2 releases the ground at the inner right hand armature and front contact of relay 9–C1 is connected to a path traceable over conductors 705 and 939, armature and back contact of relay 9–N2, conductor 961, armature and back contact of relay 7–S, right-hand armature and back contact of relay 7–S1, front contact and outer left-hand armature of relay 7–R, through the winding of relay 7–U, to grounded negative battery. Relay 7–U operates to (1) close at its inner right-hand armature and front contact an obvious operating circuit for relay 7–N3 which operates to connect at its inner left-hand armature and front contact a ground connection to relays 7–P and 7–P1 and associated apparatus; and (2) connect resistor 729 in parallel with resistor 724. Resistor 737 is connected to the path of the potentiometer connected to grounded negative battery 738, and the lower winding of relay 7–P when the shunt around it is opened at the outer right-hand armature and front contact of operated relay 7–U. Under these conditions relay 7–P pulses at approximately six cycles per second. When relay 7–P operates its armature to its left-hand contact, relay 7–P1 is operated to its spacing, or left-hand, contact for two pulse lengths, that is, .044 second, by storing a potential charge on condenser 725. Returning to its marking, or right-hand, contact the armature of relay 7–P1 remains in its marking position until relay 7–P again operates its armature into engagement with its spacing, or left-hand, contact. Thus a "V" or "⅜" character signal is generated and transmitted to the operator's teletypewriter at the inward switchboard.

When the miscellaneous alarm circuit times out a ten-second interval during the time when the signal for the character "K," "Q," or "V" is being transmitted to the inward switchboard, a ground connection furnished at the inner lower armature and front contact of relay 12–ST in the miscellaneous alarm circuit is connected in a path traceable over conductors 1204 and 1205, inner lower armature and front contact of relay 12–TM, conductor 1206, middle upper armature and front contact of relay 13–TM1, conductor 1301, upper armature and front contact of relay 12–RO, conductor 1207, armature No. 24 and back contact of relay 10–T, conductor 1014, through the winding of relay 7–TC, to grounded negative battery, relays 12–TM, 13–TM1 and 12–RO being in operated condition as hereinafter described under "Miscellaneous Alarm Circuit." This ground on conductor 1023 is also extended over the operated right-hand armature and front contact of relay 7–N3, through the winding of relay 7–TD, to grounded negative battery. Relays 7–TC and 7–TD operate. Relay 7–TD, upon operating, removes ground at its armature and contact from the grid element of vacuum tube 730. At the end of one second condenser 731 stores sufficient potential of a positive polarity from grounded positive battery 711 to cause tube 730 to conduct and thereby operate relay 7–T. Relay 7–T, upon operating, connects ground at its armature and contact to a path extending over conductor 732, back contact and armature No. 26 of relay 10–T, conductor 1014, front contact and lower armature of relay 12–RO, conductor 1208, front contact and armature No. 7 of relay 6–AL, conductor 636, through the lower winding of relay 6–BO, to grounded negative battery and relay 6–BO operates to release the sequence portion of the selected trunk circuit and cause the director circuit to release. Thus the operator at the inward switchboard will receive at least a one-second period of the signal even though ten seconds have practically been taken to pulse the signal code.

*Re-order signal*

When, for any reason, the miscellaneous alarm circuit times out a ten-second interval in which the director circuit has not been released, ground on conductor 1023 from the miscellaneous alarm circuit operates relays 7–TA and 7–TB in a path traceable over the right-hand armature and back contact of relay 7–N3, through the windings, in parallel, of relays 7–TA and 7–TB, to grounded negative battery. The grounded conductor 1023 is also connected in an obvious operating path for relay 7–TC which operates. Relays 7–TA, 7–TB and 7–TC operate providing there have been no "K," "Q" and "V" character signals transmitted over the trunk circuit to the inward switchboard. Relay 7–TA, upon operating, (1) removes at its right-hand armatures and back contacts the shunt path around resistors 717 and 716; and (2) transfers at its outer left-hand armature conductor 722, which, after relay 7–N3 operates, becomes part of the outward transmission path, from the marking, or right-hand, contact of relay 7–P1 to the marking, or right-hand, contact of relay 7–P. Relay 7–TB, upon operating, (1) closes at its contacts Nos. 1 and 2 an obvious operating path for relay 7–N3 which operates; and (2) closes at its left-hand armature and front contact a holding path for itself, extending to grounded conductor 1023. Relay 7–N3, upon operating, (1) closes an obvious operating path for relay 7–TD which operates; and (2) disconnects at its make-before-break contact grounded conductor 901 from the sequence portion of the selected trunk circuit.

Relay 7–P, with the resistance of its operating path extending through the lower winding changed, produces pulses at approximately 8 cycles per second, the charging and discharging of the potential on condenser 719 holding the armature of the relay on its marking, or right-hand, contact for .132 second and on its spacing contact for .110 second. Thus the signal generated by relay 7–P has a spacing period equivalent to a start pulse and four other pulses to transmit to the inward switchboard a "T" or "5" character signal.

Relay 7–TD, upon operating, disconnects ground from the grid element of vacuum tube 730 and when condenser 731 after one-second interval stores a potential sufficient to make tube 730 conducting, relay 7–T operates. Relay 7–T, upon operating, connects ground to conductor 732 in a path hereinbefore described, to operate relay 6–BO. Relay 7–TC, upon operating, interconnects at its armature and contact conductors 733 and 734, conductor 733 extending over armature No. 25 and back contact of relay 10–T, conductor 1015, through the winding of relay 12–TM of the miscellaneous alarm circuit, to grounded negative battery and condenser 734 extending over armature No. 27 and back contact of relay 10–T, conductor 1016, back contact and middle lower armature of relay 12–K2, conductors 1209 and 1210, to ground at the front contact and upper armature of relay 12–CS of the miscellaneous alarm circuit and relay 12–TM operates. This results as hereinafter described in the release, in turn, of the sequence portion of the trunk circuit, the director circuit and the miscellaneous alarm circuit, all of which return to normal and are available for new calls.

*Failure of the director circuit*

*General*

When a trunk circuit on an inward call obtains permission to route a call from the sequence portion of the trunk circuit the miscellaneous alarm circuit begins counting time. Ordinarily, the miscellaneous alarm circuit will time out in two seconds but if the director circuit has grounded conductor 1006 indicating that it has moved off-normal the miscellaneous alarm circuit extends the time-out to four seconds. Then if the "director ready" signal is transmitted as hereinbefore described, relay 9–C2, upon operating, connects at its right-hand armature and contact the ground at the inner right-hand armature and front contact of relay 9–C1 to a path extending over the outer left-hand armature and contact, conductor 934, armature No. 21 and back contact of relay 10–T, conductor 1017, through the winding of relay 12–K3, to grounded negative battery and relay 12–K3 in the miscellaneous alarm circuit operates to extend the time allowed to ten seconds.

Conductors 930 and 935 are used to indicate to the miscellaneous alarm circuit whether or not the selected trunk circuit should be locked up from other calls in case of trouble. Ground when connected to either of these conductors prevents the removal of the trunk circuit from service.

*Failure to move a director circuit off-normal*

If after two seconds, relay 9–A5 has not operated to connect ground at its inner right-hand armature and front contact to a path extending over conductor 927, inner left-hand armature and back contact of relay 9–AL, conductor 928, armature No. 17 and back contact of relay 10–T, conductor 1006, through the upper winding of relay 12–K1, to grounded negative battery to indicate to the miscellaneous alarm circuit that the selected trunk circuit has failed to start a director circuit off-normal; the miscellaneous alarm circuit removes the trunk circuit from service. The removal of the trunk circuit removes any connection from the director circuit to that particular trunk circuit, permitting the director circuit to handle other calls.

*Failure of the distributor motor to attain speed*

In this case it is assumed that relay 9–A5 has operated and thereby connected ground at its inner right-hand armature and front contact to a path traceable over conductor 927, inner left-hand armature and back contact of relay 9–AL, conductor 928, armature No. 17 and back contact of relay 10–T, conductor 1006, through the upper winding of relay 12–K1 in the miscellaneous alarm circuit to ground and relay 12–K1 operates to permit an elapsed time of four seconds but relay 9–C1 fails to operate either because the distributor motor failed to attain speed or the relay arrangement designed to detect the speed failed to function. Relay 9–A4 which when operated caused the operation of relay 9–A5, also connects ground at its inner right-hand armature and front contact to a path traceable over conductor 929, outer left-hand armature and front contact of relay 9–A5, conductor 930, back contact and armature No. 23 of relay 10–T, conductor 1007, through the upper winding of relay 12–AB in the miscellaneous alarm circuit, to ground and relay 12–AB operates. In this case the miscellaneous alarm circuit after four seconds connects ground to a path extending over the inner lower armature and front contact of relay 12–ST in the miscellaneous alarm circuit, conductors 1204 and 1205, outer upper armature and front contact of relay 12–TM, outermost upper armature and front contact of relay 12–K1, armature No. 3 and back contact of relay 12–K5, conductor 1211, armature No. 2 and back contact of relay 10–T, conductor 1018, through the winding of relay 9–LU, to grounded negative battery and relay 9–LU operates. Relay 9–LU, upon operating, (1) locks in an obvious path to ground at release key 962; (2) closes at its outer left-hand armature and front contact an obvious operating path for relay 9–AL which operates; (3) extends the ground for operating relay 9–AL, over conductor 963, armature No. 20 and back contact of relay 10–T, conductor 1019, front contact and outermost upper armature of relay 12–K1, back contact and armature No. 4 of relay 12–K5, conductor 1220, outer lower armature and front contact of relay 12–TM, conductor 1221, through the upper winding of relay 13–TM1 in the miscellaneous alarm circuit, to grounded negative battery and relay 13–TM1 operates to indicate that the director circuit is locked out of service; (4) connects ground at release key 962 over its outer right-hand armature and front contact, conductor 964, through the winding of relay 9–A, to grounded negative battery whereby the director circuit is held in timed-out, or locked, condition; and (5) opens at its inner left-hand armature and back contact the path including conductor 953 over which the subscriber line circuits are selected by means of the fanning-out relays 11–D5, 11–D4, 11–D3, 11–DE–2 and 11–DE–1.

Relay 9–AL, upon operating (1) opens at its inner left-hand armature and back contact the path extending over conductor 928, armature No. 17 and back contact of relay 10–T, conductor 1006, through the upper winding of relay 12–K1, to grounded battery but relay 12–K1 remains operated over its locking circuit; (2) connects grounded negative battery at its outer left-hand armature and front contact to the circuits for energizing lamps 926, 931, 932 and 933 which in this case causes lamp 926 only to light indicating the type of trouble; and (3) opens at its right-hand armature and back contact the operating path for the distributor start magnet 11–H to prevent the distributor from running open. Meanwhile, since conductor 930 is grounded in a path extending over the outer left-hand armature and front contact of relay 9–A5 and the front contact and inner right-hand armature of relay 9–A4 to maintain relay 12–AB of the miscellaneous alarm circuit operated and thereby place the selected trunk circuit back into service after removing it temporarily, disconnects the trunk circuit from the director circuit. The disconnection of the trunk circuit from the director circuit, of course, has no effect on the "stuck" director circuit and then if the sequence portion of the trunk circuit has returned to normal places a ground on conductor 1302 for operating transfer relay 10–T if it were in normal condition, the ground on conductor 1302 being placed by the operation of transfer relay 13–TR. The operating path for relay 13–TR is traceable from grounded negative battery, armature and contact of relay 13–LT, through the lower winding of relay 13–TR, back contact and outermost upper armature of relay 13–DA, conductor 1303, front contact and innermost upper armature of relay 12–K2, conductor 1223, back contact and inner lower armature of relay 12–TM, conductor 1213, back contact and outer lower armature of relay 12–ST, conductor 1222, armature No. 2 and back contact of relay 12–K5, conductor 1214, innermost upper armature and front contact of relay 12–TM1, to ground. This transfers director circuit No. 2, if available, into service instead of director circuit No. 1. If the director circuit No. 2 was the director circuit that had become "stuck" the conductor 1302 would have already been grounded and in this case the miscellaneous alarm circuit removes the ground on conductor 1302 placing director circuit No. 1 into service. New inward calls are serviced by the newly connected director circuit.

*Failure of the "director ready" signal to reach associated loop repeater or failure of registration of marking pulse transmitted by the selected trunk circuit to the distributor circuit*

In this case it is assumed that the distributor motor has attained speed and that relay 9–C1 has operated but the path by which the "director ready" signal was to be transmitted was opened somewhere before reaching the associated loop repeater or in any case relay 9–C2 failed to operate. If the inward transmission conductor to the distributor is opened it is obvious that directing of the inward call by the connection will be impossible. The existence of either of these conditions would prevent relay 9–A3 from operating. These two troubles could of course occur on the same call. In any case after four seconds the miscellaneous alarm circuit causes relay 9–LU to operate and in turn relay 9–AL operates as hereinbefore described except that since neither conductor 930 nor 935 is grounded the miscellaneous alarm circuit proceeds to lock the selected trunk circuit as well as the director circuit out of service. Relay 9–AL, upon operating, causes lamps 926, 931, 932 and 933 to light as follows: Lamps 931 and 933 when lighted indicate "director ready" signal failure, lamp 932 when lighted indicates failure to register the incoming marking signal and lamp 931 when lighted alone indicates a combination of both types of troubles. The miscellaneous alarm circuit meanwhile proceeds to place the other director circuit into service.

*Returning "stuck" director circuit into service*

After the trouble is cleared the director circuit can be made available by momentarily depressing release key 962 which removes holding ground from relay 9–A and locking ground from relays 9–AL and 9–LU thereby returning the circuit to normal.

Link circuit and subscriber line circuit

As hereinbefore stated when the trunk circuit is selected at the inward switchboard by the operator, selecting magnet 5-SA4 associated with the selected trunk circuit in its termination on the first crossbar switch, will be operated in advance of the selection of the desired called subscriber line circuit and therefore contact set 503 is operated to interengage conductors 507, 512 and 510 and conductors 508, 513 and 511, respectively. When desired subscriber line conductor 806 is selected in response to the units digit signal of the called subscriber station number, a path is closed from grounded negative battery, through the winding of "Hold" magnet 5-HA56, conductors 509 and 417, back contact and outermost lower armature of relay 4-A, back contact and inner upper armature of relay 4-S, conductor 416, contacts Nos. 3 and 7 of test jacks 402 and 403, respectively, normally closed contact on busy jack 415, conductor 806, front contact and armature No. 4 of relay 8-T5, conductor 1013, armature No. 4 and front contact of relay 10-HG1, conductor 1012, armature No. 15 and back contact of relay 10-T, conductor 1139, front contact and armature No. 3 of relay 11-DE-1, conductor 1138, back contact and innermost left-hand armature of relay 11-DE-2, conductor 1137, front contact and outer right-hand armature of relay 11-D3, conductor 1133, back contact and right-hand armature of relay 11-D4, conductor 1132, front contact and left-hand armature of relay 11-D5, conductor 953, back contact and inner left-hand armature of relay 9-LU, conductor 710, right-hand armature and back contact of relay 7-R, conductor 958, armature and back contact of relay 9-N1, back contact and right-hand armature of relay 9-M, conductor 952, front contact and righthand armature of relay 7-K, conductor 702, marking, or right-hand, armature of relay 11-R6 which is in its marking position while "stop" contact of the distributor is in engagement with "stop" segment 1115 for a .030 second interval at the end of the units digit signal, conductor 1129, back contact and inner left-hand armature of relay 7-R, conductor 705, front contact and inner right-hand armature of relay 9-C1, to ground. During the closure of the path, just traced, for an interval of .030 second duration, "Hold" magnet 5-HA56 is operated to thereby operate contact set 504 to effect an interengagement between conductors 507, 512 and 510 with their respectively associated conductors 514, 501 and 417. "Hold" magnet 5-HA56, upon operating, locks in its operated position in a path extended to the selected trunk circuit the path being traceable from the winding of "Hold" magnet 5-HA56, conductor 509, in engagement with sleeve conductor 510 over operated contact set 503, sleeve conductor 511, through the winding of relay 6-S, conductor 634, to ground at the outer upper armature and front contact of sleeve relay 6-SL. Relay 6-S operates (1) to apply at its outer lower armature and front contact a supplementary ground for holding busy relay 6-BY operated; and (2) to connect ground at its inner lower armature and front contact to an obvious operating path for relay 6-C which operates.

"Hold" magnet 5-HA56 holds all the contact sets in the vertical row including contact sets 503 and 504 in operated condition for the duration of the call although selecting magnet 5-SA4 has released with the release of the director circuit and the sequence portion of the selected trunk circuit as will be hereinafter described.

"Hold" magnet 5-HA56, upon operating, (1) closes at its inner left-hand armature and front contact a path traceable from grounded negative battery 505, conductor 506, through the upper winding of sleeve relay 4-S of the desired subscriber line circuit and relay 4-S operates; and (2) prepares at its outer left-hand armature and front contact the communication transmission path which now extends over the ring conductor of the operator's cord circuit, ring spring of jack 601, conductor 603, innermost lower armature of sleeve relay 6-SL, conductor 604, front contact and lower armature of relay 6-C, conductors 633 and 513, ring contact of operated set 503, conductor 512, ring contact of operated set 504, conductors 501, outer left-hand armature and front contact of "Hold" magnet 5-HA56, conductor 502, through the lower winding of line relay 4-L of the desired subscriber line circuit, contacts Nos. 2 and 6 of test jacks 402 and 403, respectively, conductor 404, resistor 405, conductor 406, condenser 301, ringer 302, to ground at the off-normal contact of jack 304, and relay 4-L operates. Tip conductor 508 of the selected trunk circuit is also extended by operated contact sets 503 and 504 to conductor 514 of the subscriber line circuit for transmitting supervisory signals. A disconnection must be made by both the subscriber and the operator at the inward switchboard to cause "Hold" magnet 5-HA56 to release and thereby release both contact sets 503 and 504.

Relay 4-L, upon operating, closes at its armature and contact an obvious operating path for supervisory relay 4-SU which operates to thereby close at its armature and contact an obvious operating path extending over the tip conductor of the subscriber line circuit, through the operated contact sets 504 and 503, tip conductor 508 of the trunk circuit, through the winding of the trunk circuit supervisory relay 6-SV which operates. Relay 6-SV, upon operating, connects ground at its outer lower armature and contact to a path including conductor 602, tip spring of jack 601, tip conductor of the selected cord circuit at the inward switchboard to light a lamp in the cord circuit indicating to the operator that the desired subscriber line circuit is connected to the trunk circuit and that the ringing current may be applied at the switchboard to the line circuit.

The operator at the inward switchboard, upon observing the lighted lamp in the cord circuit, causes ringing current to be transmitted over ring conductor of the cord circuit, ring spring of jack 601, conductor 603, innermost lower armature and front contact of relay 6-SL, conductor 604, front contact and lower armature of relay 6-C, conductor 633, through the link circuit conductor 502 of the subscriber line circuit to operate ringer 302 at the desired subscriber station. The lower winding of relay 4-L is included in the ringing current path and relay 4-L may flutter in response to the ringing current, but relay 4-SU is of the slow-to-release type and therefore will remain operated during the fluttering operation of relay 4-L.

When ringer 302 operates, the subscriber operates key 306 which, in its operated position, (1) closes at its contact No. 1 the operating circuit for the motor of the subscriber's teletypewriter; (2) opens at its contact No. 2 the shunt path normally around the teletypewriter; and (3) closes at its contact No. 4 a shunt path around ringer 302 and a communication transmission path is therefore closed from grounded negative battery through the upper winding of relay 4-L, conductor 408, front contact and outer upper armature of relay 4-S, conductor 409, contacts Nos. 1 and 5 of testing jacks 402 and 403, respectively, conductor 410, resistor 411, conductor 412, tip spring of jack 309, tip conductor of cord 310, through the winding of printer selector magnet 311 of the teletypewriter, transmitting contacts 312, ring conductor of cord 313, ring spring of jack 304, conductor 308, contact No. 4 of key 306, conductors 314 and 406, resistor 405, conductor 404, contacts Nos. 6 and 2 of testing jacks 403 and 402, conductor 401, through the lower winding of relay 4-L, conductor 502, through the link circuit conductor 633 of the trunk circuit, front contact and lower armature of relay 6-C, front contact and innermost lower armature of relay 6-SL, conductor 603, ring conductor of jack 601, to grounded positive battery in the cord circuit. Relay 4-L having current flowing in both windings, releases to thereby release relay 4-SU. Relay 4-SU, upon releasing, extinguishes the supervisory lamp in the cord circuit indicating that the subscriber has answered the call and is awaiting communication.

*Disconnection*

When the subscriber disconnects, the relays 4–L and 4–SU operate, in turn, to again light the supervisory lamp in the cord circuit at the inward switchboard. The operator at the inward switchboard upon observing the relighting of the cord circuit lamp disconnects the cord circuit from the trunk circuit jack 601 thereby causing sleeve relay 6–SL to release. Relay 6–SL, upon releasing, opens the locking path of "Hold" magnet 5–HA56 which releases to restore to normal operated contact sets 503 and 504 and to release relay 4–S. Relay 4–S, upon releasing, restores the subscriber line circuit to normal. Also, relay 6–SL upon releasing, restores the trunk circuit to normal.

Line testing jacks 402 and 403 are provided for connection to a test trunk circuit to the No. 15 test board whereby tests may be made toward the equipment in the central office and toward the subscriber loop, respectively.

Busy jack 415 is provided by means of which the subscriber line circuit may be made busy or out of order to the director circuit or to the switchboard.

*Removal of trunk circuit in case of trouble*

A trunk may be removed from service in two ways: (1) temporarily out of service as long as the operator has a cord circuit inserted in the corresponding jack, such as jack 601; and (2) permanently out of service under control of a busy key 635 which, upon being operated, operates relay 6–BY. In both cases, however, the sequence portion of the trunk circuit, that is, relays 6–ST and 6–AL in the trunk circuit shown in Fig. 6, is released for routing other calls.

The miscellaneous alarm circuit determines what type of out-of-service condition is to be imposed. If it is to be temporarily out of service, ground at the inner lower armature and front contact of relay 12–ST of the miscellaneous alarm circuit is connected in a path traceable over conductors 1204 and 1205, inner upper armature and front contact of relay 12–TM, conductor 1206, middle upper armature and front contact of relay 13–TM1, conductor 1301, upper armature and back contact of relay 12–RO, conductor 1208, front contact and armature No. 7 of relay 6–AL, conductor 636, through the lower winding of relay 6–BO, to grounded negative battery and relay 6–BO operates. Relay 6–BO, upon operating, (1) locks in a circuit extending over conductor 608, back contact and upper armature of relay 6–C, conductor 607, to ground at the inner upper armature and front contact of relay 6–SL, the ground at the inner upper armature and front contact of relay 6–SL also serving to light trunk lamp 637 in a path traceable over conductor 638, upper armature and front contact of relay 6–BO, conductor 639, inner lower armature and back contact of relay 6–BO1 through lamp 637 to grounded negative battery; (2) supplements at its inner lower armature and front contact a ground connection for holding relay 6–BY operated; and (3) removes at its outer lower armature and back contact grounded negative battery from the operating path of relay 6–ST which releases to thereby release the sequence portion of the trunk circuit. Upon removal of the cord circuit from jack 601, relay 6–BO releases and the trunk circuit is back in service. This type of removal occurs when too much time is taken to send the directing pulses and the removal of the trunk circuit from service is preceded by the re-order "T" signals.

If the trunk is to be removed permanently ground is applied to both conductors 636 and 638 causing both relays 6–BO and 6–BO1 to operate, conductor 638 being included in a path traceable over armature No. 6 and front contact of relay 6–AL, conductor 1221, upper armature and back contact of relay 12–K4 to grounded conductor 1208.

Relay 6–BO, upon operating, performs the functions as hereinbefore stated while relay 6–BO1, upon operating, (1) locks to the trunk key 648; (2) holds at its outer lower armature and front contact relay 6–BO operated; and (3) connects at its inner lower armature and front contact interrupter 640 which furnishes 60 impulses per minute to trunk lamp 637 causing the lamp to flash. No special signals are given in this case but the operator will not receive the "director ready" signal. When the operator removes the cord circuit from jack 601, the trunk circuit will remain busy until released by the operation of trunk key 648 by an attendant.

*Making trunk circuit busy*

The trunk circuit may be made busy by operating busy key 635 which key when operated operates busy relay 6–BY.

*Miscellaneous alarm circuit*

*Method of counting time*

When relay 6–AL of the sequence portion of the selected trunk circuit operates, it closes an operating circuit for start relay 12–ST in the miscellaneous alarm circuit. Relay 12–ST, upon operating, operates relay 12–CS. The relays concerned with the measuring of time are relays 13–P, 13–A1, 13–B1, 13–A2, 13–B2, 13–A3, 13–B3 and 13–A4. Relay 13–P is simply a relay device which is connected to source 1215 of 60 impulses per minute when relay 12–CS is operated to provide a pulsing ground for the balance of these relays. For the purpose of description it is assumed that relay 13–P is following the impulse of source 1215. Relay 13–P is therefore applying ground at the rate of 60 times a minute to relays 13–A1 and 13–B1.

The first closure of ground to relays 13–A1 and 13–B1 will operate relay 13–A1 in a path traceable from ground at the armature and contact of relay 13–P, conductor 1304, make-before-break contact and winding of relay 13–A1, to grounded negative battery 1305. Relay 13–A1 operates and closes at its lower armature and front contact a locking path traceable over conductors 1308, 1306 and 1210, front contact and upper armature of relay 12–CS, to ground. Relay 13–B1 cannot operate at this time because ground is connected to both sides of its winding. The first opening of the operating path of relay 13–A1, caused by the release of relay 13–P following the first closure, will cause relay 13–B1 to operate in a path traceable from grounded negative battery 1305, through the winding of relay 13–B1, front contact and lower armature of relay 13–A1, conductors 1308, 1306 and 1210, to ground at the front contact and upper armature of relay 12–CS. The second closure of the operating path of relay 13–A1 caused by the reoperation of relay 13–P, will close a path extending from ground at the armature and front contact of relay 13–P, conductor 1304, lower armature and front contact of relay 13–B1, resistor 1307, to grounded negative battery 1305, whereby the winding of relay 13–A1 is shunted. Relay 13–A1 releases and relay 13–B1 is now held operated in a path extending over the make-before-break contact of relay 13–A1 in its released position, conductor 1304, to ground at the armature and front contact of relay 13–P. In the open interval following the second closure of the armature and contact of relay 13–P, relay 13–B1 is released. This completes a cycle which occurs in two seconds. Then a new cycle will begin. This process is repeated as long as relay 13–P continues to pulse.

Under the condition when both relays 13–A1 and 13–B1 are operated, grounded conductor 1306 is connected to a path traceable over conductor 1308, inner upper armature and front contact of each of relays 13–A1 and 13–B1, conductor 1309, make-before-break contact and winding of relay 13–A2, to grounded negative battery 1310. Relay 13–B2 cannot operate at this time because ground is connected to both sides of its winding.

However, this situation in relays 13-A2 and 13-B2 can only occur once every two seconds instead of once a second. The cycle of relays 13-A2 and 13-B2 is four seconds.

Once in each four seconds there is a time when relay 13-A2 is in a released condition and relay 13-B2 is in an operated condition. Under this condition ground is applied to relays 13-A3 and 13-B3 in a path traceable from grounded conductors 1306 and 1308, upper make-before-break contact of relay 13-A2, front contact and inner upper armature of relay 13-B2, conductor 1311, lower make-before-break contact and winding of relay 13-A3, to grounded negative battery 1312 and relay 13-A3 operates. Relay 13-B3 cannot operate at this time because ground is connected to both sides of its winding. However, this situation in relays 13-A3 and 13-B3 can only occur once in every four cycles and the cycle of operation of relays 13-A3 and 13-B3 is eight seconds. Also, any part of the cycle of operation in relays 13-A3 and 13-B3 when relay 13-A3 is in its released condition and relay 13-B3 is in its operated condition, relay 13-A4 will operate in a path traceable from grounded conductor 1306, upper make-before-break contact of relay 13-A3, front contact and inner upper armature of relay 13-B3, conductor 1313, through the winding of relay 13-A4, to grounded negative battery. Relay 13-A4, upon operating, closes an obvious locking path for itself over its front contact and upper armature, conductor 1210, to ground at the front contact and upper armature of relay 12-CS. The following table shows the time interval represented by the various combinations of these relays: The "X" indicates the relays operated, while "—" indicates the relays released.

| Time, Sec. | Pulse | Relays | | | | | | |
|---|---|---|---|---|---|---|---|---|
| | | (A1) | (B1) | (A2) | (B2) | (A3) | (B3) | (A4) |
| 0 | Close | X | — | — | — | — | — | — |
| ½ | Open | X | X | X | — | — | — | — |
| 1 | Close | — | X | X | X | — | — | — |
| 1½ | Open | — | — | X | X | — | — | — |
| 2 | Close | X | — | — | X | — | — | — |
| 2½ | Open | X | X | — | X | X | — | — |
| 3 | Close | — | X | — | — | X | X | — |
| 3½ | Open | — | — | — | — | X | X | — |
| 4 | Close | X | — | — | — | X | X | — |
| 4½ | Open | X | X | X | — | X | X | — |
| 5 | Close | — | X | X | X | X | X | — |
| 5½ | Open | — | — | X | X | X | X | — |
| 6 | Close | X | — | X | X | X | — | X |
| 6½ | Open | X | X | — | X | — | X | X |
| 7 | Close | — | X | — | — | — | — | X |
| 7½ | Open | — | — | — | — | — | — | X |
| 8 | Close | X | — | — | — | — | — | X |
| 8½ | Open | X | X | X | — | — | — | X |
| 9 | Close | — | X | X | X | — | — | X |
| 9½ | Open | — | — | X | X | — | — | X |
| 10 | Close | X | — | X | X | — | — | X |
| 10½ | Open | X | X | — | X | X | — | X |
| 11 | Close | — | X | — | — | X | X | X |
| 11½ | Open | — | — | — | — | X | X | X |
| 12 | Close | X | — | — | — | X | X | X |
| 12½ | Open | X | X | X | — | X | X | X |
| 13 | Close | — | X | X | X | X | X | X |
| 13½ | Open | — | — | X | X | X | X | X |

*Timing the interval used by the sequence portion of a trunk circuit on an inward call if a director circuit has not been seized*

When relay 6-AL of the sequence portion of the trunk circuit operates, grounded negative battery 618 is connected over conductor 644, dash line section 645 which represents the battery chain extending over the fifth armature from the top and back contact of each of the relays corresponding to relay 6-AL, in the succeeding trunk circuits of the group of ten, conductor 646 armature No. 5 and front contact of relay 6-AL, conductor 627, conductor 628 common to all trunk circuits at the concentrating unit, through the winding of timing start relay 12-ST, to ground and relay 12-ST operates. Relay 12-ST, upon operating, (1) removes ground at its outer upper armature and back contact from conductor 1216 which extends to director circuit transfer key 1314 so as to prevent a manual transfer from director circuit No. 1 to director circuit No. 2; (2) closes at its inner upper armature and front contact an obvious operating path for relay 12-CS which operates; (3) furnishes ground at its outer upper armature and front contact to supplement the ground furnished at director circuit transfer key 1314 to nullify the return to normal of that same key and to continue the particular director circuit in use during the routing of a call to the concentrating unit; (4) connects ground at its inner lower armature and front contact to a path to light lamp 1217 to indicate that the sequence portion of the selected trunk circuit is busy, and supplies a ground connection to other portions of the miscellaneous alarm and the trunk circuit; and (5) opens at its outer lower armature and back contact the operating path for director circuit transfer relay 13-TR. Relay 12-CS, upon operating, (1) removes at its upper armature and back contact a ground connection from a path extending over conductor 1201, back contact and outer lower armature of relay 12-D, conductor 1202, dash line section 613 representing the outermost lower armature and back contact of each of the relays corresponding to relay 6-ST, in the preceding trunk circuits, conductor 614, outermost lower armature and front contact of relay 6-ST, conductor 620, through the winding of relay 6-AL, conductor 646, dash line section 645, outermost lower armature and back contact of each of the relays corresponding to relay 6-ST, in the succeeding trunk circuits, to grounded negative battery 618, whereby further use of the sequence portion is prevented on a new call; (2) provides at its upper armature and front contact a ground connection in the locking paths for relays 12-K2 and 12-K3 and the time measuring relays; and (3) connects at its lower armature and front contact source 1215 of 60 impulses per minute to the winding of pulsing relay 13-P. The time measuring relays begin to operate as hereinbefore described.

At the end of approximately two and one-half seconds after relay 12-ST operates, relays 13-A1, 13-B1 and 13-B2 operate and if relay 12-ST is still operated, a path is available from ground on the upper armature and front contact of relay 12-CS, traceable over conductors 1210 and 1209, middle lower armature and back contact of relay 12-K2, conductors 1016, 1218 and 1315, outer upper armature and front contact of each of relays 13-B2, 13-A1 and 13-A2, conductors 1316 and 1015, through the winding of relay 12-TM, to grounded negative battery and relay 12-TM will operate. This assumption is based on the condition in which relay 12-K2 is not operated as a result of a failure of the sequence portion of the selected trunk circuit to seize the director circuit. Relay 12-TM, upon operating, (1) removes at its outer upper armature and back contact the ground at the inner lower armature and front contact of relay 12-ST from the operating path of relay 13-SE and connects it over its outer upper armature and front contact to the outermost upper armature of relay 12-K1; (2) closes at its outer lower armature and front contact an operating path for relay 13-TM1, the path extending from ground over the back contact and middle upper armature of relay 12-K2, conductor 1219, back contact and armature No. 4 of relay 12-K5, conductor 1220, through its outer lower armature and contact, conductor 1203, through the upper winding of relay 13-TM1, to grounded negative battery and relay 13-TM1 operates; (3) connects grounded conductor 1204 to a path extending over conductor 1205, inner upper armature and front contact of relay 12-TM, conductor 1206, middle upper armature and front contact of relay 13-TM1; and (4) opens at its inner lower armature and back contact the operating path for relay 12-TR.

Relay 13-TM1, upon operating, (1) locks at its inner lower armature and front contact in a path traceable over conductor 1317, front contact and inner upper armature of relay 13–B1, conductors 1308, 1306 and 1210, to ground at the upper armature and front contact of relay 12–CS; (2) applies ground at the inner lower armature and front contact of relay 12–ST, assuming that relay 12–ST is still operated, to a circuit traceable over conductors 1204 and 1205, inner upper armature and front contact of relay 12–TM, conductor 1206, middle upper armature and front contact of relay 13–TM1, conductor 1301, upper armature and back contact of relay 12–RO, conductor 1208, then in two parallel paths, one extending over the back contact and upper armature of relay 12–K4, conductor 1221, front contact and armature No. 6 of relay 6–AL, conductor 638, through the lower winding of relay 6–BO1, to grounded negative battery, and the other continued over conductor 1208, front contact and armature No. 7 of relay 6–AL, conductor 636, through the lower winding of relay 6–BO, to grounded negative battery, whereby the particular trunk circuit used in originating the call is removed from service either temporarily or permanently depending on whether relay 12–K4 is in operated or unoperated position; (3) applies ground at its innermost upper armature and front contact to a path traceable over conductor 1214, back contact and armature No. 2 of relay 12–K5, conductor 1222, outer lower armature and back contact of relay 12–ST, conductor 1213, inner lower armature and back contact of relay 12–TM, conductor 1223, innermost upper armature and front contact of relay 12–K2, conductor 1303, outermost upper armature and back contact of relay 13–DA2, through the lower winding of transfer relay 13–TR, back contact and armature of relay 12–LT, to grounded negative battery but this circuit at this time is open and therefore relay 13–TR cannot operate; (4) closes at its outer lower armature and front contact a holding path for relay 12–CS.

When relay 12–TM operated, relay 12–K1 was unoperated and a path was closed traceable from ground at the inner lower armature and front contact of relay 12–ST, conductors 1204 and 1205, inner upper armature and front contact of relay 12–TM, conductor 1206, outer lower armature and back contact of relay 12–K1, conductor 1224, through the upper winding of relay 12–SA, to grounded negative battery and relay 12–SA operates. Relay 12–SA, upon operating, (1) closes at its lower armature and front contact one path extending to ground at release key 1242 for releasing the locking path for itself and another path traceable over the lower normally closed contact of alarm release key 1225 for causing minor alarm lamp 1226 to light; (2) connects ground at its inner upper armature and front contact to a path traceable over the upper normally closed contact of key 1225, conductor 1227, to light minor alarm lamp 1318; and (3) connects ground at its outer upper armature and front contact to a path traceable over conductor 1228 to operate audible minor alarm 1319.

After another one half second elapses, bringing the time to approximately three seconds, relay 13–A1 releases. Relay 13–A1, upon releasing, opens at its outer upper armature and front contact the operating path for relay 12–TM which releases. Relay 12–TM, upon releasing, closes at its outer upper armature and back contact an operating path for relay 13–SE, the path being traceable from grounded negative battery, upper winding of relay 13–SE, conductor 1320, outermost upper armature and front contact of relay 13–TM1, conductor 1321, back contact and outer upper armature of relay 12–TM, conductors 1205 and 1204, to ground at the inner lower armature and front contact of relay 13–ST. Therefore in the one-half second that relays 13–A1, 13–B1 and 13–B2 were operated and in which relays 12–TM and 13–TM1 function to remove the trunk circuit from service, if the sequence portion of the trunk circuit has not been released, relay 12–ST would not release and the release of relay 12–TM would operate relay 13–SE. Relay 13–SE, upon operating, (1) closes at its lower armature and front contact a locking path for itself extending to ground over the upper normally closed contact of release sequence key 1322, the ground in the locking circuit serving also to light sequence busy lamp 1323 in a path traceable over the upper normally closed contact of key 1324; and (2) connects ground at its upper armatures and respective front contacts to paths respectively provided to operate major visual alarm lamp 1325 and major audible alarm 1326 as an indication that the sequence portion of the select trunk circuit is in trouble.

If, however, relay 12–ST released during the one-half second interval mentioned in the next preceding paragraph, the miscellaneous alarm circuit waits for another one-half second until relay 13–B1 releases which, upon releasing, opens its locking path and permits the release of relay 13–TM1, the locking path being traceable over conductor 1317, front contact and inner upper armature of relay 13–B1, conductors 1308, 1306 and 1210, to ground at the front contact and upper armature of relay 12–CS. Also, relay 13–TM1, upon releasing, opens at its outer lower armature and front contact the holding path for relay 12–CS which releases. Relay 12–CS, upon releasing, (1) disconnects at its lower armature and front contact source 1215 of 60 impulses per minute from pulsing relay 13–P; (2) removes ground at its upper armature from the locking paths of the time measuring relays; and (3) reconnects the ground at its upper armature and back contact to a path extending over conductor 1201, the back contact and outer lower armature of relay 12–D, conductor 1202, to the sequence portion of the trunk circuit to permit the sequence chain to handle a new call.

*Timing interval used by the sequence portion of a trunk circuit when the operating circuit for relay 12–K1 but not the operating circuit for relay 12–K3 in the miscellaneous alarm circuit is grounded*

As hereinbefore stated, when the sequence portion of a selected trunk circuit is seized, relay 12–ST of the miscellaneous alarm circuit operates causing in turn the operation of relay 12–CS. Relay 12–CS, upon operating, connects source 1215 of 60 impulses per minute through pulsing relay 13–P to relays 13–A1, 13–B1, 13–A2, 13–B2, 13–A3 and 13–B3 for the purpose of counting the time interval. Assuming that relay 9–A5 in the trunk circuit is operated as hereinbefore described, ground is therefore applied to a path traceable over the inner right-hand armature and front contact of the relay, conductor 927, inner left-hand armature and back contact of relay 9–AL, conductor 928, armature No. 17 and back contact of relay 10–T, conductor 1006, through the upper winding of relay 12–K1, to grounded negative battery and relay 12–K1 operates. Relay 12–K1, upon operating, (1) closes at its outermost upper armature and front contact a path traceable from grounded negative battery, through the winding of relay 9–LU, conductor 1018, back contact and armature No. 2 of relay 10–T, conductor 1211, back contact and armature No. 3 of relay 12–K5, front contact and outermost upper armature of relay 12–K1, to the front contact associated with the outer upper armature of relay 12–TM, but the last-mentioned contact is still open inasmuch as relay 12–TM has not as yet operated; (2) places at its middle upper armature and front contact a supplementary ground for holding relay 12–CS operated the path being traceable from grounded negative battery, winding of relay 12–CS, conductors 1229 and 1230, middle upper armature and front contact of relay 12–K1, conductor 1231, back contact and outermost upper armature of relay 13–MAJ, conductors 1306 and 1210, to ground at the front contact and upper armature of relay 12–CS; (3) locks under the control of relay 12–ST, through a path traceable over conductor 1204, to ground at the inner lower armature and front contact of relay 12–SH; (4) connects at its outer lower armature and front contact the operating paths for relays 13–DA1 and 13–DA2, which extend, in parallel, from grounded negative battery, through the lower winding of relay 12-DA1, conductor 1327 to the back contact and outer lower armature of relay 13-TR, if unoperated at the time, and from grounded negative battery, upper winding of relay 12-DA2, conductor 1328, to the front contact and inner lower armature of relay 13-TR, if operated, then over a common conductor 1329, back contact and armature No. 1 of relay 12-K5, conductor 1212, front contact and outer lower armature of relay 12-K1, to the front contact and inner upper armature of relay 12-TM, not as yet operated; and (5) closes at its innermost upper armature and front contact an operating path for relay 12-K2, traceable from grounded negative battery, through the upper winding of relay 12-K2, innermost upper armature and front contact of relay 12-K1, conductor 1231, back contact and outermost upper armature of relay 12-MAJ, conductors 1306 and 1210, to ground at the upper armature and front contact of relay 12-CS. Relay 12-K2 operates and (1) connects at its outermost upper armature and front contact conductor 1019 to conductor 1219 which extends over the back contact and armature No. 4 of relay 12-K5, conductor 1220 to the outer lower armature and front contact of relay 12-TM in preparation for the operation of relay 12-TM1; (2) closes at its front contact and innermost upper armature a partially prepared operating path for relay 12-TR; (3) closes at its innermost lower armature and front contact a locking path for itself extending over conductors 1209 and 1210, to ground at the inner upper armature and front contact of relay 12-CS; and (4) removes at its middle lower armature and back contact a ground at the upper armature and front contact of relay 12-CS from the outer upper armature of relay 13-B1 in a path extending over conductors 1016, 1218 and 1315. Relays 13-A1, 13-A2, 13-B1 and 13-B2 function and at the conclusion of two seconds interval, relay 12-K2 being in an operated condition, the miscellaneous alarm circuit does not cause the operation of relay 12-TM. At the conclusion of four seconds, however, relays 13-B3, 13-A1 and 13-B1 being operated, the ground furnished at the upper armature and front contact of relay 12-CS, through the operated contacts of relay 12-K2 and the normally closed contact of relay 12-K3, cause the operation of relay 12-TM, the operating path being traceable from grounded negative battery, winding of relay 12-TM, conductors 1015 and 1316, outer upper armature and front contact of each of relays 13-A1, 13-B1 and 13-B3, conductor 1330, back contact and inner upper armature of relay 12-K3, conductor 1232, front contact and outermost lower armature of relay 12-K2, conductors 1209 and 1210, to ground at the upper armature and front contact of relay 12-CS. Relay 12-TM, upon operating, (1) connects at its front contact and outer upper armature ground applied by relay 12-ST to conductors 1204 and 1205 to complete a path extending over the outermost upper armature and front contact of relay 12-K1, armature No. 3 and back contact of relay 12-K5, conductor 1211, armature No. 2 and back contact of relay 10-T, conductor 1018, through the winding of relay 9-LU, to grounded negative battery and relay 9-LU operates to bring the director circuit into a "stuck" condition; (2) connects at its outer lower armature and front contact the winding of relay 13-TM1 to a path extending over armature No. 4 and back contact of relay 12-K5, conductor 1219, outermost upper armature and front contact of relay 12-K2, conductor 1019, back contact and armature No. 20 of relay 10-T, conductors 963 and 965, front contact and outer left-hand armature of relay 9-LU, to ground at the upper normally closed contact of release key 962 and relay 13-TM1 operates; (3) closes at its inner upper armature and front contact a path extending from grounded negative battery, through the winding of relay 13-DA1, back contact and outer lower armature of relay 13-TR (providing director circuit No. 1 is in service) or from grounded negative battery, through the winding of relay 13-DA2 and the front contact and inner lower armature of relay 13-TR (providing director circuit No. 2 is in service), conductor 1329, back contact and armature No. 1 of relay 12-K5, conductor 1212, front contact and outer lower armature of relay 12-K1, front contact and inner upper armature of relay 12-TM, conductors 1205 and 1204, to ground at relay 12-ST and relay 13-DA1 or relay 13-DA2 operates; (4) opens at its inner lower armature and back contact the operating path for relay 13-TR or 13-LT, the path when director circuit No. 1 is in service being traceable from grounded negative battery, armature and back contact of relay 13-LT, through the winding of relay 13-TR, outermost upper armature of relay 13-DA2, common conductor 1303, front contact and innermost upper armature of relay 12-K2, conductor 1223, back contact and inner lower armature of relay 12-TM, conductor 1213, back contact and outer lower armature of relay 12-ST, conductor 1222, armature No. 2 and back contact of relay 12-K5, conductor 1214, innermost upper armature and front contact of relay 13-TM1 to ground; the path, should director circuit No. 2 be in service, would be traceable over grounded negative battery, through the winding of relay 13-LT, back contact and outer lower armature of relay 13-DA1, front contact and middle upper armature of relay 12-DA2 to common conductor 1303. Relay 13-TM1, however, is not operated unless the director circuit in service is in a "stuck" condition. The operation of relay 13-DA1 or 13-DA2 depending on which of the two director circuits is in service, results in the locking in an operated position, of the relay operated under the control of its associated release key 1331 or 1332. Either of relays 13-DA1 and 13-DA2, upon operating, operates audible minor alarm 1319 and its corresponding lamp 1333 or 1334 in an obvious operating path to indicate which of the director circuits is in trouble. Also, either of relays 13-DA1 and 13-DA2, upon operating, prepares a path for the operation of either of relays 13-TR, 13-LT and 13-MAJ, the function of which will be hereinafter described.

After the director circuit is locked in a "stuck" condition, relay 9-LU operates to connect ground at its outer left-hand armature and front contact to a path traceable as hereinbefore described to operate relay 13-TM1. Relay 13-TM1, upon operating, (1) locks under the control of the front contact and inner upper armature of relay 13-B1; (2) places a supplementary ground on the winding of relay 12-CS to hold relay 12-CS operated; (3) connects at its middle upper armature and front contact the ground at the inner lower armature and front contact of relay 12-ST to a path traceable over conductors 1204 and 1205, outer lower armature and front contact of relay 12-TM, conductors 1206 and 1301, upper armature and back contact of relay 12-RO, conductor 1208 and then over two parallel paths, one extending over the back contact and upper armature of relay 12-K4, conductor 1221, front contact and armature No. 6 of relay 6-AL, conductor 638, through the lower winding of relay 6-BO1, to grounded negative battery, and the other continuing over conductor 1208, front contact and armature No. 7 of relay 6-AL, conductor 636, through the lower winding of relay 6-BO, to grounded negative battery; (4) helps to prepare at its innermost upper armature and front contact a path to effect the transfer from one director circuit to another; (5) helps to prepare at its outermost upper armature and front contact a path for operating relay 13-SE which, upon operating, furnishes an indication of the failure of the sequence portion of a trunk circuit to release. Both of the functions set forth in items (4) and (5) under those performed by relay 13-TM1 occur in the next half second. Should relays 9-C2 and 9-A3 be in operated condition at the time when relay 12-TM operated, relay 12-K4 would operate. Relays 9-C2 and 9-A3, when operated, close a path from ground at the inner right-hand armature and front contact of relay 9-C1, right-hand armature and front contact of relay 9-C2, inner left-hand armature and front contact of relay 9-A3, conductor 935, back contact and armature No. 22 of relay 10–T1, conductor 1022, through the lower winding of relay 12–AB, to grounded negative battery. Relay 12–AB, upon operating, would close at its upper armature and front contact an obvious operating path for relay 12–K4. Relay 12–K4, upon operating, would open the normally closed contact at its upper armature so that ground would have been applied to conductor 1208 only to operate relay 6–BO. With ground being connected to both conductors 1208 and 1221 which respectively extend to the windings of relays 6–BO and 6–BO1, the trunk circuit is taken out of service permanently under the control of key 648, but if the director circuit warrants the removal of the trunk circuit from service temporarily under the control of the operator's cord circuit in the trunk circuit jack 601, relay 12–K4, upon operating, will permit ground to be connected to conductor 1208 whereby relay 6–BO only will be operated. In either case, however, the sequence relays 6–ST and 6–AL in taking the trunk circuit out of service, release, in turn, thereby removing grounded negative battery from conductor 629 to thereby release relay 12–ST. All this occurs within one-half second and, at the conclusion of this interval, relay 13–A1 releases, causing the release of relay 12–TM, but relay 13–TM1 remains locked in an operated condition for an additional one-half second. If for some reason or other relay 12–ST is still operated at the time when relay 12–TM released, indicating that the sequence portion of the trunk circuit failed to release, ground furnished at the inner lower armature of relay 12–ST, through the inner lower armature and back contact of relay 12–TM and the outermost upper armature and front contact of relay 13–TM1 causes relay 13–SE to operate. Relay 13–SE upon operating, (1) locks in an operated position under the control of its associated release key 1324, and (2) brings in two major alarms in a path traceable over its outer upper armature and front contact, upper normally closed contacts of key 1324, through the major alarm 1326, to grounded negative battery and through lamp 1325 to grounded negative battery to light the lamp, indicating that the sequence portion of the trunk circuit failed to release. With relay 12–ST released, however, ground furnished at the innermost upper armature and front contact of relay 13–TM1 is applied to a circuit traceable over conductor 1214, back contact and armature No. 2 of relay 12–K5, outer lower armature and back contact of relay 12–ST, conductor 1213, inner lower armature and back contact of relay 12–TM, innermost upper armature and front contact of relay 12–K2 which is still held locked operated under the control of relay 12–CS, conductor 1303, to the outermost and middle upper armatures of relay 13–DA2.

If relay 13–DA2 is normal, indicating that director circuit No. 2 is available, the ground furnished at the outer lower armature and front contact of relay 13–TM1 causes the operation of relay 13–TR which locks operated under control of relay 13–DA1 (relay 13–DA1 being operated) and places ground at its outer upper armature and front contact on conductor 1302, through the winding of relay 10–T1 which operates to replace director circuit No. 1 with director circuit No. 2.

If relay 13–DA2 is operated and relay 13–DA1 is normal, indicating that director circuit No. 1 is satisfactory and available, relay 13–LT operates causing the release of relay 13–TR. Relay 13–TR, upon releasing, (1) removes ground from conductor 1302 to effect the release of relay 10–T whereupon director circuit No. 1 is restored to service. In transferring to the new director circuit, all conductors to the old director circuit from the miscellaneous alarm circuit are opened causing the release of relays 12–K1, 12–AB, 12–K4 if operated. If both relays 13–DA1 and 13–DA2 are operated when ground is connected to the outermost and middle upper armatures of relay 13–DA2, indicating that both director circuits are in trouble and not available, relay 13–MAJ is operated which locks under the control of its associated release key 1335; (2) brings in major alarms; and (3) lights lamp 1336 indicating that both director circuits are in trouble. Also relay 13–MAJ, upon operating, removes the locking path of relay 12–CS which was prepared by relay 12–K1. At the conclusion of the additional one-half second, relay 13–B1 releases causing the release of relay 12–TM1. Relay 12–TM1, upon releasing, removes at its outer lower armature and front contact the additional holding ground from the winding of relay 12–CS which releases. Relay 12–CS upon releasing, (1) causes relay 12–K2 to release; (2) opens the holding ground connected to the windings of relays 13–A1, 13–B1, 13–A2, 13–B2, 13–A3 and 13–B3; (3) disconnects source 1215 of 60 impulses per minute from these time measuring relays; and (4) reconnects ground to a path traceable over its upper armature and back contact, conductor 1201, back contact and outer lower armature of relay 12–D, conductor 1202, to the sequence portion of the trunk circuit.

*Extension of the timing interval if conductor 1017 for operating relay 12–K3 in the miscellaneous alarm circuit is grounded*

If the director circuit places ground on conductor 1017, relay 12–K3 operates and locks operated under control of ground furnished by relay 12–CS. Relay 12–K3, upon operating, removes ground from the outer upper armature of relay 13–B3, the time counting path consisting of relays 13–A1, 13–B1, 13–A2, 13–B2, 13–A3, 13–B3 and 13–A4 therefore continues to count time until ten seconds have elapsed at which time all these relays will be operated and ground furnished by relay 12–CS causes the operation of relay 12–TM. Therefore if the miscellaneous alarm circuit is off-normal, the absence of ground on conductor 1006 causes it to time out and operate relay 12–TM in two seconds. The presence of ground on conductor 1006 operating as it does relays 12–K1 and 12–K2, in turn, causes the miscellaneous alarm circuit to time out in four seconds. The additional presence of ground on conductor 1017 causing the operation of relay 12–K3, permits an interval of ten seconds before relay 12–TM is operated.

*Timing out after an interval of ten seconds*

As indicated hereinbefore the miscellaneous alarm circuit continues to count as long as the sequence portion of the trunk circuit is in use and until it receives notification that a certain time limit should not be exceeded. If the director circuit is satisfied ground connections are applied to conductors 1017 and 1019 causing the operation of relays 12–K3 and 12–AB.

Relay 12–AB, upon operating, operates relays 12–K4 and 12–RO, and relay 12–K3 operates relay 12–K5 and all lock operated under control of relay 12–CS. Since relay 12–K5 opens at its armature No. 2 and back contact, the path traceable over conductor 1211, through the winding of relay 9–LU whereby relay 9–LU releases and relay 12–K4 opens at its upper armature and back contact, the path traceable over conductor 1221 to the winding of relay 6–BO1, the miscellaneous alarm circuit in case it does not time out, must return the director circuit to service and only remove the trunk circuit temporarily.

When therefore the miscellaneous alarm circuit has counted out an interval of ten seconds, ground furnished at the upper armature and front contact of relay 12–CS is applied to a circuit traceable over conductors 1210 and 1306, front contact and upper armature of relay 13–A3, lower armature and front contact of relay 13–A4, outer upper armature and front contact of relay 13–B3, outer upper armature and front contact of relay 13–A1, front contact and outer upper armature of relay 13–B1, conductors 1316 and 1015, through the winding of relay 12–TM, to grounded negative battery and relay 12–TM operates. Relay 12–TM, upon operating, causes the immediate operation of relay 13-TM1 in a path traceable over conductor 1220, armature No. 4 and front contact of relay 12-K5, to ground. Relay 13-TM1, upon operating, (1) locks under control of a path extending over conductor 1317, front contact and inner upper armature of relay 13-B1, to ground at the upper armature and front contact of relay 12-CS; (2) places a supplementary ground on the winding of relay 12-CS; (3) prepares at its outermost upper armature and front contact an operating path for relay 13-SE; and (4) connects at its middle upper armature and front contact the ground connection to a path traceable over conductor 1301, upper armature and front contact of relay 12-RO, conductor 1207, armature No. 24 and back contact of relay 10-T1', conductor 1014, through the winding of relay 7-TC, to grounded negative battery. Relay 7-TC operates to interconnect conductors 733 and 734 and also causes a series of distinctive signals to be transmitted to the operator at the inward switch board for approximately one second after which ground is returned over conductor 1208 from the director circuit to the winding of relay 6-BO, through the sequence portion of the trunk circuit. Ground on conductor 1208 is used in the trunk circuit to disconnect the director circuit from the trunk circuit returning the director circuit to normal, releasing the sequence portion, removing grounded negative battery from conductor 629 and causing the lighting of lamp 637 in the trunk circuit and the release of relay 12-CS since relay 13-B1 is already released. If the director circuit returns to normal and grounded negative battery is removed from conductor 629 incoming at the miscellaneous alarm circuit, both relays 12-K1 and 12-ST release. Relay 12-CS, upon releasing, (1) causes relays 12-K2, 12-K3, 12-K4 and 12-K5 to release; (2) removes source 1215 of 60 impulses per minute and holding ground from the time counting relays 13-A1, 13-A2, 13-B1, 13-B2, 13-A3, 13-B3 and 13-A4 thereby releasing all operated counting relays; and (3) connects ground at the upper armature and back contact of relay 12-CS to a path traceable over conductor 1201, back contact and outer lower armature of relay 12-D, conductor 1202, to the sequence portion of the trunk circuit thus returning the sequence portion to normal and in a position to permit the routing and timing of a new call.

In the event that the director circuit does not release the sequence portion of the trunk circuit, the closure of conductors 733 and 734 at relay 7-TC will delay the operation of the major alarm 1326 until a total of fourteen seconds has elapsed. During this additional four-second period, relays 13-A1, 13B1, 13-A2, 13-B2 and 13-B3 continue to count time during the ten-second period, but the front contacts of relays 13-A1, 13-B1 and 13-B2 are now shunted by the interengaged conductors 733 and 734 so that the release of relays 13-A1, 13-B1 and 13-B2 does not release relay 12-TM. However, if at the end of the fourteen-second period the director circuit has not released the sequence portion of the trunk circuit, relay 12-ST will still be operated and relay 13-A3 will release causing the release of relay 12-TM which in turn will operate relay 13-SE and operate major alarm 1326.

*Manual transfer of director circuits*

The operation and release of the director transfer key 1314 permits the manual transferring between the two director circuits placing either one in service. If director circuit No. 1 is in service the operation of the key to its off-normal position will place director circuit No. 2 in service, if director circuit No. 2 is satisfactory and provided a call is not at the time being routed through the concentrating unit. If director circuit No. 2 is in service and it is desired to replace it by director circuit No. 1, the restoration of the director transfer key 1314 to its normal position will remove director circuit No. 2 and replace it by director circuit No. 1 provided director circuit No. 1 is available and not in trouble, and provided a call is not being routed through the unit.

*Delaying the operation of the "Hold" magnet of the crossbar switch*

In the earlier designs of the crossbar switch the directing finger actuated by the selecting magnet chattered considerably upon being operated. To prevent the "Hold" magnet from functioning while the director finger is chattering, ground for application to the "Hold" magnet is delayed for a short period. The operation of the selecting magnets of the crossbar switch in the link circuit places a ground on conductor 516 extending to the miscellaneous circuit causing the operation of relay 12-D. The operation of relay 12-D connects ground at its upper armature and front contact to a path including resistor 1233, conductor 804, front contact and left-hand armature of relay 8-K0, conductor 807, armature No. 3 and back contact of relay 10-T1, conductors 1020 and 735, contacts Nos. 1 and 2 of relay 7-S1, conductor 736, front contact and right-hand armature of relay 7-R, conductor 710, inner left-hand armature and back contact of relay 9-LU, conductor 953, through the fanning-out relays 11-D5, 11-D4, 11-D3, 11-DE-2, 11-DE-1, conductor 1139, back contact and armature No. 15 of relay 10-T1, conductor 1012, back contact and armature No. 4 of relay 10-HG1, conductor 1013, armature No. 4 and back contact of relay 8-T-5, conductor 806, normally closed contact of jack 415, normally closed contacts Nos. 7 and 3 of jacks 403 and 402, respectively, conductor 416, inner upper armature and back contact of relay 4-S, outermost lower armature and back contact of relay 4-A, conductor 417, through the winding of "Hold" magnet 5-HA56, to grounded negative battery and the desired "Hold" magnet operates. Also the operation of relay 12-D (1) causes the illumination of lamp 1234 as an indication that a selecting magnet has operated; and (2) removes ground from conductor 1202 extending to the trunk circuit to warn the trunk circuit that a selecting magnet is operated. The "Hold" magnet 5-HA56 meanwhile has closed its locking contact and therefore locks in series with the outer upper armature and back contact of sleeve relay 6-SL of the trunk circuit. When the selecting magnets return to normal, ground is removed from conductor 516 in the circuit hereinbefore described to release relay 12-D thereby extinguishing lamp 1234 and connecting ground to conductor 1202 returning the miscellaneous alarm circuit to normal.

*Function of lamps and keys*

The miscellaneous alarm circuit is equipped with an alarm cut-off key 1235 which, when operated, prevents the miscellaneous alarm circuit from timing out a call, and at the same time flashes lamp 1236 to indicate the alarm cutoff. Also, the circuit is provided with sequence busy lamp 1323 as an indication that the sequence portion of the trunk circuit is off-normal. Each of relays 12-SA, 13-SE, 13-DA1, 13-DA2 and 13-MAJ has associated with them a release alarm key, a normally closed contact of which closes a path for lighting the associated lamp indicating the type of trouble. The illumination of lamp 1226 is an indication that the sequence portion of the trunk circuit has failed to set the director circuit off-normal. The operation of lamp 1323 is an indication that the sequence portion of the trunk circuit failed and is in trouble. The operation of lamp 1334 or 1333 indicates the particular director circuit is in trouble and the operation of lamp 1336 indicates that both director circuits are in trouble. After the trouble has been cleared, the miscellaneous alarm circuit is brought to normal as far as the alarm indications are concerned by the return of the release alarm key to normal, if it had been operated to operate the alarm and the momentary operation of the release key associated with the particular alarm. This releases the relays that were operated removing both the audible and visual alarms.

Sequence battery and sequence ground chain alarm

Relay 12–SG remains operated from ground furnished by relay 12–CS, through the ground chain of the sequence portion of the trunk circuit. Similarly, relay 12–SB remains operated from battery furnished by the last trunk circuit, through the battery chain of the sequence portion of such trunk circuit. With both relays 12–SB and 12–SG operated, the source 1243 of voltage for the plate and filament of vacuum tube 1237 remains unconnected while the grid remains grounded and condenser 1238 is in a discharged condition. However, with the sequence circuit in an idle condition if either the ground or battery chain becomes open, relay 12–SB or 12–SG releases depending upon the particular chain affected. With the sequence portion of the trunk circuit in use during the routing of a call, both relays 12–SB and 12–SG release. With ground removed from the grid of vacuum tube 1237 and filament and plate potentials applied by the release of either or both of the relays 12–SG and 12–SB, the grid immediately assumes a negative potential relative to the filament and no plate current flows. A positive charge leaking through resistance 1239 gradually raises the potential of condenser 1238 and also continues to alter the potential of the grid. After approximately forty-five seconds, the grid having reached a definite potential relative to the filament, a plate current of sufficient magnitude flows to make tube 1237 conducting to cause relay 12–M to operate, in turn operating relay 12–N. Relay 12–N (1) locks in an operated condition at its lower armature under the control of the release sequence key 1322; (2) closes at its inner upper armature a path for causing the operation of relay 13–SE; and (3) closes at its outer upper armature a path for lighting either of lamps 1240 and 1241 to indicate the chain that is in trouble. Relay 13–SE, upon operating, closes at its upper armatures paths for operating major audible alarm 1326 and for lighting major alarm lamp 1325. After clearing the trouble, relay 12–SB or 12–SG operates removing vacuum tube 1237 from the miscellaneous alarm circuit and releasing relay 12–N. Relay 12–N releases when release sequence switch key 1322 is momentarily operated returning the miscellaneous alarm circuit to normal.

Falsely operated selecting magnet

If a selecting magnet is falsely operated, relay 12–D operates due to ground on conductor 516. Relay 12–D, upon operating, opens the path including conductor 1202 preventing the routing of a call through the concentrating unit. If the condition persists for forty-five seconds the ground chain alarm operates to thereby operate a major alarm and the lighting of the sequence ground lamp 1240 as hereinbefore described. The connection lamp 1234 is also lighted and these indications reveal to the attendant at the concentrating unit the type of existent trouble.

OUTWARD CALL

Subscriber originates a call

A subscriber upon initiating a call to the exchange office establishes a connection directly to an outgoing switchboard at the exchange office. When the station is in idle condition, ring conductor 406 of the subscriber loop, or line circuit, is connected to ringer 302, through condenser 301, so that ringing current transmitted from the inward switchboard on inward calls will be indicated by sounding ringer 302 through the application of such current. When the station is in use, switch 306 is operated (1) to close at its contact No. 1 the operating path for motor 315 of the subscriber's teletypewriter being connected in this path to source 316 of power; (2) to operate at its contact No. 2 the shunt path around the teletypewriter; (3) to remove at contact No. 3 the ground connection from tip conductor 412 of the subscriber's loop; and (4) to connect at contact No. 4 a shunt path around ringer 302 when the subscriber's teletypewriter is effectively connected to the subscriber's loop.

The subscriber, when initiating a call to the exchange office, operates switch 306 to its off-normal position and a path is closed from grounded positive battery 418 in the subscriber station line circuit at the exchange office, resistor 419, back contact and outer lower armature of relay 4–S, conductor 420, make-before-break contacts of "Hold" magnet 3–HA56, conductor 502, through the lower winding of line relay 4–L, conductor 401, contacts Nos. 2 and 6 of test jacks 402 and 403, respectively, conductor 404, resistor 405, ring conductor 406, conductor 314, contact No. 4 of switch 306, conductor 308, tip spring of jack 304, tip conductor of plug 313, through the transmitting contacts 312 of the subscriber's teletypewriter, printer selector magnet 311, tip conductor of plug 310, tip spring of jack 309, tip conductor 412, resistor 411, conductor 410, contacts Nos. 5 and 1 of test jacks 403 and 402, respectively, conductor 409, outer upper armature and back contact of relay 4–S, make-before-break contact of relay 4–A, to ground. Sufficient current is now flowing in the lower winding of relay 4–L to operate relay 4–L to thereby close at its lower armature and contact an obvious operating path over conductor 413 for operating supervisory relay 4–SU and relay 4–SU operates. Also closed at the armature and contact of relay 4–L is a path traceable over the back contact and inner lower armature of relay 4–S, through the winding of relay 4–A, to grounded negative battery and relay 4–A operates. Relay 4–SU, upon operating, performs no useful function on an outward call. Relay 4–A, upon operating, (1) removes at its make-before-break contact the ground connected to the subscriber's loop and connects at its upper armature and front contact grounded negative battery 421 to the subscriber's loop whereby the current now flowing in the subscriber's loop is increased to normal for holding the subscriber's teletypewriter selector magnet 311 operated, there being connected to the loop at this time grounded positive battery 418 at one end and grounded negative battery 421 at the other end; (2) connects at its innermost lower armature and front contact grounded negative battery to conductor 422 for lighting the answering lamp 423 which is associated with the subscriber's station line circuit jack 424 at the outward switchboard in the exchange office; (3) disconnects at its outermost lower armature and back contact conductor 417 which is included in the operating path of "Hold" magnet 5–HA56 of the link circuit; (4) connects ground at its front contact and outermost lower armature to conductor 806 which extends to the director circuit at which point the calling subscriber's loop will be found busy in the event of a call from one of the operator's positions at the inward switchboard should a call be attempted at this time; and (5) connects at its middle lower armature and front contact grounded negative battery to a path extending over conductor 425 through the secondary, or lower, winding of relay 4–S, conductors 506 and 426, to the sleeve of subscriber's station line circuit jack 424 to make the sleeve of this jack capable of producing a busy indication. Relay 4–S does not operate at this time because its windings are connected in opposition to each other.

An operator at the outward switchboard upon observing the lighting of lamp 423 inserts an answering cord circuit into jack 424 and operates a key which will connect the position teletypewriter to the calling line circuit to obtain the information regarding the called number of the other station that is desired for the completion of the call.

The insertion of an answering cord circuit into jack 424 connects the sleeve conductor of the cord circuit to the sleeve conductor of jack 424 to complete a path extending from grounded negative battery in the cord circuit as described in Large Patent 2,262,672, supra, sleeve conductor of jack 424, conductors 426 and 506, through the primary, or upper, winding of relay 4–S, to ground and relay 4–S at this time operates. Relay 4–S, upon operating, (1) connects at its front contact and outer upper armature the tip conductor 409 of the subscriber's loop to grounded negative battery, through the upper winding of relay 4–L; (2) transfers its inner upper armature from the path extending through the winding of "Hold" magnet 5–HA56, to a ground connection at resistor 427 in order to retain the busy condition to the director circuit in the event an inward call is attempted at the inward switchboard in the exchange office; (3) opens at its inner lower armature and back contact the operating path of relay 4–A which releases; and (4) connects at its outer lower armature and front contact the ring conductor of the subscriber's loop to conductor 428, ring spring of jack 424, ring conductor of the cord circuit, to grounded positive battery to establish a path for communication transmission.

Current is now flowing in both windings of line relay 4–L and inasmuch as these windings are connected in opposition to each other relay 4–L releases to thereby release relay 4–SU. Relay 4–L remains in a released condition during communication transmission.

Relay 4–A, upon releasing, extinguishes answer lamp 423.

*Disconnect on outward call*

The subscriber disconnects by restoring switch 306 to its normal position whereby ring conductor 406 of the subscriber's loop is opened and reestablished in a connection to ringer 302. Tip conductor 412 of the subscriber's loop is again connected to ground in a path extending over contacts Nos. 2 and 3 of switch 306. Relay 4–L is now energized by current flowing in its primary, or upper, winding only so it again operates to operate relay 4–SU. Relay 4–SU, upon operating, connects ground to the path extending over conductor 414, the tip spring of jack 424 and tip conductor of the cord circuit to light the cord circuit lamp as an indication to the operator that the subscriber's line circuit has been disconnected. The operator then removes the cord circuit from jack 424 causing relay 4–S to release and to restore the subscriber's line circuit to normal.

What is claimed is:

1. In a communication system, a central office, a manually operable switchboard at said central office, a source of permutation code signals at said switchboard, a plurality of subscriber station lines, two or more manually selectable trunk circuits terminating at said switchboard, link circuit means for interconnecting any one of said trunk circuits and any one of said subscriber station lines, a call directing circuit common to said trunk circuits, separate means in each of said trunk circuits sequentially operable with respect to the corresponding means in the other of said trunk circuits for connecting its trunk circuit to said call directing circuit in a particular sequence relative to preceding and succeeding trunk circuits, means in said call directing circuit responsive to code signals from said source for selecting any desired one of said subscriber station lines for connection to the calling one of said trunk circuits, and means in said link circuit means responsive to said selecting means for interconnecting said one trunk circuit to the desired one of said subscriber station lines if said one line is idle.

2. In a communication system, a switching center, a plurality of subscriber stations each having a line extending to said switching center, a manually operable switching position in said switching center having a call answering and subscriber-initiated call-extending termination for each of said lines, a code signal controlled switching mechanism geographically and functionally adjuvant to said switching center and having selective switching access to each of said lines, a second manually operable switching position in said switching center including switching code signal generating means, a plurality of communication channels limited to a number sufficient to accommodate average traffic load to said subscriber stations, and means in each of said channels for interconnecting said second switching position and said code signal controlled switching mechanism for communicating switching signals from said generating means to said switching mechanism and for establishing a connection for message communication with a selected subscriber station line under control of said switching mechanism.

3. In a communication system, a switching center, a plurality of subscriber stations each having a line extending to said switching center, a plurality of manually operable call answering switchboard positions in said switching center having multiple answering appearances of each of said lines, other manually operable switchboard positions in said switching center, code signal generating means at said other switchboard position, and a line concentration unit including code responsive switching mechanism geographically and functionally adjuvant to said switching center and controllable by code signals generated by said generating means, and also including trunk circuits interposed between said other switchboard positions and said lines for establishing calling connections to said lines.

4. In a communication system, a switching center, a plurality of subscriber stations each having a line extending to said switching center, a plurality of manually operable switching positions in said switching center having multiple call answering terminations of each of said lines, a second plurality of manually operable switching positions, a plurality of intraoffice transmission paths in a ratio to said lines of one path to several lines and having multiple appearances at said second plurality of positions, signal originating means at each of the switching positions of said second plurality, and automatic switching apparatus terminating said paths and operatively responsive to signals originating at any of the switching positions of said second plurality for selectively connecting any of said lines to any one of said paths.

5. In a communication system, a plurality of subscriber stations each having a line, a switching center having manually seizable multiple incoming traffic answering terminations for each of said lines, circuits associated with said answering terminations effective to preclude utilization of said terminations to establish outgoing call connections to said lines, a plurality of communication channels in a ratio of one channel to several of said lines and each channel having manually selectable multiple terminals in said switching center, and signal responsive switching means geographically and functionally adjuvant to said switching center and for establishing outgoing call connections from said channels selectively and individually to said lines.

6. In combination with a telegraph switching center and a plurality of subscriber station lines each having in said switching center manually seizable multiple answering terminations and circuits associated with said answering terminations effective to preclude utilization of said terminations to establish outgoing call connections to said lines, an arrangement for completing calls to said subscriber station lines comprising a plurality of trunk-like channels in a ratio of one channel to several of said line circuits and each channel having manually selectable multiple calling terminations in said switching center, and code signal responsive switching mechanism geographically and functionally adjuvant to said switching center for selectively establishing a transmission connection between any selected one of said channels and any of said lines.

7. In a communication system, a switching center, a plurality of subscriber stations each having a line extending to said switching center, manually operable switching positions having call-answering terminations for said lines in multiples sufficient to enable prompt answering of incoming calls, other manually operable switching positions having (in lieu of calling terminations of said lines in sufficient multiples to give, to each call-answering termination, access to a calling termination of every line) calling terminations of trunk-like channels sufficient in number to accommodate traffic loads outgoing to said lines, signal originating means at each of said switching positions and automatic switching apparatus geographically and functionally adjuvant to said switching center and responsive to signals originating at said other manually operable switching positions for selectively connecting a manually selected trunk to any of said lines.

8. In a communication system, a plurality of subscriber stations each having a line, a switching center having for each of said lines at least one connection facility adapted for manual establishment of a transmission connection with the line only upon origination of a call at the station served by the line, a plurality of intraoffice communication channels in a ratio of one channel to several of said lines and each channel having in said switching center at least one connection facility adapted for manual establishment of a transmission connection with the channel only for extending a call thereover, and signal responsive switching means at the termini at said channels remote from their manual connection facilities for selectively establishing outgoing call connections between said channels and said lines.

9. In a communication system, a plurality of subscriber stations each having a line, a switching office having a termination circuit connected to each of said lines, first and second transmission path facilities in each said termination circuits adapted for association with its subscriber station line, at least one jack connected to said first transmission path facility and restricted by the circuitry of said termination circuit to utilization only for extending a transmission path from said first transmission path facility incident to the operation of a subscriber station as a calling station, a plurality of trunk-like intraoffice transmission channels, signal responsive automatic switching mechanism for connecting any of said trunk-like channels selectively to said second transmission path facility in any of said termination circuits, and at least one jack connected to each of said trunk-like channels for giving access thereto and restricted by the circuitry of said trunk-like channel, switching mechanism and termination circuit to utilization only for extending a transmission path to said second transmission path facility incident to completion of a transmission circuit to a subscriber station as a called station.

10. In a communication system, a plurality of subscriber stations each having a line, a switching office having a termination circuit for each of said lines, a manual switching position including means controlled by said termination circuit for registering a call incoming from a subscriber station and means comprising a path from said termination circuit to said manual switching position and a jack connected to said path for extending a transmission circuit from said termination circuit toward a called subscriber station, a plurality of trunk-like intraoffice transmission channels in said switching center in a ratio of one trunk-like channel to a plurality of said subscriber station lines, a second manual switching position having a jack giving access to each of said trunk-like channels for transmission path connection purposes, and signal responsive automatic switching mechanism for selectively connecting any of said trunk-like channels to any of said line termination circuits as part of a call outgoing to the subscriber station served by the particular line termination circuit.

References Cited in the file of this patent

UNITED STATES PATENTS

| | | |
|---|---|---|
| 1,632,826 | Eagon | June 21, 1927 |
| 1,910,867 | Vernam | May 23, 1933 |
| 2,227,121 | Blanton | Dec. 31, 1940 |
| 2,248,820 | Haselton | July 8, 1941 |
| 2,340,599 | Kinkead et al. | Feb. 1, 1944 |
| 2,345,316 | Bailey | Mar. 28, 1944 |
| 2,390,517 | Currie | Dec. 11, 1945 |
| 2,575,329 | Blanton et al. | Nov. 20, 1951 |
| 2,625,601 | Halvorsen | Jan. 13, 1953 |
| 2,632,044 | Light | Mar. 17, 1953 |